US009958864B2

(12) United States Patent
Kentley-Klay et al.

(10) Patent No.: US 9,958,864 B2
(45) Date of Patent: May 1, 2018

(54) COORDINATION OF DISPATCHING AND MAINTAINING FLEET OF AUTONOMOUS VEHICLES

(71) Applicants: Timothy David Kentley-Klay, Stanford, CA (US); Rachad Youssef Gamara, San Francisco, CA (US)

(72) Inventors: Timothy David Kentley-Klay, Stanford, CA (US); Rachad Youssef Gamara, San Francisco, CA (US)

(73) Assignee: Zoox, Inc., Menlo Park, CA (US)

( * ) Notice: Subject to any disclaimer, the term of this patent is extended or adjusted under 35 U.S.C. 154(b) by 19 days.

(21) Appl. No.: 14/756,995

(22) Filed: Nov. 4, 2015

(65) Prior Publication Data
US 2017/0123421 A1    May 4, 2017

(51) Int. Cl.
*G05D 1/00*    (2006.01)
*G01C 21/26*    (2006.01)
(Continued)

(52) U.S. Cl.
CPC .......... *G05D 1/0088* (2013.01); *B60W 30/00* (2013.01); *G01C 21/26* (2013.01); *G01C 21/3453* (2013.01); *G05D 1/0011* (2013.01); *G05D 1/0287* (2013.01); *G05D 1/0297* (2013.01); *G06Q 10/00* (2013.01); *G07C 5/00* (2013.01); *G08G 1/202* (2013.01); *G05D 2201/0213* (2013.01); *G08G 1/20* (2013.01)

(58) Field of Classification Search
None
See application file for complete search history.

(56) References Cited

U.S. PATENT DOCUMENTS

| 5,558,370 A | 9/1996 | Behr |
|---|---|---|
| 5,959,552 A | 9/1999 | Cho |

(Continued)

FOREIGN PATENT DOCUMENTS

| WO | WO2009151781 | 12/2009 |
|---|---|---|
| WO | WO2011154681 A1 | 12/2011 |

OTHER PUBLICATIONS

Bayazit et al., "Swarming Behavior Using Probabilistic Roadmap Techniques", Swarm Robotics WS 2004, LNCS, Springer-Verlag Berlin Heidelberg 2005, pp. 112-pp. 125.

(Continued)

*Primary Examiner* — Kevin P Mahne
(74) *Attorney, Agent, or Firm* — Lee & Hayes, PLLC

(57) ABSTRACT

Various embodiments relate generally to autonomous vehicles and associated mechanical, electrical and electronic hardware, computer software and systems, and wired and wireless network communications to provide an autonomous vehicle fleet as a service. More specifically, systems, devices, and methods are configured to manage a fleet of autonomous vehicles. In particular, a method may include determining destination locations for autonomous vehicles, calculating, at an autonomous vehicle service platform, delivery locations to which the autonomous vehicles are directed, identifying data to implement a delivery location associated with an autonomous vehicle, and transmitting data representing a command to the autonomous vehicle. The command may be configured to cause navigation of the autonomous vehicle to the delivery location.

22 Claims, 46 Drawing Sheets

(51) Int. Cl.
  *G08G 1/00* (2006.01)
  *G01C 21/34* (2006.01)
  *G05D 1/02* (2006.01)
  *B60W 30/00* (2006.01)
  *G06Q 10/00* (2012.01)
  *G07C 5/00* (2006.01)

(56) References Cited

U.S. PATENT DOCUMENTS

| | | |
|---|---|---|
| 6,301,542 B1 | 10/2001 | Kirchberger et al. |
| 6,374,168 B1 | 4/2002 | Fujii |
| 6,502,016 B1 | 12/2002 | Ozaki et al. |
| 6,728,616 B1 | 4/2004 | Tabe |
| 7,426,429 B2 | 9/2008 | Tabe |
| 8,123,642 B2 | 2/2012 | Ishikawa et al. |
| 8,126,642 B2 | 2/2012 | Trepagnier |
| 8,392,064 B2 | 3/2013 | Thrun et al. |
| 8,434,919 B2 | 5/2013 | Schofield |
| 8,880,272 B1 | 11/2014 | Ferguson et al. |
| 8,977,007 B1 | 3/2015 | Ferguson et al. |
| D743,978 S | 11/2015 | Amin |
| 9,194,168 B1 | 11/2015 | Lu et al. |
| 9,201,426 B1 | 12/2015 | Bonawitz |
| 9,384,443 B2 | 7/2016 | Passot et al. |
| 9,395,727 B1* | 7/2016 | Smith ............... G05D 1/0257 |
| 9,547,307 B1* | 1/2017 | Cullinane .......... G05D 1/0088 |
| 2004/0017073 A1 | 1/2004 | Pavlov et al. |
| 2004/0068354 A1 | 4/2004 | Tabe |
| 2005/0216181 A1 | 9/2005 | Estkowski et al. |
| 2006/0064202 A1 | 3/2006 | Gutmann et al. |
| 2006/0089763 A1 | 4/2006 | Barrett et al. |
| 2006/0175116 A1 | 8/2006 | Friedman et al. |
| 2006/0207820 A1 | 9/2006 | Joshi et al. |
| 2007/0096447 A1 | 5/2007 | Tabe |
| 2007/0246927 A1 | 10/2007 | Okada |
| 2008/0033645 A1 | 2/2008 | Levinson et al. |
| 2008/0084283 A1 | 4/2008 | Kalik |
| 2008/0097699 A1 | 4/2008 | Ono |
| 2008/0320421 A1 | 12/2008 | Demaris et al. |
| 2009/0036090 A1 | 2/2009 | Cho et al. |
| 2009/0240647 A1 | 9/2009 | Green et al. |
| 2009/0276149 A1 | 11/2009 | Kauffman et al. |
| 2010/0045482 A1 | 2/2010 | Strauss |
| 2011/0130111 A1 | 6/2011 | Crandall et al. |
| 2011/0288684 A1 | 11/2011 | Farlow et al. |
| 2012/0083960 A1 | 4/2012 | Zhu et al. |
| 2012/0256448 A1 | 10/2012 | Yasui et al. |
| 2013/0054133 A1 | 2/2013 | Lewis et al. |
| 2013/0246301 A1 | 9/2013 | Radhakrishnan et al. |
| 2013/0268138 A1* | 10/2013 | Moughler ........... G05D 1/0214 701/2 |
| 2014/0032012 A1 | 1/2014 | Joshi et al. |
| 2014/0032049 A1 | 1/2014 | Moshchuk et al. |
| 2014/0129135 A1 | 5/2014 | Holden et al. |
| 2014/0129302 A1 | 5/2014 | Amin et al. |
| 2014/0129951 A1* | 5/2014 | Amin ................... G06Q 50/30 715/738 |
| 2014/0142830 A1 | 5/2014 | Bernzen et al. |
| 2014/0185880 A1 | 7/2014 | Fairfield et al. |
| 2014/0188347 A1 | 7/2014 | Tabe |
| 2014/0214255 A1 | 7/2014 | Dolgov et al. |
| 2014/0214260 A1 | 7/2014 | Eckert et al. |
| 2014/0244151 A1 | 8/2014 | Matsubara et al. |
| 2014/0257661 A1 | 9/2014 | Schulman et al. |
| 2014/0303827 A1 | 10/2014 | Dolgov et al. |
| 2014/0309833 A1 | 10/2014 | Ferguson et al. |
| 2014/0333468 A1 | 11/2014 | Zhu et al. |
| 2014/0336935 A1 | 11/2014 | Zhu et al. |
| 2014/0358353 A1 | 12/2014 | Ibanez-Guzman et al. |
| 2014/0358427 A1 | 12/2014 | Fuhrman |
| 2014/0370911 A1 | 12/2014 | Gorgenyi et al. |
| 2015/0025708 A1 | 1/2015 | Anderson |
| 2015/0039157 A1 | 2/2015 | Wolfe et al. |
| 2015/0039391 A1* | 2/2015 | Hershkovitz ........ G06Q 10/04 705/7.31 |
| 2015/0057871 A1 | 2/2015 | Ono et al. |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0149088 A1 | 5/2015 | Attard et al. |
| 2015/0160024 A1 | 6/2015 | Fowe |
| 2015/0248131 A1* | 9/2015 | Fairfield ............. G05D 1/0044 701/2 |
| 2015/0254986 A1 | 9/2015 | Fairfield et al. |
| 2015/0258928 A1 | 9/2015 | Goto et al. |
| 2015/0268665 A1 | 9/2015 | Ludwick et al. |
| 2015/0271290 A1 | 9/2015 | Tao et al. |
| 2015/0285645 A1* | 10/2015 | Maise ................ B62D 15/0285 701/25 |
| 2015/0292894 A1 | 10/2015 | Goddard et al. |
| 2015/0298636 A1 | 10/2015 | Furst |
| 2015/0336502 A1 | 11/2015 | Hillis et al. |
| 2015/0336524 A1 | 11/2015 | Larner et al. |
| 2015/0338226 A1 | 11/2015 | Mason et al. |
| 2015/0338852 A1* | 11/2015 | Ramanujam ........... G01C 21/26 701/2 |
| 2015/0339928 A1 | 11/2015 | Ramanujam |
| 2015/0346727 A1* | 12/2015 | Ramanujam ....... B62D 15/0285 701/23 |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0370251 A1 | 12/2015 | Siegel et al. |
| 2015/0375764 A1 | 12/2015 | Rajendran et al. |
| 2016/0016315 A1 | 1/2016 | Kuffner, Jr. et al. |
| 2016/0071278 A1 | 3/2016 | Leonard et al. |
| 2016/0107703 A1 | 4/2016 | Briceno et al. |
| 2016/0129787 A1* | 5/2016 | Netzer ................... B60K 35/00 701/36 |
| 2016/0159402 A1 | 6/2016 | Nakaya et al. |
| 2016/0159407 A1 | 6/2016 | Holmstrom et al. |
| 2016/0187150 A1* | 6/2016 | Sherman ............ G01C 21/3438 705/7.15 |
| 2016/0189544 A1 | 6/2016 | Ricci |
| 2016/0209220 A1* | 7/2016 | Laetz ..................... G01C 21/34 |
| 2016/0247106 A1* | 8/2016 | Dalloro ............. G06Q 10/06313 |
| 2016/0247109 A1* | 8/2016 | Scicluna ........... G06Q 10/06315 |
| 2016/0370194 A1* | 12/2016 | Colijn ................. G01C 21/343 |
| 2017/0031356 A1* | 2/2017 | Bell ................. G06Q 10/06315 |
| 2017/0075358 A1* | 3/2017 | Zhang ................. G05D 1/0285 |

OTHER PUBLICATIONS

Easymile (website), Retrieved from <<https://web.archive.org/web/20150723060050/http://easymile.com>> Jul. 2015, <<https://web.archive.org/web/201508012054107/http://easymile.com/mobility-soulition/>>, Aug. 2015, and <<http:www.youtube.com/watch?v=fijDBL76yDY>>, Feb. 2015, 13 pages.

Office Action for U.S. Appl. No. 14/932,952, dated Jun. 24, 2016, Kentley et al., "Resilient Safety System for a Robotic Vehicle", 11 pages.

Office action for U.S. Appl. No. 14/932,963, dated Aug. 15, 2016, Levinson et al., "Adaptive Mapping to Navigate Autonomous Vehicles Responsive to Physical Environment Changes", 15 pages.

Office action for U.S. Appl. No. 14/756,992, dated Aug. 25, 2016, Levinson et al., "Adaptive autonomous vehicle planner logic", 9 pages.

Office action for U.S. Appl. No. 14/933,469, dated Aug. 30, 2016, Kentley et al., "Software Application to Request and Control an Autonomous Vehicle Service", 11 pages.

Office action for U.S. Appl. No. 14/932,959, dated Aug. 5, 2016, Kentley et al., "Autonomous Vehicle Fleet Service and System", 16 pages.

Bodensteiner et al., "Monocular Camera Trajectory Optimization using LiDAR Data", IEEE International Conference on Computer Vision Workshops, 2011, 8 pages.

Office action for U.S. Appl. No. 14/932,962, dated Mar. 21, 2016, Kentley et al., "Robotic Vehicle Active Safety Systems and Methods", 18 pages.

(56) References Cited

OTHER PUBLICATIONS

Office action for U.S. Appl. No. 14/932,963, dated Mar. 17, 2016, Levinson et al., "Adaptive Mapping to Navigate Autonomous Vehicles Responsive to Physical Environment Changes", 26 pages.
Office action for U.S. Appl. No. 14/932,940, dated May 4, 2016, Levinson et al., "Automated Extraction of Semantic Information to Enhance Incremental Mapping Modifications for Robotic Vehicles", 22 pages.
U.S. Appl. No. 14/932,959, filed Nov. 4, 2015.
U.S. Appl. No. 14/932,963, filed Nov. 4, 2015.
U.S. Appl. No. 14/932,966, filed Nov. 4, 2015.
U.S. Appl. No. 14/932,940, filed Nov. 4, 2015.
U.S. Appl. No. 14/756,992, filed Nov. 4, 2015.
U.S. Appl. No. 14/756,991, filed Nov. 4, 2015.
U.S. Appl. No. 14/756,996, filed Nov. 4, 2015.
Combining 3D Shape, Color, and Motion for Robust Antime Tracking; Held, David, Levinson, Jesse, Thrun, Sebastian, Savarese, Silvio, Robotics: Science and Systems (RSS), Berkeley, California, USA (2014).
Group Induction; Teichman, Alex, Thrun, Sebastian, Proc. of the IEEE/RSJ Intl Conf on Intelligent Robotics and Systems (IROS) (2013).
Automatic Online Calibration of Cameras and Lasers; Levinson, Jesse, Thrun, Sebastian; Robotics: Science and Systems (RSS) (2013).
Automatic Calibration of Cameras and Lasers in Arbitrary Scenes; Levinson, Jesse, Thrun, Sebastian; International Symposium on Experimental Robotics (ISER) (2012).
Online, Semi-Supervised Learning for Long-Term Interaction With Object Recognition Systems; Teichman, Alex, Thrun, Sebastian, RSS Workshop on Long-Term Operation of Autonomous Robotic Systems in Changing Environments (2012).
Tracking-Based Semi-Supervised Learning; Teichman, Alex, Thrun, Sebastian; International Journal of Robotics Research (IJRR); http://ijr.sagepub.com/content/31/7/804; (2012).
Practical Object Recognition in Autonomous Driving and Beyond; Teichman, Alex, Thrun, Sebastian; IEEE Workshop on Advanced Robotics and its Social Impacts (ARSO) (2011).
Towards 3D Object Recognition Via Classification of Arbitrary Object Tracks; Teichman, Alex, Levinson, Jesse, Thrun, Sebastian; International Conference on Robotics and Automation (ICRA) (2011).
Automatic Laser Calibration, Mapping, and Localization for Autonomous Vehicles, Levison, Jesse; Thesis (Ph D); Stanford University (2011).
Unsupervised Calibration for Multi-Beam Lasers; Levinson, Jesse, Thrun, Sebastian, International Symposium on Experimental Robotics (ISER) (2010).
Robust Vehicle Localization in Urban Environments Using Probabilistic Maps; Levinson, Jesse, Thrun, Sebastian; International Conference on Robotics and Automation (ICRA) (2010).
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).
Map-Based Precision Vehicle Localization in Urban Environments; Levinson, Jesse, Thrun, Sebastian; Robotics: Science and Systems (RSS) (2007).
Combining Data-Driven and Model-Based Cues for Segmentation of Video Sequences; Eckes, Christian, Vorbruggen, Jan C.; Proceedings WCNN '96, San Diego, USA (1996).
A Real-Time Motion Planner With Trajectory Optimization for Autonomous Vehicles; Xu, Wenda et al.; Robotics and Automation (ICRA); Saint Paul, MN, USA (2012).
Dynamic Real-Time Replanning in Belief Space: An Experimental Study on Physical Mobile Robots; Agha-mohammadi, Ali-Akbar et al.; Technical Report TR 13-007; Texas A&M University, USA (2013).

An Evaluation of Dynamic Object Tracking With 3D Lidar; Morton, P., Douillard, B., Underwood, J.; Proceedings of Australasian Conference on Robotics and Automation; Dec. 7-9, 2011; Melbourne, Australia (2011).
Control of Robotic Mobility-On Demand Systems: A Queueing-Theoretical Perspective; Zhang, Rick, Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (JDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142, Berlin, German (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; Hol, Jeroen; Linkoping Studies in Science and Technology, Dissertations No. 1368; Department of Electrical Engineering; Linkoping University, SE-581 83 Linkoping, Sweden; (2011).
Large Scale Dense Visual Inertial Slam; Ma, Lu et al.; FIELD and Service Robotics (FSR); (2015).
Simultaneous Localization, Mapping, and Manipulation for Unsupervised Object Discovery; Ma, Lu et al.; IEEE International Conference on Robotics and Automation (ICRA); (2014).
Online Slam With Any-Time Self-Calibration and Automatic Change Detection; Nima Keivan and Gabe Sibley; IEEE International Conference on Robotics and Automation (ICRA); (2014).
U.S. Appl. No. 14/756,995, filed Nov. 4, 2015, Kentley et al., Coordination of dispatching and maintaing fleet of autonomous vehicles.
U.S. Appl. No. 14/932,948, filed Nov. 4, 2015, Kentley et al., "Active Lighting Control for Communicating a State of an Autonomous Vehicle to Entities in a Surrounding Enviroment".
U.S. Appl. No. 14/932,959, fied Nov. 4, 2015, Kentley et al., Titled "Autonomous Vehicle Fleet Service and System", 65 Pages.
Towards Fully Autonomous Driving: Systems and Algorithms; Levinson, Jesse et al.; Intelligent Vehicle Symposium (2011). 6 pages.
Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011 ). 8 pages.
PCT Search Report and Written Opinion dated Mar. 30, 2017 for PCT Application No. PCT/US16/60105, 8 pages.
U.S. Appl. No. 14/756,991, filed Nov. 4, 2015, Levinson et al., "Sensor-based object-detection optimization for autonomous vehicles".
U.S. Appl. No. 14/756,992, filed Nov. 4, 2015, Levinson et al., "Adaptive autonomous vehicle planner logic".
U.S. Appl. No. 14/756,993, filed Nov. 4, 2015, Kentley et al., "Method for robotic vehice communication with an external environment via acoustic beam forming".
U.S. Appl. No. 14/756,994, filed Nov. 4, 2015, Kentley et al., "System of configuring active lighting to indicate directionality of an autonomous vehicle".
U.S. Appl. No. 14/756,995, filed Nov. 4, 2015, Kentley et al., Coordination of dispatching and maintaining fleet of autonomous vehicles.
U.S. Appl. No. 14/756,996, filed Nov. 4, 2015, Levinson et al., "Calibration for Autonomous Vehicle Operation".
U.S. Appl. No. 14/757,015, filed Nov. 5, 2015, Levinson et al., "Independent steering, power torque control and transfer in autonomous vehicles".
U.S. Appl. No. 14/757,016, filed Nov. 5, 2015, Levinson et al., "Simulation system and methods for autonomous vehicles".
U.S. Appl. No. 14/932,940, filed Nov. 4, 2015, Levinson et al., "Automated Extraction of Semantic Information to Enhance Incremental Mapping Modifications for Robotic Vehicles".

(56) References Cited

OTHER PUBLICATIONS

U.S. Appl. No. 14/932,948, filed Nov. 4, 2015, Kentley et al., "Active Lighting Control for Communicating a State of an Autonomous Vehicle to Entities in a Surrounding Environment".
U.S. Appl. No. 14/932,952, filed Nov. 4, 2015, Kentley et al., "Resilient Safety System for a Robotic Vehicle".
U.S. Appl. No. 14/932,954, filed Nov. 4, 2015, Kentley et al., "Internal Safety Systems for Robotic Vehicles".
U.S. Appl. No. 14/932,958, filed Nov. 4, 2015, Kentley, "Quadrant Configuration of Robotic Vehicles".
U.S. Appl. No. 14/932,959, filed Nov. 4, 2015, Kentley et al., Titled "Autonomous Vehicle Fleet Service and System", 65 Pages.
U.S. Appl. No. 14/932,962, filed Nov. 4, 2015, Kently et al., "Robotic Vehicle Active Safety Systems and Methods".
U.S. Appl. No. 14/932,963, filed Nov. 4, 2015, Levinson et al., "Adaptive Mapping to Navigate Autonomous Vehicles Responsive to Physical Environment Changes".
U.S. Appl. No 14/932,966, filed Nov. 4, 2015, Levinson et al., "Teleoperation System and Method for Trajectory Modification of Autonomous Vehicles".
U.S. Appl. No. 14/933,469, filed Nov. 5, 2015, Kentley eta al., "Software Application to Request and Control an Autonomous Vehicle Service".
U.S. Appl. No. 14/933,602, filed Nov. 5, 2015, Levinson et al., "Machine-Learning Systems and Techniques to Optimize Teleoperation and/or Planner Decisions".
U.S. Appl. No. 14/933,665, filed Nov. 5, 2015, Kentley et al., "Software Application and Logic to Modify Configuration of an Autonomous Vehicle".
U.S. Appl. 14/933,706, filed Nov. 5, 2015, Kentley et al., "Interactive Autonomous Vehicle Command Controller".
A Probabilistic Framework for Object Detection in Images Using Context and Scale; Held, David, Levinson, Jesse, Thrun, Sebastian; International Conference on Robotics and Automation (ICRA) (2012).
Precision Tracking With Sparse 3D and Dense Color 2D Data; Held, David, Levinson, Jesse, Thrun, Sebastian; International Conference on Robotics and Automation (ICRA) (2013).
Towards Fully Autonomous Driving: Systems and Algorithms; Levinson, Jesse et al.; Intelligent Vehicles Symposium (2011).
Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011).
Office action for U.S. Appl. 14/932,948 dated Oct. 14, 2016,Kentley et al., "Active Lighting Control for Communicating a State of an Autonomous Vehicle to Entities in a Surrounding Environment", 15 pages.
Final Office action for U.S. Appl. No. 14/932,940, dated Nov. 22, 2016, Levinson et al., "Automated Extraction of Semantic Information to Enhance Incremental Mapping Modifications for Robotic Vehicles", 29 pages.
Office action for U.S. Appl. No. 14/932,959, dated Dec. 2, 2016, Kentley et al., "Autonomous Vehicle Fleet Service and System", 21 pages.
Office action for U.S. Appl. No. 14,932,954, dated Mar. 29, 2016, Kentley et al., "Internal Safety Systems for Robotic Vehicles", 17 pages.
Office Action for U.S. Appl. No. 14/933,602, dated Nov. 5, 2015, Levinson et al, "Machine-Learning Systems and Techniques to Optimize Teleoperation and/or Planner Decisions", 11 pages.
Stanford Autonomous Driving Team website <http://driving.stanford.edu/papers.html>; Various; Stanford University 2014. 1 page.
Tracking-Based Semi-Supervised Learning; Teichman, Alex, Thrun, Sebastian; Robotics: Science and Systems (RSS) (2011). 1 page.
Towards Fully Autonomous Driving: Systems and Algorithms; Levinson, Jesse et al.; Intelligent Vehicles Symposium (2011). 6 pages.
Tracking-Based Semi-Supervised Learning; Teichman, Alex, Thrun, Sebastian; International Journal of Robotics Research (IJRR); http://ijr.sagepub.com/content/31/7/804; (2012). 1 page.
Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011). 8 pages.

\* cited by examiner

COORDINATION OF DISPATCHING AND MAINTAINING FLEET OF AUTONOMOUS VEHICLES

CROSS-REFERENCE TO RELATED APPLICATIONS

This application is related to U.S. patent application Ser. No. 14/932,959 filed Nov. 4, 2015 entitled "AUTONOMOUS VEHICLE FLEET SERVICE AND SYSTEM," U.S. patent application Ser. No. 14/932,963 filed Nov. 4, 2015 entitled "ADAPTIVE MAPPING TO NAVIGATE AUTONOMOUS VEHICLES RESPONSIVE TO PHYSICAL ENVIRONMENT CHANGES," U.S. patent application Ser. No. 14/932,966 filed Nov. 4, 2015 entitled "TELEOPERATION SYSTEM AND METHOD FOR TRAJECTORY MODIFICATION OF AUTONOMOUS VEHICLES," U.S. patent application Ser. No. 14/932,940 filed Nov. 4, 2015 entitled "AUTOMATED EXTRACTION OF SEMANTIC INFORMATION TO ENHANCE INCREMENTAL MAPPING MODIFICATIONS FOR ROBOTIC VEHICLES," U.S. patent application Ser. No. 14/756,992 filed Nov. 4, 2015 entitled "ADAPTIVE AUTONOMOUS VEHICLE PLANNER LOGIC," U.S. patent application Ser. No. 14/756,991 filed Nov. 4, 2015 entitled "SENSOR-BASED OBJECT-DETECTION OPTIMIZATION FOR AUTONOMOUS VEHICLES," and U.S. patent application Ser. No. 14/756,996 filed Nov. 4, 2015 entitled "CALIBRATION FOR AUTONOMOUS VEHICLE OPERATION," all of which are hereby incorporated by reference in their entirety for all purposes.

FIELD

Various embodiments relate generally to autonomous vehicles and associated mechanical, electrical and electronic hardware, computer software and systems, and wired and wireless network communications to provide an autonomous vehicle fleet as a service. More specifically, systems, devices, and methods are configured to manage a fleet of autonomous vehicles.

BACKGROUND

A variety of approaches to developing driverless vehicles focus predominately on automating conventional vehicles (e.g., manually-driven automotive vehicles) with an aim toward producing driverless vehicles for consumer purchase. For example, a number of automotive companies and affiliates are modifying conventional automobiles and control mechanisms, such as steering, to provide consumers with an ability to own a vehicle that may operate without a driver. In some approaches, a conventional driverless vehicle performs safety-critical driving functions in some conditions, but requires a driver to assume control (e.g., steering, etc.) should the vehicle controller fail to resolve certain issues that might jeopardize the safety of the occupants.

Although functional, conventional driverless vehicles typically have a number of drawbacks. For example, a large number of driverless cars under development have evolved from vehicles requiring manual (i.e., human-controlled) steering and other like automotive functions. Therefore, a majority of driverless cars are based on a paradigm that a vehicle is to be designed to accommodate a licensed driver, for which a specific seat or location is reserved within the vehicle. As such, driverless vehicles are designed suboptimally and generally forego opportunities to simplify vehicle design and conserve resources (e.g., reducing costs of producing a driverless vehicle). Other drawbacks are also present in conventional driverless vehicles.

Other drawbacks are also present in conventional transportation services, which are not well-suited for managing, for example, inventory of vehicles effectively due to the common approaches of providing conventional transportation and ride-sharing services. In one conventional approach, passengers are required to access a mobile application to request transportation services via a centralized service that assigns a human driver and vehicle (e.g., under private ownership) to a passenger. With the use of differently-owned vehicles, maintenance of private vehicles and safety systems generally go unchecked. In another conventional approach, some entities enable ride-sharing for a group of vehicles by allowing drivers, who enroll as members, access to vehicles that are shared among the members. This approach is not well-suited to provide for convenient transportation services as drivers need to pick up and drop off shared vehicles at specific locations, which typically are rare and sparse in city environments, and require access to relatively expensive real estate (i.e., parking lots) at which to park ride-shared vehicles. In the above-described conventional approaches, the traditional vehicles used to provide transportation services are generally under-utilized, from an inventory perspective, as the vehicles are rendered immobile once a driver departs. Further, ride-sharing approaches (as well as individually-owned vehicle transportation services) generally are not well-suited to rebalance inventory to match demand of transportation services to accommodate usage and typical travel patterns. Note, too, that some conventionally-described vehicles having limited self-driving automation capabilities also are not well-suited to rebalance inventories as a human driver generally may be required. Examples of vehicles having limited self-driving automation capabilities are vehicles designated as Level 3 ("L3") vehicles, according to the U.S. Department of Transportation's National Highway Traffic Safety Administration ("NHTSA").

As another drawback, typical approaches to driverless vehicles are generally not well-suited to detect and navigate vehicles relative to interactions (e.g., social interactions) between a vehicle-in-travel and other drivers of vehicles or individuals. For example, some conventional approaches are not sufficiently able to identify pedestrians, cyclists, etc., and associated interactions, such as eye contact, gesturing, and the like, for purposes of addressing safety risks to occupants of a driverless vehicles, as well as drivers of other vehicles, pedestrians, etc.

Thus, what is needed is a solution for implementing autonomous vehicles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
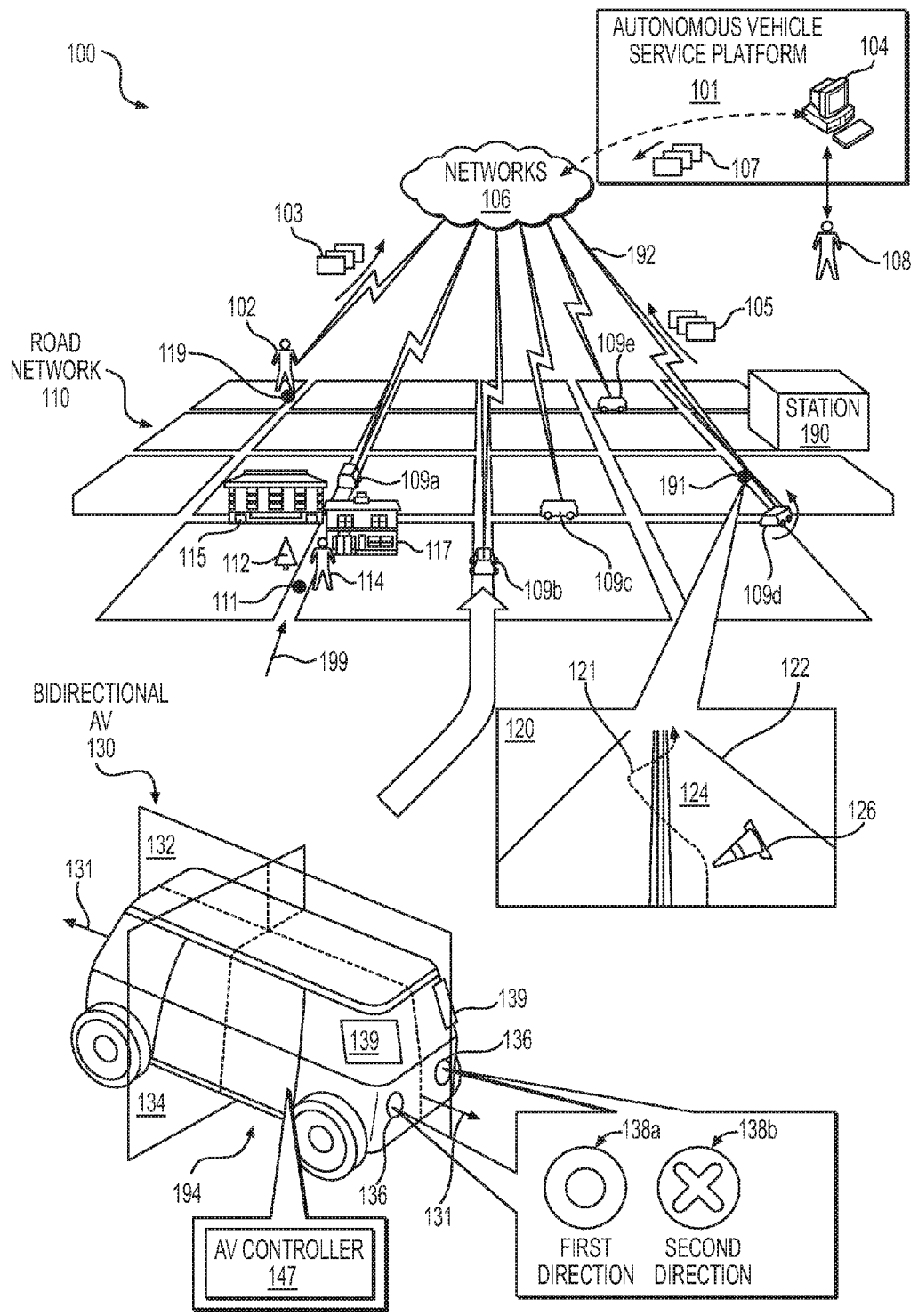
FIG. 1 is a diagram depicting implementation of a fleet of autonomous vehicles that are communicatively networked to an autonomous vehicle service platform, according to some embodiments.

FIG. 1 is a diagram depicting an implementation of a fleet of autonomous vehicles that are communicatively networked to an autonomous vehicle service platform, according to some embodiments. Diagram 100 depicts a fleet of autonomous vehicles 109 (e.g., one or more of autonomous vehicles 109a to 109e) operating as a service, each autonomous vehicle 109 being configured to self-drive a road network 110 and establish a communication link 192 with an autonomous vehicle service platform 101. In examples in which a fleet of autonomous vehicles 109 constitutes a service, a user 102 may transmit a request 103 for autonomous transportation via one or more networks 106 to autonomous vehicle service platform 101. In response, autonomous vehicle service platform 101 may dispatch one of autonomous vehicles 109 to transport user 102 autonomously from geographic location 119 to geographic location 111. Autonomous vehicle service platform 101 may dispatch an autonomous vehicle from a station 190 to geographic location 119, or may divert an autonomous vehicle 109c, already in transit (e.g., without occupants), to service the transportation request for user 102. Autonomous vehicle service platform 101 may be further configured to divert an autonomous vehicle 109c in transit, with passengers, responsive to a request from user 102 (e.g., as a passenger). In addition, autonomous vehicle service platform 101 may be configured to reserve an autonomous vehicle 109c in transit, with passengers, for diverting to service a request of user 102 subsequent to dropping off existing passengers. Note that multiple autonomous vehicle service platforms 101 (not shown) and one or more stations 190 may be implemented to service one or more autonomous vehicles 109 in connection with road network 110. One or more stations 190 may be configured to store, service, manage, and/or maintain an inventory of autonomous vehicles 109 (e.g., station 190 may include one or more computing devices implementing autonomous vehicle service platform 101).

According to some examples, at least some of autonomous vehicles 109a to 109e are configured as bidirectional autonomous vehicles, such as bidirectional autonomous vehicle ("AV") 130. Bidirectional autonomous vehicle 130 may be configured to travel in either direction principally along, but not limited to, a longitudinal axis 131. Accordingly, bidirectional autonomous vehicle 130 may be configured to implement active lighting external to the vehicle to alert others (e.g., other drivers, pedestrians, cyclists, etc.) in the adjacent vicinity, and a direction in which bidirectional autonomous vehicle 130 is traveling. For example, active sources of light 136 may be implemented as active lights 138a when traveling in a first direction, or may be implemented as active lights 138b when traveling in a second direction. Active lights 138a may be implemented using a first subset of one or more colors, with optional animation (e.g., light patterns of variable intensities of light or color that may change over time). Similarly, active lights 138b may be implemented using a second subset of one or more colors and light patterns that may be different than those of active lights 138a. For example, active lights 138a may be implemented using white-colored lights as "headlights," whereas active lights 138b may be implemented using red-colored lights as "taillights." Active lights 138a and 138b, or portions thereof, may be configured to provide other light-related functionalities, such as provide "turn signal indication" functions (e.g., using yellow light). According to various examples, logic in autonomous vehicle 130 may be configured to adapt active lights 138a and 138b to comply with various safety requirements and traffic regulations or laws for any number of jurisdictions.

In some embodiments, bidirectional autonomous vehicle 130 may be configured to have similar structural elements and components in each quad portion, such as quad portion 194. The quad portions are depicted, at least in this example, as portions of bidirectional autonomous vehicle 130 defined by the intersection of a plane 132 and a plane 134, both of which pass through the vehicle to form two similar halves on each side of planes 132 and 134. Further, bidirectional autonomous vehicle 130 may include an autonomous vehicle controller 147 that includes logic (e.g., hardware or software, or as combination thereof) that is configured to control a predominate number of vehicle functions, including driving control (e.g., propulsion, steering, etc.) and active sources 136 of light, among other functions. Bidirectional autonomous vehicle 130 also includes a number of sensors 139 disposed at various locations on the vehicle (other sensors are not shown).

Autonomous vehicle controller 147 may be further configured to determine a local pose (e.g., local position) of an autonomous vehicle 109 and to detect external objects relative to the vehicle. For example, consider that bidirectional autonomous vehicle 130 is traveling in the direction 119 in road network 110. A localizer (not shown) of autonomous vehicle controller 147 can determine a local pose at the geographic location 111. As such, the localizer may use acquired sensor data, such as sensor data associated with surfaces of buildings 115 and 117, which can be compared against reference data, such as map data (e.g., 3D map data, including reflectance data) to determine a local pose. Further, a perception engine (not shown) of autonomous vehicle controller 147 may be configured to detect, classify, and predict the behavior of external objects, such as external object 112 (a "tree") and external object 114 (a "pedestrian"). Classification of such external objects may broadly classify objects as static objects, such as external object 112, and dynamic objects, such as external object 114. The localizer and the perception engine, as well as other components of the AV controller 147, collaborate to cause autonomous vehicles 109 to drive autonomously.

According to some examples, autonomous vehicle service platform 101 is configured to provide teleoperator services should an autonomous vehicle 109 request teleoperation. For example, consider that an autonomous vehicle controller 147 in autonomous vehicle 109d detects an object 126 obscuring a path 124 on roadway 122 at point 191, as depicted in inset 120. If autonomous vehicle controller 147 cannot ascertain a path or trajectory over which vehicle 109d may safely transit with a relatively high degree of certainty, then autonomous vehicle controller 147 may transmit request message 105 for teleoperation services. In response, a teleoperator computing device 104 may receive instructions from a teleoperator 108 to perform a course of action to successfully (and safely) negotiate obstacles 126. Response data 107 then can be transmitted back to autonomous vehicle 109d to cause the vehicle to, for example, safely cross a set of double lines as it transits along the alternate path 121. In some examples, teleoperator computing device 104 may generate a response identifying geographic areas to exclude from planning a path. In particular, rather than provide a path to follow, a teleoperator 108 may define areas or locations that the autonomous vehicle must avoid.

In view of the foregoing, the structures and/or functionalities of autonomous vehicle 130 and/or autonomous vehicle controller 147, as well as their components, can perform real-time (or near real-time) trajectory calculations through autonomous-related operations, such as localization and perception, to enable autonomous vehicles 109 to self-drive.

Figure 2:
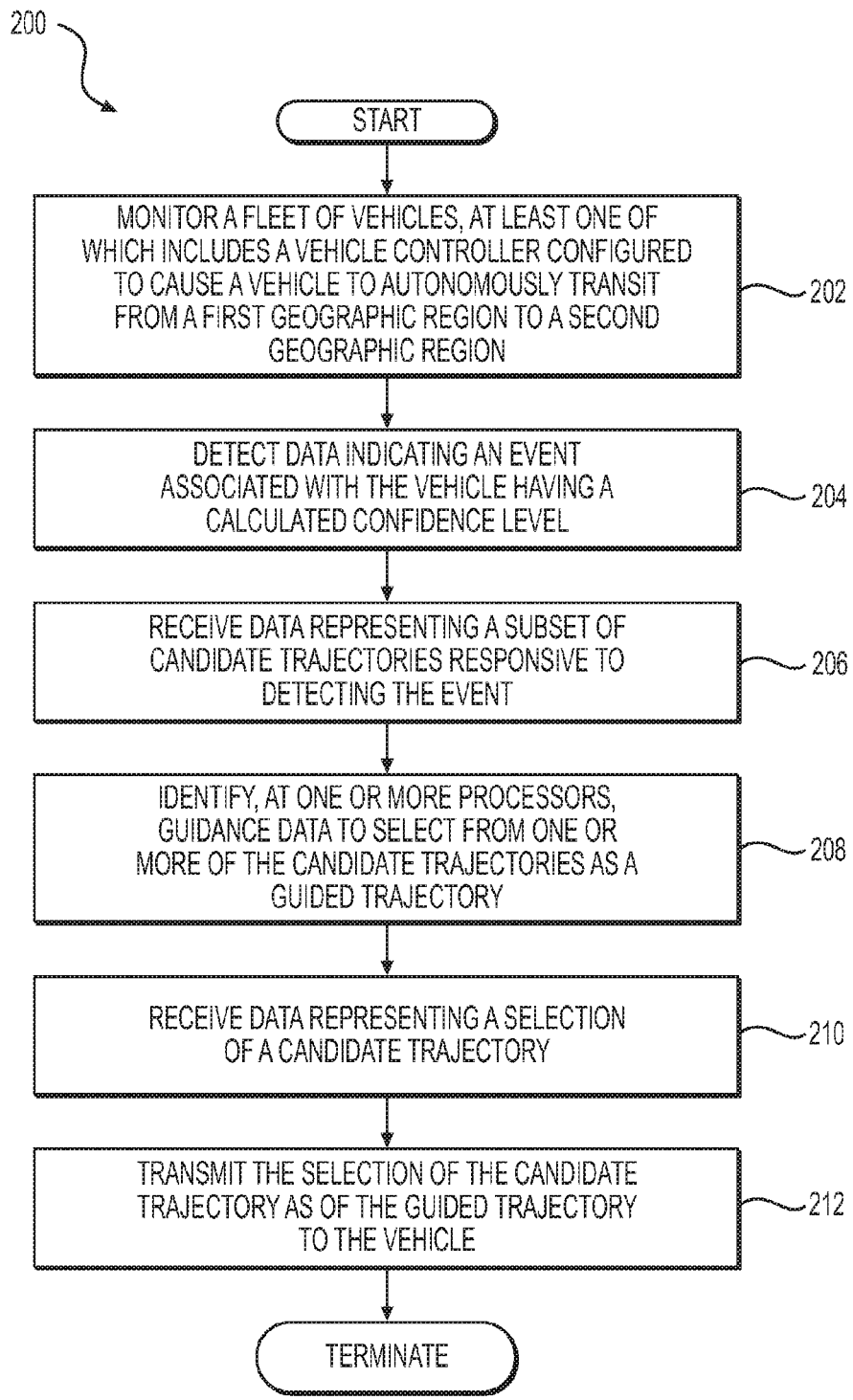
FIG. 2 is an example of a flow diagram to monitor a fleet of autonomous vehicles, according to some embodiments.

In some cases, the bidirectional nature of bidirectional autonomous vehicle 130 provides for a vehicle that has quad portions 194 (or any other number of symmetric portions) that are similar or are substantially similar to each other. Such symmetry reduces complexity of design and decreases relatively the number of unique components or structures, thereby reducing inventory and manufacturing complexities. For example, a drivetrain and wheel system may be disposed in any of the quad portions 194. Further, autonomous vehicle controller 147 is configured to invoke teleoperation services to reduce the likelihood that an autonomous vehicle 109 is delayed in transit while resolving an event or issue that may otherwise affect the safety of the occupants. In some cases, the visible portion of road network 110 depicts a geo-fenced region that may limit or otherwise control the movement of autonomous vehicles 109 to the road network shown in FIG. 1. According to various examples, autonomous vehicle 109, and a fleet thereof, may be configurable to operate as a level 4 ("full self-driving automation," or L4) vehicle that can provide transportation on demand with the convenience and privacy of point-to-point personal mobility while providing the efficiency of shared vehicles. In some examples, autonomous vehicle 109, or any autonomous vehicle described herein, may be configured to omit a steering wheel or any other mechanical means of providing manual (i.e., human-controlled) steering for autonomous vehicle 109. Further, autonomous vehicle 109, or any autonomous vehicle described herein, may be configured to omit a seat or location reserved within the vehicle for an occupant to engage a steering wheel or any mechanical interface for a steering system FIG. 2 is an example of a flow diagram to monitor a fleet of autonomous vehicles, according to some embodiments. At 202, flow 200 begins when a fleet of autonomous vehicles are monitored. At least one autonomous vehicle includes an autonomous vehicle controller configured to cause the vehicle to autonomously transit from a first geographic region to a second geographic region. At 204, data representing an event associated with a calculated confidence level for a vehicle is detected. An event may be a condition or situation affecting operation, or potentially affecting operation, of an autonomous vehicle. The events may be internal to an autonomous vehicle, or external. For example, an obstacle obscuring a roadway may be viewed as an event, as well as a reduction or loss of communication. An event may include traffic conditions or congestion, as well as unexpected or unusual numbers or types of external objects (or tracks) that are perceived by a perception engine. An event may include weather-related conditions (e.g., loss of friction due to ice or rain) or the angle at which the sun is shining (e.g., at sunset), such as low angle to the horizon that cause sun to shine brightly in the eyes of human drivers of other vehicles. These and other conditions may be viewed as events that cause invocation of the teleoperator service or for the vehicle to execute a safe-stop trajectory.

At 206, data representing a subset of candidate trajectories may be received from an autonomous vehicle responsive to the detection of the event. For example, a planner of an autonomous vehicle controller may calculate and evaluate large numbers of trajectories (e.g., thousands or greater) per unit time, such as a second. In some embodiments, candidate trajectories are a subset of the trajectories that provide for relatively higher confidence levels that an autonomous vehicle may move forward safely in view of the event (e.g., using an alternate path provided by a teleoperator). Note that some candidate trajectories may be ranked or associated with higher degrees of confidence than other candidate trajectories. According to some examples, subsets of candidate trajectories may originate from any number of sources, such as a planner, a teleoperator computing device (e.g., teleoperators can determine and provide approximate paths), etc., and may be combined as a superset of candidate trajectories. At 208, path guidance data may be identified at one or more processors. The path guidance data may be configured to assist a teleoperator in selecting a guided trajectory from one or more of the candidate trajectories. In some instances, the path guidance data specifies a value indicative of a confidence level or probability that indicates the degree of certainty that a particular candidate trajectory may reduce or negate the probability that the event may impact operation of an autonomous vehicle. A guided trajectory, as a selected candidate trajectory, may be received at 210, responsive to input from a teleoperator (e.g., a teleoperator may select at least one candidate trajectory as a guided trajectory from a group of differently-ranked candidate trajectories). The selection may be made via an operator interface that lists a number of candidate trajectories, for example, in order from highest confidence levels to lowest confidence levels. At 212, the selection of a candidate trajectory as a guided trajectory may be transmitted to the vehicle, which, in turn, implements the guided trajectory for resolving the condition by causing the vehicle to perform a teleoperator-specified maneuver. As such, the autonomous vehicle may transition from a non-normative operational state.

Figure 3A:
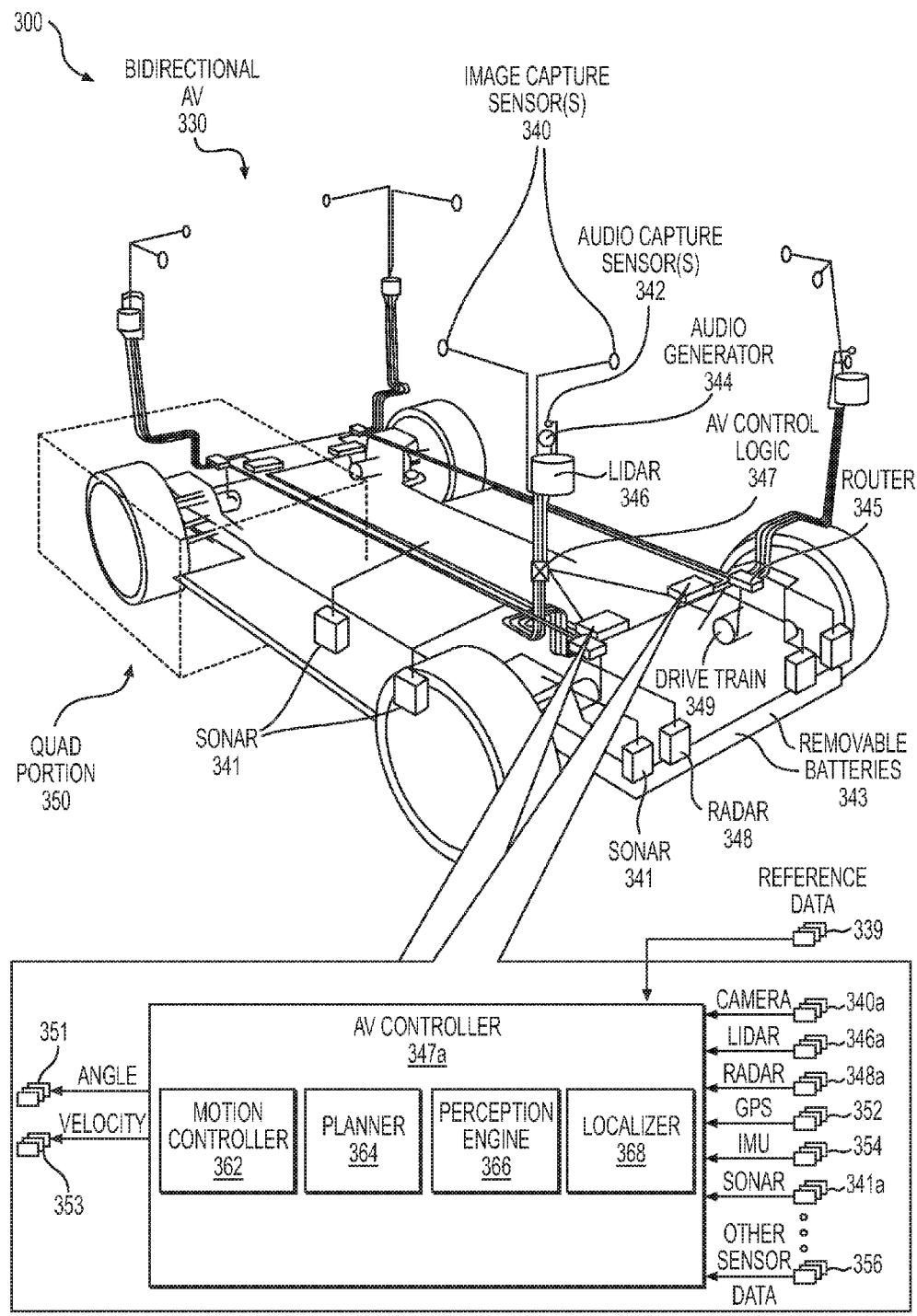
FIG. 3A is a diagram depicting examples of sensors and other autonomous vehicle components, according to some examples.

FIG. 3A is a diagram depicting examples of sensors and other autonomous vehicle components, according to some examples. Diagram 300 depicts an interior view of a bidirectional autonomous vehicle 330 that includes sensors, signal routers 345, drive trains 349, removable batteries 343, audio generators 344 (e.g., speakers or transducers), and autonomous vehicle ("AV") control logic 347. Sensors shown in diagram 300 include image capture sensors 340 (e.g., light capture devices or cameras of any type), audio capture sensors 342 (e.g., microphones of any type), radar devices 348, sonar devices 341 (or other like sensors, including ultrasonic sensors or acoustic-related sensors), and Lidar devices 346, among other sensor types and modalities (some of which are not shown, such inertial measurement units, or "IMUs," global positioning system ("GPS") sensors, sonar sensors, etc.). Note that quad portion 350 is representative of the symmetry of each of four "quad portions" of bidirectional autonomous vehicle 330 (e.g., each quad portion 350 may include a wheel, a drivetrain 349, similar steering mechanisms, similar structural support and members, etc. beyond that which is depicted). As depicted in FIG. 3A, similar sensors may be placed in similar locations in each quad portion 350, however any other configuration may implemented. Each wheel may be steerable individually and independent of the others. Note, too, that removable batteries 343 may be configured to facilitate being swapped in and swapped out rather than charging in situ, thereby ensuring reduced or negligible downtimes due to the necessity of charging batteries 343. While autonomous vehicle controller 347a is depicted as being used in a bidirectional autonomous vehicle 330, autonomous vehicle controller 347a is not so limited and may be implemented in unidirectional autonomous vehicles or any other type of vehicle, whether on land, in air, or at sea. Note that the depicted and described positions, locations, orientations, quantities, and types of sensors shown in FIG. 3A are not intended to be limiting, and, as such, there may be any number and type of sensor, and any sensor may be located and oriented anywhere on autonomous vehicle 330.

According to some embodiments, portions of the autonomous vehicle ("AV") control logic 347 may be implemented using clusters of graphics processing units ("GPUs") implementing a framework and programming model suitable for programming the clusters of GPUs. For example, a compute unified device architecture ("CUDA")-compatible programming language and application programming interface ("API") model may be used to program the GPUs. CUDA™ is produced and maintained by NVIDIA of Santa Clara, Calif. Note that other programming languages may be implemented, such as OpenCL, or any other parallel programming language.

According to some embodiments, autonomous vehicle control logic 347 may be implemented in hardware and/or software as autonomous vehicle controller 347a, which is shown to include a motion controller 362, a planner 364, a perception engine 366, and a localizer 368. As shown, autonomous vehicle controller 347a is configured to receive camera data 340a, Lidar data 346a, and radar data 348a, or any other range-sensing or localization data, including sonar data 341a or the like. Autonomous vehicle controller 347a is also configured to receive positioning data, such as GPS data 352, IMU data 354, and other position-sensing data (e.g., wheel-related data, such as steering angles, angular velocity, etc.). Further, autonomous vehicle controller 347a may receive any other sensor data 356, as well as reference data 339. In some cases, reference data 339 includes map data (e.g., 3D map data, 2D map data, 4D map data (e.g., including Epoch Determination)) and route data (e.g., road network data, including, but not limited to, RNDF data (or similar data), MDF data (or similar data), etc.

Localizer 368 is configured to receive sensor data from one or more sources, such as GPS data 352, wheel data, IMU data 354, Lidar data 346a, camera data 340a, radar data 348a, and the like, as well as reference data 339 (e.g., 3D map data and route data). Localizer 368 integrates (e.g., fuses the sensor data) and analyzes the data by comparing sensor data to map data to determine a local pose (or position) of bidirectional autonomous vehicle 330. According to some examples, localizer 368 may generate or update the pose or position of any autonomous vehicle in real-time or near real-time. Note that localizer 368 and its functionality need not be limited to "bi-directional" vehicles and can be implemented in any vehicle of any type. Therefore, localizer 368 (as well as other components of AV controller 347a) may be implemented in a "uni-directional" vehicle or any non-autonomous vehicle. According to some embodiments, data describing a local pose may include one or more of an x-coordinate, a y-coordinate, a z-coordinate (or any coordinate of any coordinate system, including polar or cylindrical coordinate systems, or the like), a yaw value, a roll value, a pitch value (e.g., an angle value), a rate (e.g., velocity), altitude, and the like.

Perception engine 366 is configured to receive sensor data from one or more sources, such as Lidar data 346a, camera data 340a, radar data 348a, and the like, as well as local pose data. Perception engine 366 may be configured to determine locations of external objects based on sensor data and other data. External objects, for instance, may be objects that are not part of a drivable surface. For example, perception engine 366 may be able to detect and classify external objects as pedestrians, bicyclists, dogs, other vehicles, etc. (e.g., perception engine 366 is configured to classify the objects in accordance with a type of classification, which may be associated with semantic information, including a label). Based on the classification of these external objects, the external objects may be labeled as dynamic objects or static objects. For example, an external object classified as a tree may be labeled as a static object, while an external object classified as a pedestrian may be labeled as a static object. External objects labeled as static may or may not be described in map data. Examples of external objects likely to be labeled as static include traffic cones, cement barriers arranged across a roadway, lane closure signs, newly-placed mailboxes or trash cans adjacent a roadway, etc. Examples of external objects likely to be labeled as dynamic include bicyclists, pedestrians, animals, other vehicles, etc. If the external object is labeled as dynamic, and further data about the external object may indicate a typical level of activity and velocity, as well as behavior patterns associated with the classification type. Further data about the external object may be generated by tracking the external object. As such, the classification type can be used to predict or otherwise determine the likelihood that an external object may, for example, interfere with an autonomous vehicle traveling along a planned path. For example, an external object that is classified as a pedestrian may be associated with some maximum speed, as well as an average speed (e.g., based on tracking data). The velocity of the pedestrian relative to the velocity of an autonomous vehicle can be used to determine if a collision is likely. Further, perception engine 364 may determine a level of uncertainty associated with a current and future state of objects. In some examples, the level of uncertainty may be expressed as an estimated value (or probability).

Planner 364 is configured to receive perception data from perception engine 366, and may also include localizer data from localizer 368. According to some examples, the perception data may include an obstacle map specifying static and dynamic objects located in the vicinity of an autonomous vehicle, whereas the localizer data may include a local pose or position. In operation, planner 364 generates numerous trajectories, and evaluates the trajectories, based on at least the location of the autonomous vehicle against relative locations of external dynamic and static objects. Planner 364 selects an optimal trajectory based on a variety of criteria over which to direct the autonomous vehicle in way that provides for collision-free travel. In some examples, planner 364 may be configured to calculate the trajectories as probabilistically-determined trajectories. Further, planner 364 may transmit steering and propulsion commands (as well as decelerating or braking commands) to motion controller 362. Motion controller 362 subsequently may convert any of the commands, such as a steering command, a throttle or propulsion command, and a braking command, into control signals (e.g., for application to actuators or other mechanical interfaces) to implement changes in steering or wheel angles 351 and/or velocity 353.

Figure 3B:
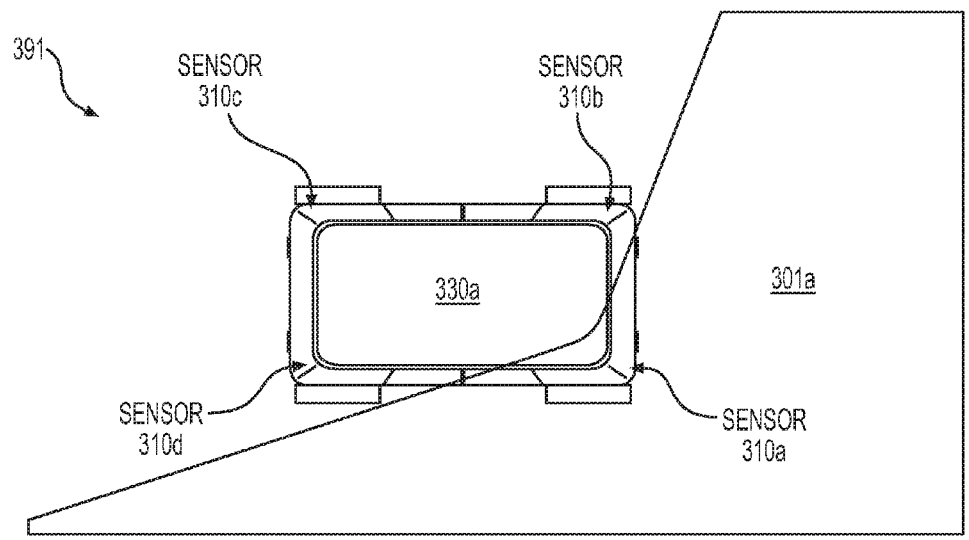
FIGS. 3B to 3E are diagrams depicting examples of sensor field redundancy and autonomous vehicle adaption to a loss of a sensor field, according to some examples.
Figure 3C:
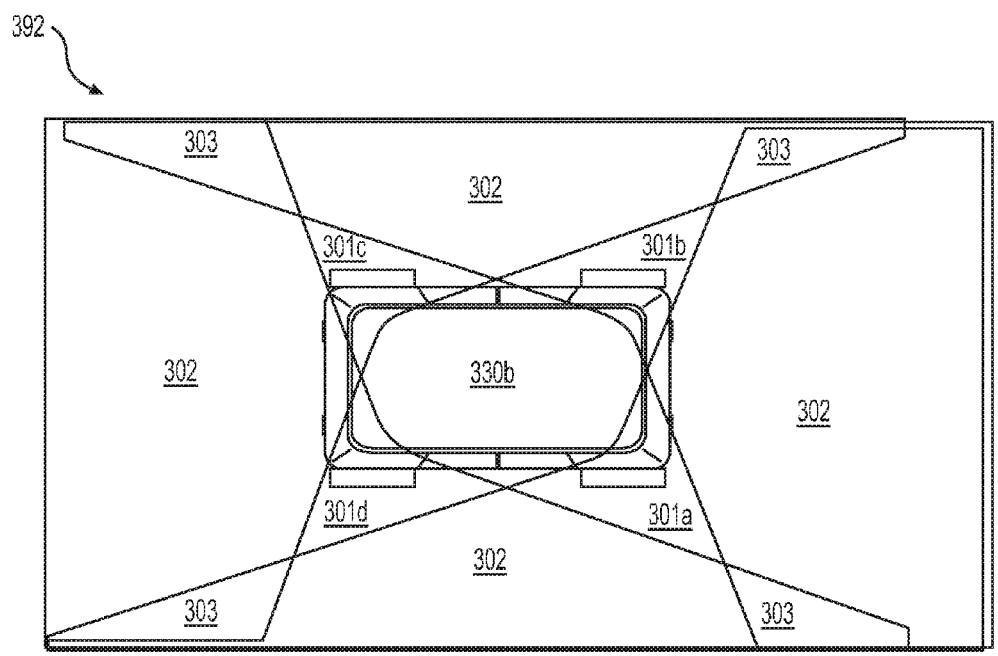

FIGS. 3B to 3E are diagrams depicting examples of sensor field redundancy and autonomous vehicle adaption to a loss of a sensor field, according to some examples. Diagram 391 of FIG. 3B depicts a sensor field 301a in which sensor 310a detects objects (e.g., for determining range or distance, or other information). While sensor 310a may implement any type of sensor or sensor modality, sensor 310a and similarly-described sensors, such as sensors 310b, 310c, and 310d, may include Lidar devices. Therefore, sensor fields 301a, 301b, 301c, and 301d each includes a field into which lasers extend. Diagram 392 of FIG. 3C depicts four overlapping sensor fields each of which is generated by a corresponding Lidar sensor 310 (not shown). As shown, portions 301 of the sensor fields include no overlapping sensor fields (e.g., a single Lidar field), portions 302 of the sensor fields include two overlapping sensor fields, and portions 303 include three overlapping sensor fields, whereby such sensors provide for multiple levels of redundancy should a Lidar sensor fail.

Figure 3D:
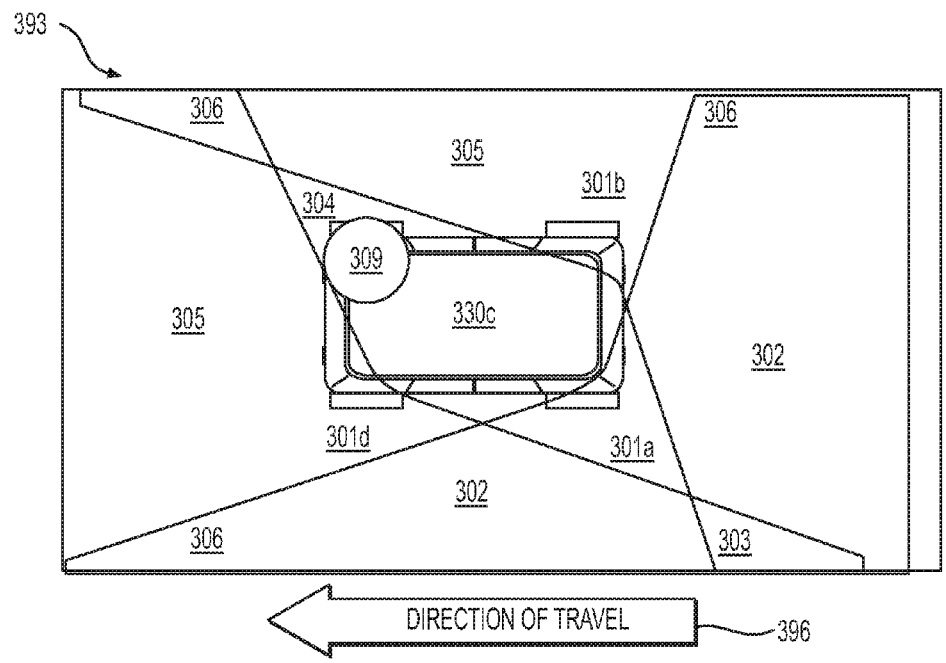
Figure 3E:
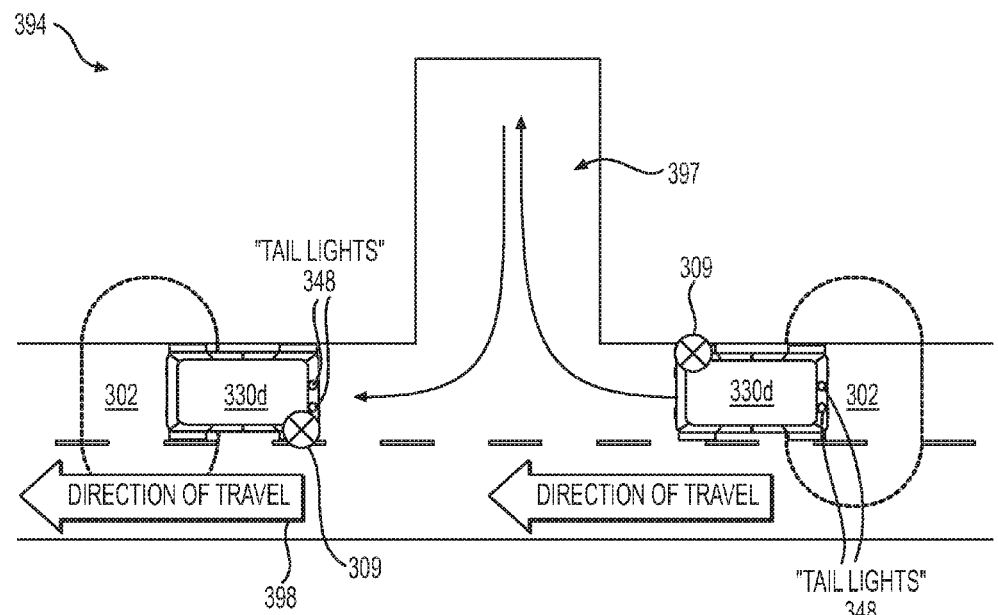

FIG. 3D depicts a loss of a sensor field due to failed operation of Lidar 309, according to some examples. Sensor field 302 of FIG. 3C is transformed into a single sensor field 305, one of sensor fields 301 of FIG. 3C is lost to a gap 304, and three of sensor fields 303 of FIG. 3C are transformed into sensor fields 306 (i.e., limited to two overlapping fields). Should autonomous car 330c be traveling in the direction of travel 396, the sensor field in front of the moving autonomous vehicle may be less robust than the one at the trailing end portion. According to some examples, an autonomous vehicle controller (not shown) is configured to leverage the bidirectional nature of autonomous vehicle 330c to address the loss of sensor field at the leading area in front of the vehicle. FIG. 3E depicts a bidirectional maneuver for restoring a certain robustness of the sensor field in front of autonomous vehicle 330d. As shown, a more robust sensor field 302 is disposed at the rear of the vehicle 330d coextensive with taillights 348. When convenient, autonomous vehicle 330d performs a bidirectional maneuver by pulling into a driveway 397 and switches its directionality such that taillights 348 actively switch to the other side (e.g., the trailing edge) of autonomous vehicle 330d. As shown, autonomous vehicle 330d restores a robust sensor field 302 in front of the vehicle as it travels along direction of travel 398. Further, the above-described bidirectional maneuver obviates a requirement for a more complicated maneuver that requires backing up into a busy roadway.

Figure 4:
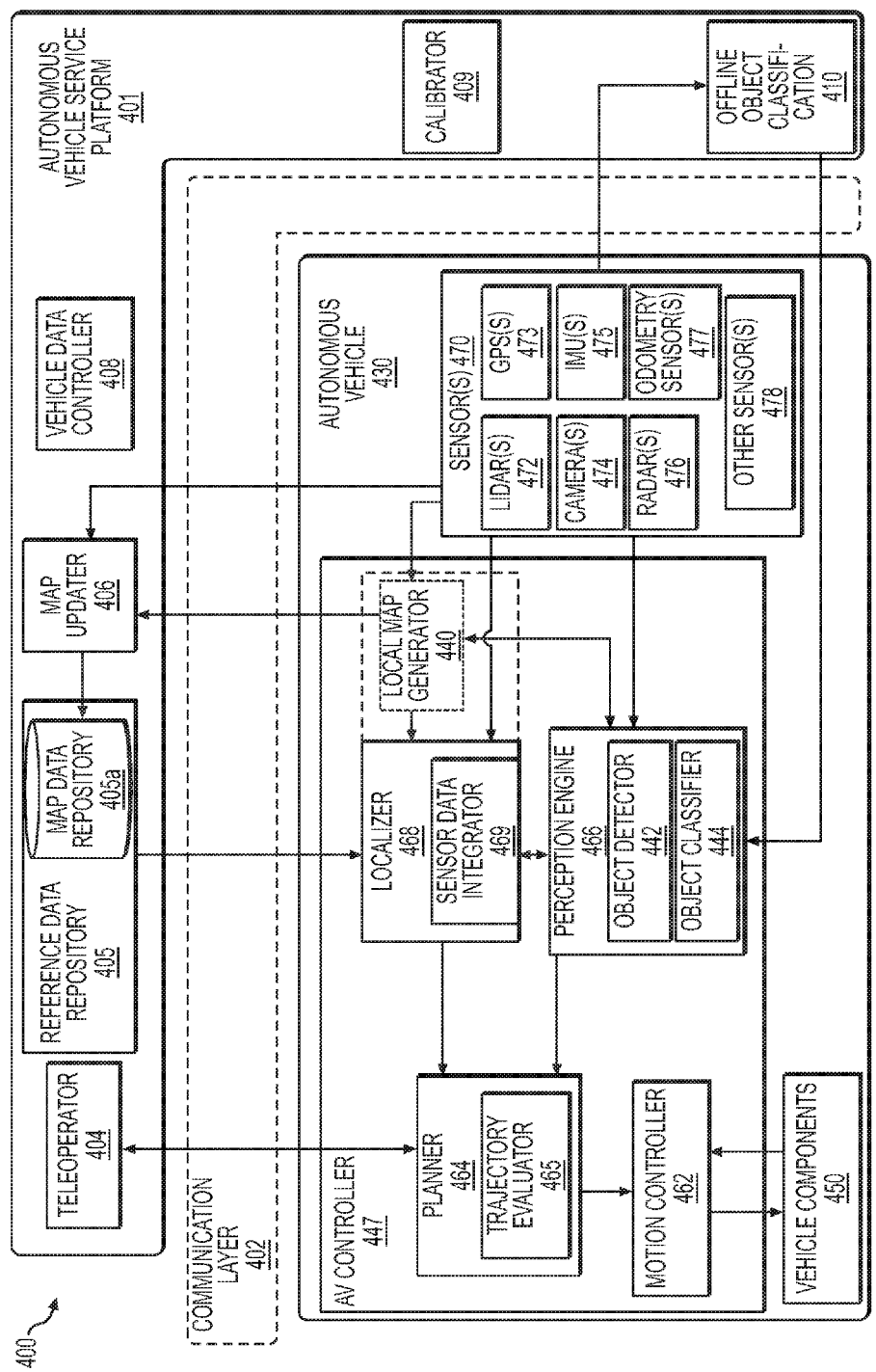
FIG. 4 is a functional block diagram depicting a system including an autonomous vehicle service platform that is communicatively coupled via a communication layer to an autonomous vehicle controller, according to some examples.

FIG. 4 is a functional block diagram depicting a system including an autonomous vehicle service platform that is communicatively coupled via a communication layer to an autonomous vehicle controller, according to some examples. Diagram 400 depicts an autonomous vehicle controller ("AV") 447 disposed in an autonomous vehicle 430, which, in turn, includes a number of sensors 470 coupled to autonomous vehicle controller 447. Sensors 470 include one or more Lidar devices 472, one or more cameras 474, one or more radars 476, one or more global positioning system ("GPS") data receiver-sensors, one or more inertial measurement units ("IMUs") 475, one or more odometry sensors 477 (e.g., wheel encoder sensors, wheel speed sensors, and the like), and any other suitable sensors 478, such as infrared cameras or sensors, hyperspectral-capable sensors, ultrasonic sensors (or any other acoustic energy-based sensor), radio frequency-based sensors, etc. In some cases, wheel angle sensors configured to sense steering angles of wheels may be included as odometry sensors 477 or suitable sensors 478. In a non-limiting example, autonomous vehicle controller 447 may include four or more Lidars 472, sixteen or more cameras 474 and four or more radar units 476. Further, sensors 470 may be configured to provide sensor data to components of autonomous vehicle controller 447 and to elements of autonomous vehicle service platform 401. As shown in diagram 400, autonomous vehicle controller 447 includes a planner 464, a motion controller 462, a localizer 468, a perception engine 466, and a local map generator 440. Note that elements depicted in diagram 400 of FIG. 4 may include structures and/or functions as similarly-named elements described in connection to one or more other drawings.

Localizer 468 is configured to localize autonomous vehicle (i.e., determine a local pose) relative to reference data, which may include map data, route data (e.g., road network data, such as RNDF-like data), and the like. In some cases, localizer 468 is configured to identify, for example, a point in space that may represent a location of autonomous vehicle 430 relative to features of a representation of an environment. Localizer 468 is shown to include a sensor data integrator 469, which may be configured to integrate multiple subsets of sensor data (e.g., of different sensor modalities) to reduce uncertainties related to each individual type of sensor. According to some examples, sensor data integrator 469 is configured to fuse sensor data (e.g., Lidar data, camera data, radar data, etc.) to form integrated sensor data values for determining a local pose. According to some examples, localizer 468 retrieves reference data originating from a reference data repository 405, which includes a map data repository 405a for storing 2D map data, 3D map data, 4D map data, and the like. Localizer 468 may be configured to identify at least a subset of features in the environment to match against map data to identify, or otherwise confirm, a pose of autonomous vehicle 430. According to some examples, localizer 468 may be configured to identify any amount of features in an environment, such that a set of features can one or more features, or all features. In a specific example, any amount of Lidar data (e.g., most or substantially all Lidar data) may be compared against data representing a map for purposes of localization. Generally, non-matched objects resulting from the comparison of the environment features and map data may be a dynamic object, such as a vehicle, bicyclist, pedestrian, etc. Note that detection of dynamic objects, including obstacles, may be performed with or without map data. In particular, dynamic objects may be detected and tracked independently of map data (i.e., in the absence of map data). In some instances, 2D map data and 3D map data may be viewed as "global map data" or map data that has been validated at a point in time by autonomous vehicle service platform 401. As map data in map data repository 405a may be updated and/or validated periodically, a deviation may exist between the map data and an actual environment in which the autonomous vehicle is positioned. Therefore, localizer 468 may retrieve locally-derived map data generated by local map generator 440 to enhance localization. Local map generator 440 is configured to generate local map data in real-time or near real-time. Optionally, local map generator 440 may receive static and dynamic object map data to enhance the accuracy of locally generated maps by, for example, disregarding dynamic objects in localization. According to at least some embodiments, local map generator 440 may be integrated with, or formed as part of, localizer 468. In at least one case, local map generator 440, either individually or in collaboration with localizer 468, may be configured to generate map and/or reference data based on simultaneous localization and mapping ("SLAM") or the like. Note that localizer 468 may implement a "hybrid" approach to using map data, whereby logic in localizer 468 may be configured to select various amounts of map data from either map data repository 405a or local map data from local map generator 440, depending on the degrees of reliability of each source of map data. Therefore, localizer 468 may still use out-of-date map data in view of locally-generated map data.

Perception engine 466 is configured to, for example, assist planner 464 in planning routes and generating trajectories by identifying objects of interest in a surrounding environment in which autonomous vehicle 430 is transiting. Further, probabilities may be associated with each of the object of interest, whereby a probability may represent a likelihood that an object of interest may be a threat to safe travel (e.g., a fast-moving motorcycle may require enhanced tracking rather than a person sitting at a bus stop bench while reading a newspaper). As shown, perception engine 466 includes an object detector 442 and an object classifier 444. Object detector 442 is configured to distinguish objects relative to other features in the environment, and object classifier 444 may be configured to classify objects as either dynamic or static objects and track the locations of the dynamic and the static objects relative to autonomous vehicle 430 for planning purposes. Further, perception engine 466 may be configured to assign an identifier to a static or dynamic object that specifies whether the object is (or has the potential to become) an obstacle that may impact path planning at planner 464. Although not shown in FIG. 4, note that perception engine 466 may also perform other perception-related functions, such as segmentation and tracking, examples of which are described below.

Planner 464 is configured to generate a number of candidate trajectories for accomplishing a goal to reaching a destination via a number of paths or routes that are available. Trajectory evaluator 465 is configured to evaluate candidate trajectories and identify which subsets of candidate trajectories are associated with higher degrees of confidence levels of providing collision-free paths to the destination. As such, trajectory evaluator 465 can select an optimal trajectory based on relevant criteria for causing commands to generate control signals for vehicle components 450 (e.g., actuators or other mechanisms). Note that the relevant criteria may include any number of factors that define optimal trajectories, the selection of which need not be limited to reducing collisions. For example, the selection of trajectories may be made to optimize user experience (e.g., user comfort) as well as collision-free trajectories that comply with traffic regulations and laws. User experience may be optimized by moderating accelerations in various linear and angular directions (e.g., to reduce jerking-like travel or other unpleasant motion). In some cases, at least a portion of the relevant criteria can specify which of the other criteria to override or supersede, while maintain optimized, collision-free travel. For example, legal restrictions may be temporarily lifted or deemphasized when generating trajectories in limited situations (e.g., crossing double yellow lines to go around a cyclist or travelling at higher speeds than the posted speed limit to match traffic flows). As such, the control signals are configured to cause propulsion and directional changes at the drivetrain and/or wheels. In this example, motion controller 462 is configured to transform commands into control signals (e.g., velocity, wheel angles, etc.) for controlling the mobility of autonomous vehicle 430. In the event that trajectory evaluator 465 has insufficient information to ensure a confidence level high enough to provide collision-free, optimized travel, planner 464 can generate a request to teleoperator 404 for teleoperator support.

Autonomous vehicle service platform 401 includes teleoperator 404 (e.g., a teleoperator computing device), reference data repository 405, a map updater 406, a vehicle data controller 408, a calibrator 409, and an off-line object classifier 410. Note that each element of autonomous vehicle service platform 401 may be independently located or distributed and in communication with other elements in autonomous vehicle service platform 401. Further, element of autonomous vehicle service platform 401 may independently communicate with the autonomous vehicle 430 via the communication layer 402. Map updater 406 is configured to receive map data (e.g., from local map generator 440, sensors 460, or any other component of autonomous vehicle controller 447), and is further configured to detect deviations, for example, of map data in map data repository 405a from a locally-generated map. Vehicle data controller 408 can cause map updater 406 to update reference data within repository 405 and facilitate updates to 2D, 3D, and/or 4D map data. In some cases, vehicle data controller 408 can control the rate at which local map data is received into autonomous vehicle service platform 408 as well as the frequency at which map updater 406 performs updating of the map data.

Calibrator 409 is configured to perform calibration of various sensors of the same or different types. Calibrator 409 may be configured to determine the relative poses of the sensors (e.g., in Cartesian space (x, y, z)) and orientations of the sensors (e.g., roll, pitch and yaw). The pose and orientation of a sensor, such a camera, Lidar sensor, radar sensor, etc., may be calibrated relative to other sensors, as well as globally relative to the vehicle's reference frame. Off-line self-calibration can also calibrate or estimate other parameters, such as vehicle inertial tensor, wheel base, wheel radius or surface road friction. Calibration can also be done online to detect parameter change, according to some examples. Note, too, that calibration by calibrator 409 may include intrinsic parameters of the sensors (e.g., optical distortion, beam angles, etc.) and extrinsic parameters. In some cases, calibrator 409 may be performed by maximizing a correlation between depth discontinuities in 3D laser data and edges of image data, as an example. Off-line object classification 410 is configured to receive data, such as sensor data, from sensors 470 or any other component of autonomous vehicle controller 447. According to some embodiments, an off-line classification pipeline of off-line object classification 410 may be configured to pre-collect and annotate objects (e.g., manually by a human and/or automatically using an offline labeling algorithm), and may further be configured to train an online classifier (e.g., object classifier 444), which can provide real-time classification of object types during online autonomous operation.

Figure 5:
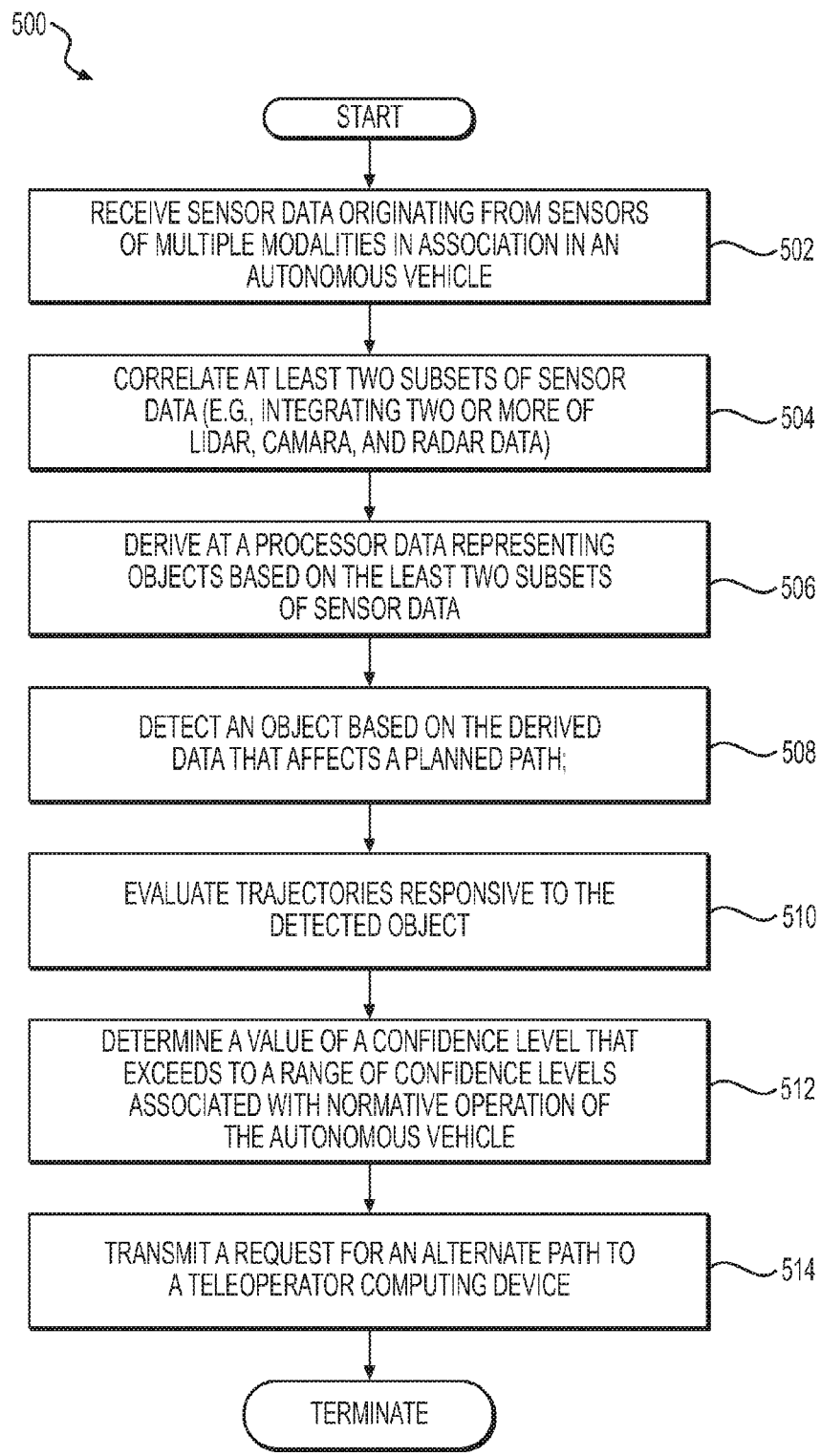
FIG. 5 is an example of a flow diagram to control an autonomous vehicle, according to some embodiments.

FIG. 5 is an example of a flow diagram to control an autonomous vehicle, according to some embodiments. At 502, flow 500 begins when sensor data originating from sensors of multiple modalities at an autonomous vehicle is received, for example, by an autonomous vehicle controller. One or more subsets of sensor data may be integrated for generating fused data to improve, for example, estimates. In some examples, a sensor stream of one or more sensors (e.g., of same or different modalities) may be fused to form fused sensor data at 504. In some examples, subsets of Lidar sensor data and camera sensor data may be fused at 504 to facilitate localization. At 506, data representing objects based on the least two subsets of sensor data may be derived at a processor. For example, data identifying static objects or dynamic objects may be derived (e.g., at a perception engine) from at least Lidar and camera data. At 508, a detected object is determined to affect a planned path, and a subset of trajectories are evaluated (e.g., at a planner) responsive to the detected object at 510. A confidence level is determined at 512 to exceed a range of acceptable confidence levels associated with normative operation of an autonomous vehicle. Therefore, in this case, a confidence level may be such that a certainty of selecting an optimized path is less likely, whereby an optimized path may be determined as a function of the probability of facilitating collision-free travel, complying with traffic laws, providing a comfortable user experience (e.g., comfortable ride), and/or generating candidate trajectories on any other factor. As such, a request for an alternate path may be transmitted to a teleoperator computing device at 514. Thereafter, the teleoperator computing device may provide a planner with an optimal trajectory over which an autonomous vehicle made travel. In situations, the vehicle may also determine that executing a safe-stop maneuver is the best course of action (e.g., safely and automatically causing an autonomous vehicle to a stop at a location of relatively low probabilities of danger). Note that the order depicted in this and other flow charts herein are not intended to imply a requirement to linearly perform various functions as each portion of a flow chart may be performed serially or in parallel with any one or more other portions of the flow chart, as well as independent or dependent on other portions of the flow chart.

Figure 6:
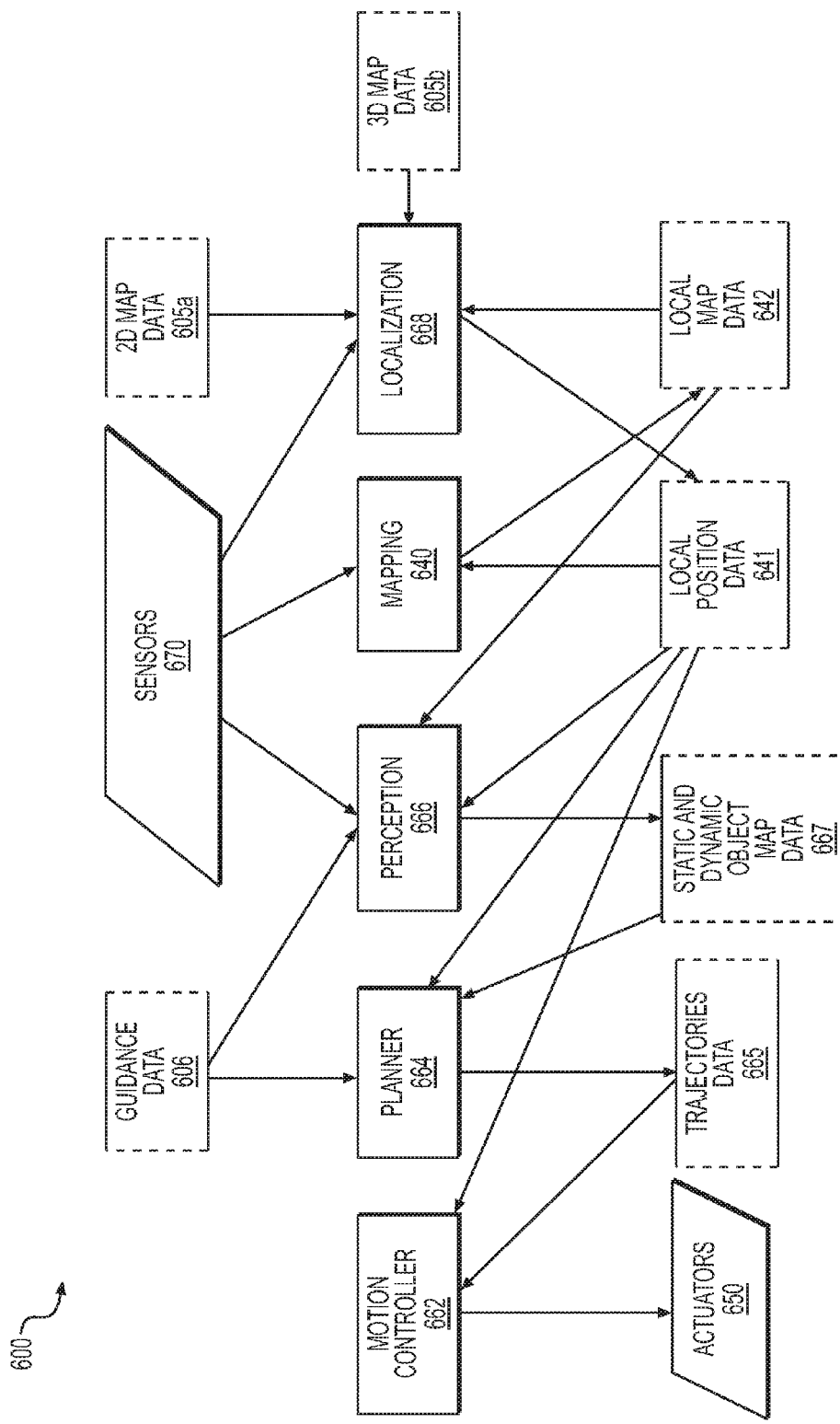
FIG. 6 is a diagram depicting an example of an architecture for an autonomous vehicle controller, according to some embodiments.

FIG. 6 is a diagram depicting an example of an architecture for an autonomous vehicle controller, according to some embodiments. Diagram 600 depicts a number of processes including a motion controller process 662, a planner processor 664, a perception process 666, a mapping process 640, and a localization process 668, some of which may generate or receive data relative to other processes. Other processes, such as such as processes 670 and 650 may facilitate interactions with one or more mechanical components of an autonomous vehicle. For example, perception process 666, mapping process 640, and localization process 668 are configured to receive sensor data from sensors 670, whereas planner process 664 and perception process 666 are configured to receive guidance data 606, which may include route data, such as road network data. Further to diagram 600, localization process 668 is configured to receive map data 605*a* (i.e., 2D map data), map data 605*b* (i.e., 3D map data), and local map data 642, among other types of map data. For example, localization process 668 may also receive other forms of map data, such as 4D map data, which may include, for example, an epoch determination. Localization process 668 is configured to generate local position data 641 representing a local pose. Local position data 641 is provided to motion controller process 662, planner process 664, and perception process 666. Perception process 666 is configured to generate static and dynamic object map data 667, which, in turn, may be transmitted to planner process 664. In some examples, static and dynamic object map data 667 may be transmitted with other data, such as semantic classification information and predicted object behavior. Planner process 664 is configured to generate trajectories data 665, which describes a number of trajectories generated by planner 664. Motion controller process uses trajectories data 665 to generate low-level commands or control signals for application to actuators 650 to cause changes in steering angles and/or velocity.

Figure 7:
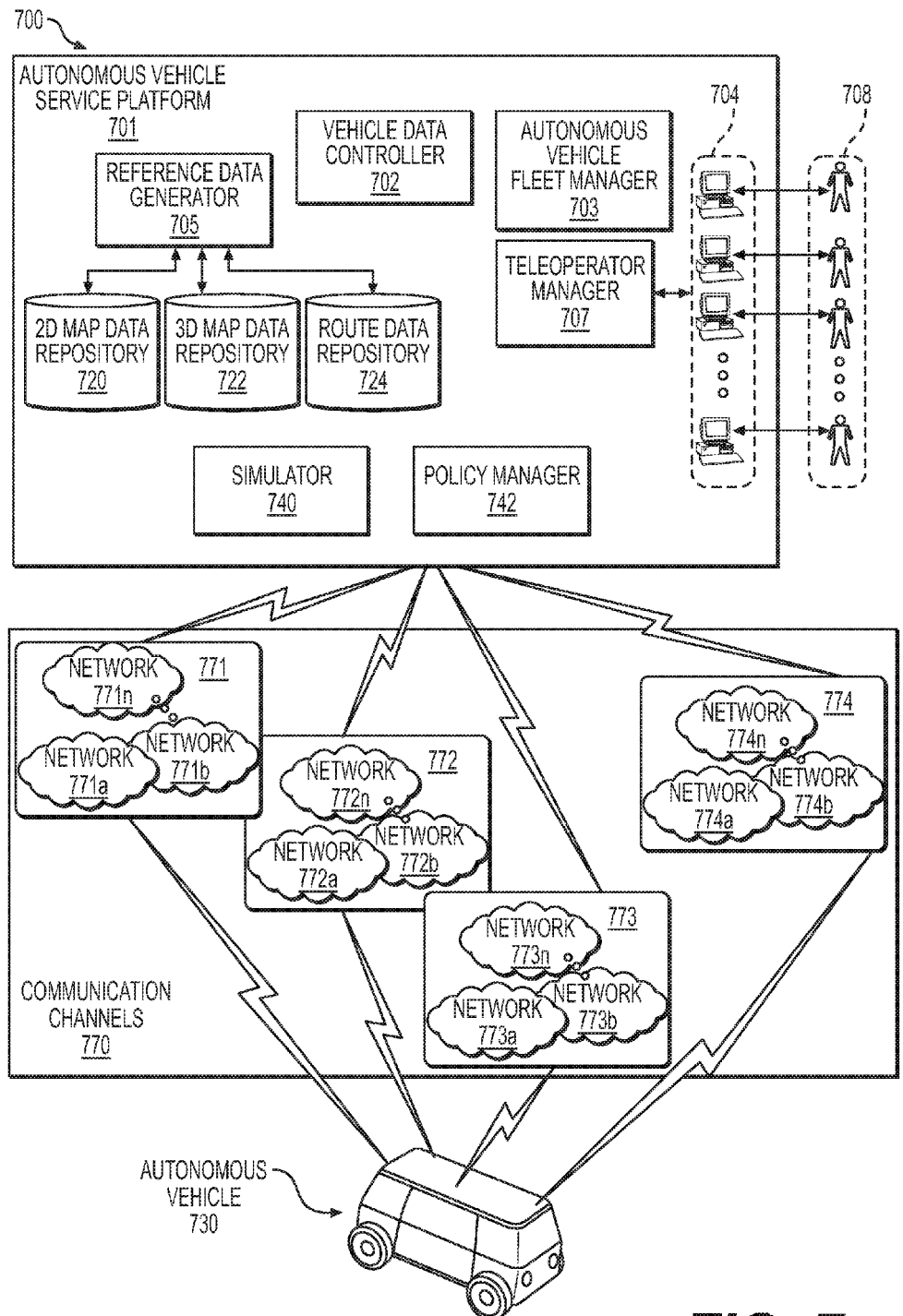
FIG. 7 is a diagram depicting an example of an autonomous vehicle service platform implementing redundant communication channels to maintain reliable communications with a fleet of autonomous vehicles, according to some embodiments.

FIG. 7 is a diagram depicting an example of an autonomous vehicle service platform implementing redundant communication channels to maintain reliable communications with a fleet of autonomous vehicles, according to some embodiments. Diagram 700 depicts an autonomous vehicle service platform 701 including a reference data generator 705, a vehicle data controller 702, an autonomous vehicle fleet manager 703, a teleoperator manager 707, a simulator 740, and a policy manager 742. Reference data generator 705 is configured to generate and modify map data and route data (e.g., RNDF data). Further, reference data generator 705 may be configured to access 2D maps in 2D map data repository 720, access 3D maps in 3D map data repository 722, and access route data in route data repository 724. Other map representation data and repositories may be implemented in some examples, such as 4D map data including Epoch Determination. Vehicle data controller 702 may be configured to perform a variety of operations. For example, vehicle data controller 702 may be configured to change a rate that data is exchanged between a fleet of autonomous vehicles and platform 701 based on quality levels of communication over channels 770. During bandwidth-constrained periods, for example, data communications may be prioritized such that teleoperation requests from autonomous vehicle 730 are prioritized highly to ensure delivery. Further, variable levels of data abstraction may be transmitted per vehicle over channels 770, depending on bandwidth available for a particular channel. For example, in the presence of a robust network connection, full Lidar data (e.g., substantially all Lidar data, but also may be less) may be transmitted, whereas in the presence of a degraded or low-speed connection, simpler or more abstract depictions of the data may be transmitted (e.g., bounding boxes with associated metadata, etc.). Autonomous vehicle fleet manager 703 is configured to coordinate the dispatching of autonomous vehicles 730 to optimize multiple variables, including an efficient use of battery power, times of travel, whether or not an air-conditioning unit in an autonomous vehicle 730 may be used during low charge states of a battery, etc., any or all of which may be monitored in view of optimizing cost functions associated with operating an autonomous vehicle service. An algorithm may be implemented to analyze a variety of variables with which to minimize costs or times of travel for a fleet of autonomous vehicles. Further, autonomous vehicle fleet manager 703 maintains an inventory of autonomous vehicles as well as parts for accommodating a service schedule in view of maximizing up-time of the fleet.

Teleoperator manager 707 is configured to manage a number of teleoperator computing devices 704 with which teleoperators 708 provide input. Simulator 740 is configured to simulate operation of one or more autonomous vehicles 730, as well as the interactions between teleoperator manager 707 and an autonomous vehicle 730. Simulator 740 may also simulate operation of a number of sensors (including the introduction of simulated noise) disposed in autonomous vehicle 730. Further, an environment, such as a city, may be simulated such that a simulated autonomous vehicle can be introduced to the synthetic environment, whereby simulated sensors may receive simulated sensor data, such as simulated laser returns. Simulator 740 may provide other functions as well, including validating software updates and/or map data. Policy manager 742 is configured to maintain data representing policies or rules by which an autonomous vehicle ought to behave in view of a variety of conditions or events that an autonomous vehicle encounters while traveling in a network of roadways. In some cases, updated policies and/or rules may be simulated in simulator 740 to confirm safe operation of a fleet of autonomous vehicles in view of changes to a policy. Some of the above-described elements of autonomous vehicle service platform 701 are further described hereinafter.

Communication channels 770 are configured to provide networked communication links among a fleet of autonomous vehicles 730 and autonomous vehicle service platform 701. For example, communication channel 770 includes a number of different types of networks 771, 772, 773, and 774, with corresponding subnetworks (e.g., 771*a* to 771*n*), to ensure a certain level of redundancy for operating an autonomous vehicle service reliably. For example, the different types of networks in communication channels 770 may include different cellular network providers, different types of data networks, etc., to ensure sufficient bandwidth in the event of reduced or lost communications due to outages in one or more networks 771, 772, 773, and 774.

Figure 8:
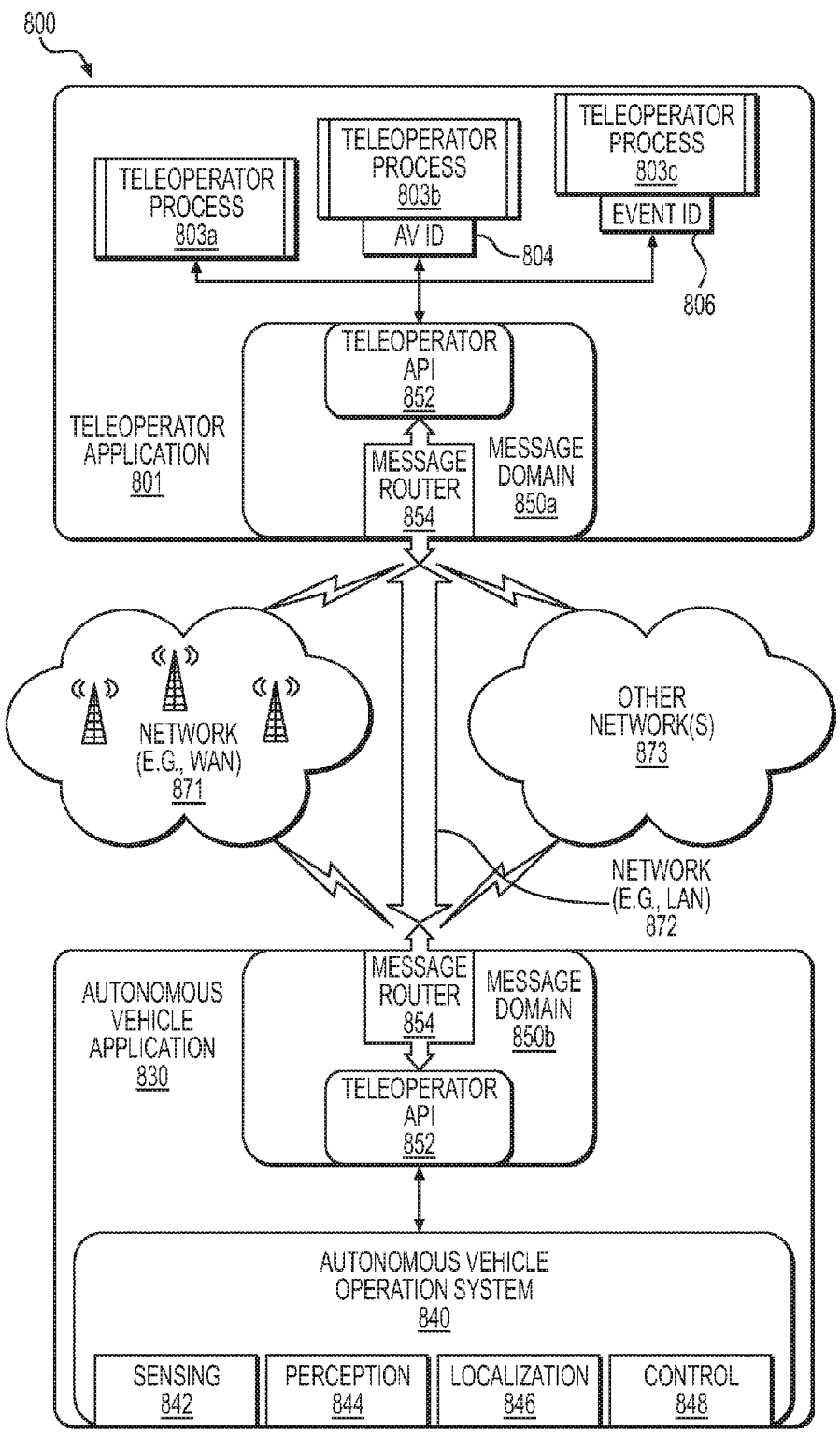
FIG. 8 is a diagram depicting an example of a messaging application configured to exchange data among various applications, according to some embodiment.

FIG. 8 is a diagram depicting an example of a messaging application configured to exchange data among various applications, according to some embodiments. Diagram 800 depicts an teleoperator application 801 disposed in a teleoperator manager, and an autonomous vehicle application 830 disposed in an autonomous vehicle, whereby teleoperator applications 801 and autonomous vehicle application 830 exchange message data via a protocol that facilitates communications over a variety of networks, such as network 871, 872, and other networks 873. According to some examples, the communication protocol is a middleware protocol implemented as a Data Distribution Service™ having a specification maintained by the Object Management Group consortium. In accordance with the communications protocol, teleoperator application 801 and autonomous vehicle application 830 may include a message router 854 disposed in a message domain, the message router being configured to interface with the teleoperator API 852. In some examples, message router 854 is a routing service. In some examples, message domain 850a in teleoperator application 801 may be identified by a teleoperator identifier, whereas message domain 850b be may be identified as a domain associated with a vehicle identifier. Teleoperator API 852 in teleoperator application 801 is configured to interface with teleoperator processes 803a to 803c, whereby teleoperator process 803b is associated with an autonomous vehicle identifier 804, and teleoperator process 803c is associated with an event identifier 806 (e.g., an identifier that specifies an intersection that may be problematic for collision-free path planning). Teleoperator API 852 in autonomous vehicle application 830 is configured to interface with an autonomous vehicle operating system 840, which includes sensing application 842, a perception application 844, a localization application 846, and a control application 848. In view of the foregoing, the above-described communications protocol may facilitate data exchanges to facilitate teleoperations as described herein. Further, the above-described communications protocol may be adapted to provide secure data exchanges among one or more autonomous vehicles and one or more autonomous vehicle service platforms. For example, message routers 854 may be configured to encrypt and decrypt messages to provide for secured interactions between, for example, a teleoperator process 803 and an autonomous vehicle operation system 840.

Figure 9:
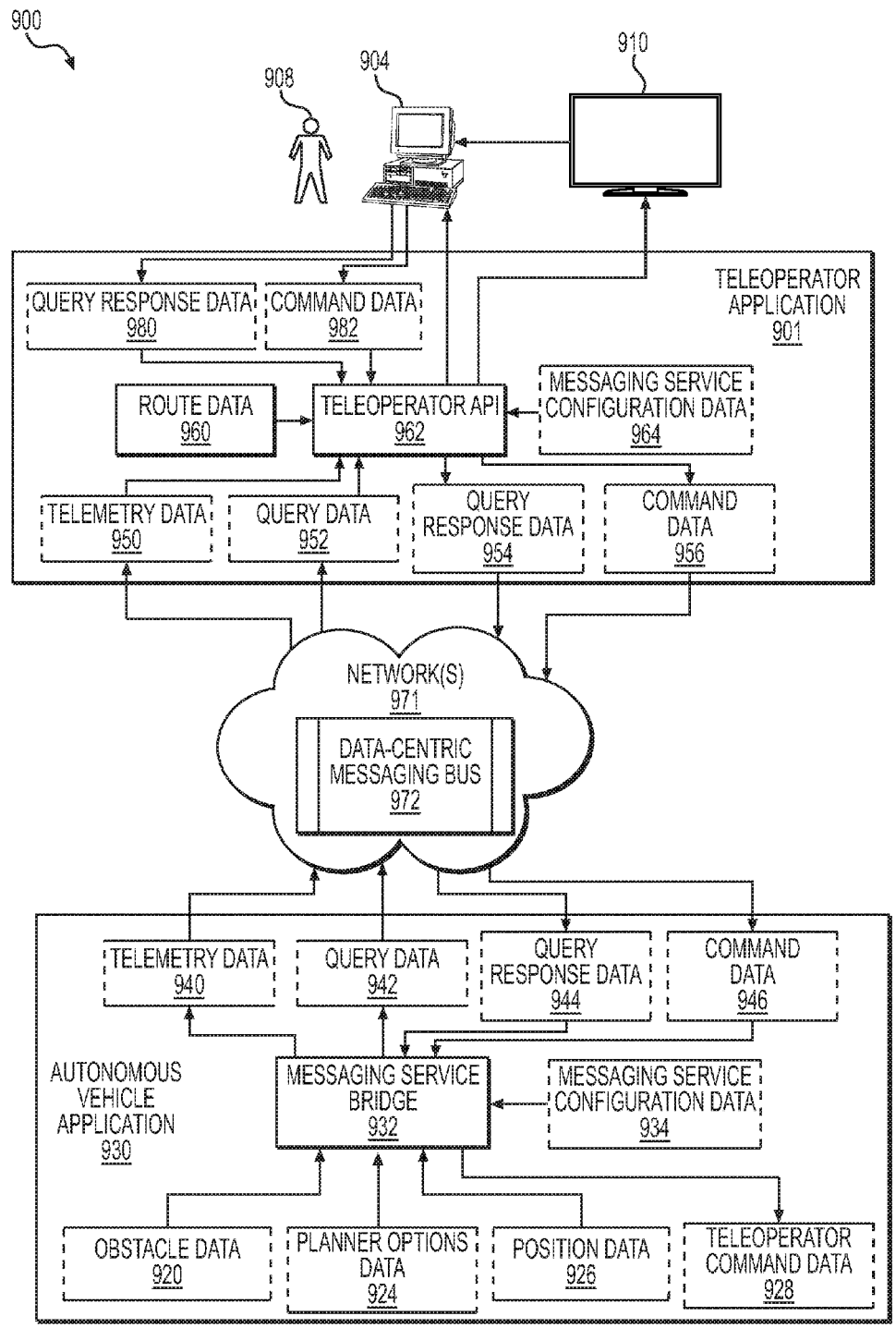
FIG. 9 is a diagram depicting types of data for facilitating teleoperations using a communications protocol described in FIG. 8, according to some examples.

FIG. 9 is a diagram depicting types of data for facilitating teleoperations using a communications protocol described in FIG. 8, according to some examples. Diagram 900 depicts a teleoperator 908 interfacing with a teleoperator computing device 904 coupled to a teleoperator application 901, which is configured to exchange data via a data-centric messaging bus 972 implemented in one or more networks 971. Data-centric messaging bus 972 provides a communication link between teleoperator application 901 and autonomous vehicle application 930. Teleoperator API 962 of teleoperator application 901 is configured to receive message service configuration data 964 and route data 960, such as road network data (e.g., RNDF-like data), mission data (e.g., MDF-data), and the like. Similarly, a messaging service bridge 932 is also configured to receive messaging service configuration data 934. Messaging service configuration data 934 and 964 provide configuration data to configure the messaging service between teleoperator application 901 and autonomous vehicle application 930. An example of messaging service configuration data 934 and 964 includes quality of service ("QoS") configuration data implemented to configure a Data Distribution Service™ application.

An example of a data exchange for facilitating teleoperations via the communications protocol is described as follows. Consider that obstacle data 920 is generated by a perception system of an autonomous vehicle controller. Further, planner options data 924 is generated by a planner to notify a teleoperator of a subset of candidate trajectories, and position data 926 is generated by the localizer. Obstacle data 920, planner options data 924, and position data 926 are transmitted to a messaging service bridge 932, which, in accordance with message service configuration data 934, generates telemetry data 940 and query data 942, both of which are transmitted via data-centric messaging bus 972 into teleoperator application 901 as telemetry data 950 and query data 952. Teleoperator API 962 receives telemetry data 950 and inquiry data 952, which, in turn are processed in view of Route data 960 and message service configuration data 964. The resultant data is subsequently presented to a teleoperator 908 via teleoperator computing device 904 and/or a collaborative display (e.g., a dashboard display visible to a group of collaborating teleoperators 908). Teleoperator 908 reviews the candidate trajectory options that are presented on the display of teleoperator computing device 904, and selects a guided trajectory, which generates command data 982 and query response data 980, both of which are passed through teleoperator API 962 as query response data 954 and command data 956. In turn, query response data 954 and command data 956 are transmitted via data-centric messaging bus 972 into autonomous vehicle application 930 as query response data 944 and command data 946. Messaging service bridge 932 receives query response data 944 and command data 946 and generates teleoperator command data 928, which is configured to generate a teleoperator-selected trajectory for implementation by a planner. Note that the above-described messaging processes are not intended to be limiting, and other messaging protocols may be implemented as well.

Figure 10:
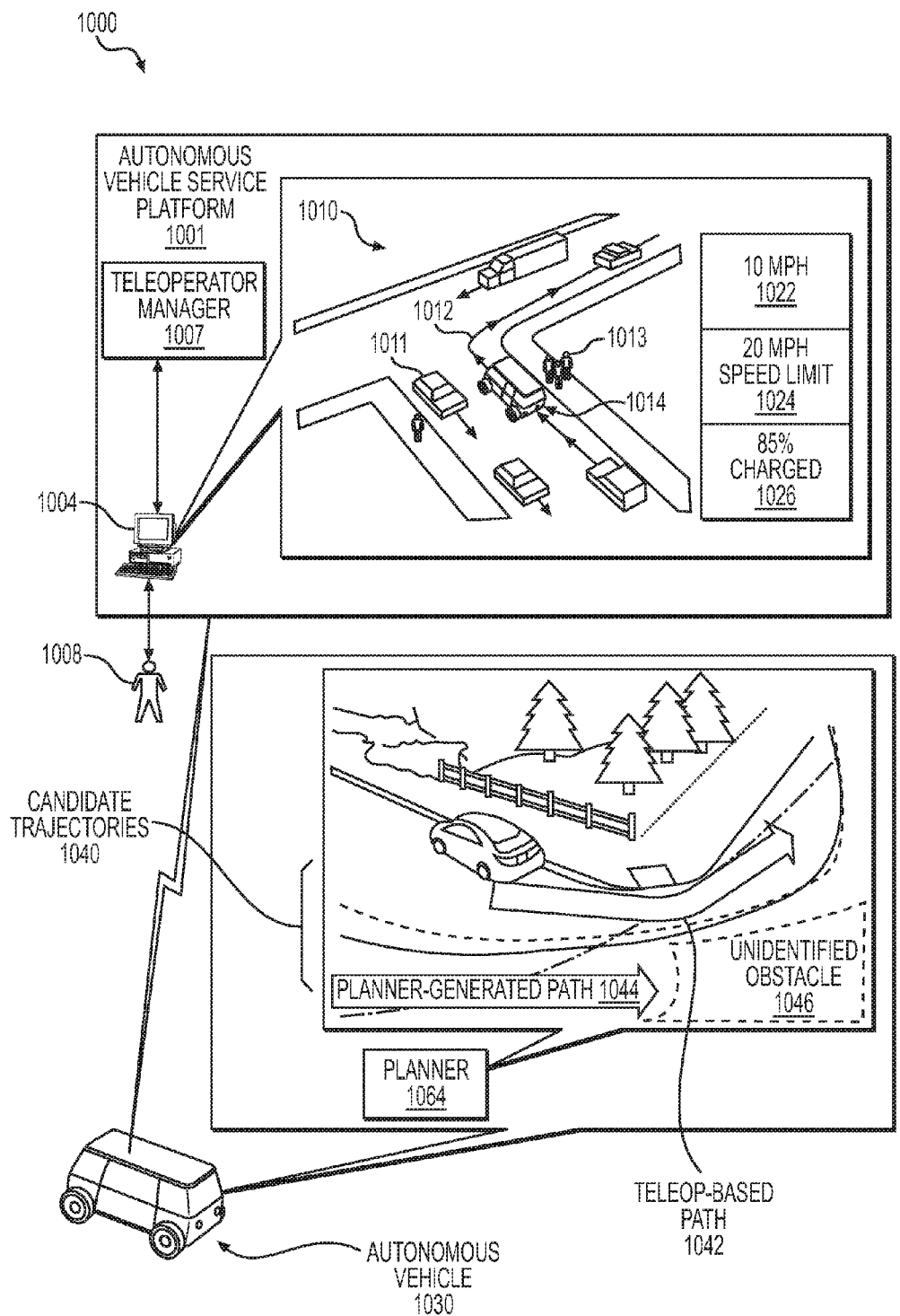
FIG. 10 is a diagram illustrating an example of a teleoperator interface with which a teleoperator may influence path planning, according to some embodiments.

FIG. 10 is a diagram illustrating an example of a teleoperator interface with which a teleoperator may influence path planning, according to some embodiments. Diagram 1000 depicts examples of an autonomous vehicle 1030 in communication with an autonomous vehicle service platform 1001, which includes a teleoperator manager 1007 configured to facilitate teleoperations. In a first example, teleoperator manager 1007 receives data that requires teleoperator 1008 to preemptively view a path of an autonomous vehicle approaching a potential obstacle or an area of low planner confidence levels so that teleoperator 1008 may be able to address an issue in advance. To illustrate, consider that an intersection that an autonomous vehicle is approaching may be tagged as being problematic. As such, user interface 1010 displays a representation 1014 of a corresponding autonomous vehicle 1030 transiting along a path 1012, which has been predicted by a number of trajectories generated by a planner. Also displayed are other vehicles 1011 and dynamic objects 1013, such as pedestrians, that may cause sufficient confusion at the planner, thereby requiring teleoperation support. User interface 1010 also presents to teleoperator 1008 a current velocity 1022, a speed limit 1024, and an amount of charge 1026 presently in the batteries. According to some examples, user interface 1010 may display other data, such as sensor data as acquired from autonomous vehicle 1030. In a second example, consider that planner 1064 has generated a number of trajectories that are coextensive with a planner-generated path 1044 regardless of a detected unidentified object 1046. Planner 1064 may also generate a subset of candidate trajectories 1040, but in this example, the planner is unable to proceed given present confidence levels. If planner 1064 fails to determine an alternative path, a teleoperation request may be transmitted. In this case, a teleoperator may select one of candidate trajectories 1040 to facilitate travel by autonomous vehicle 1030 that is consistent with teleoperator-based path 1042.

Figure 11:
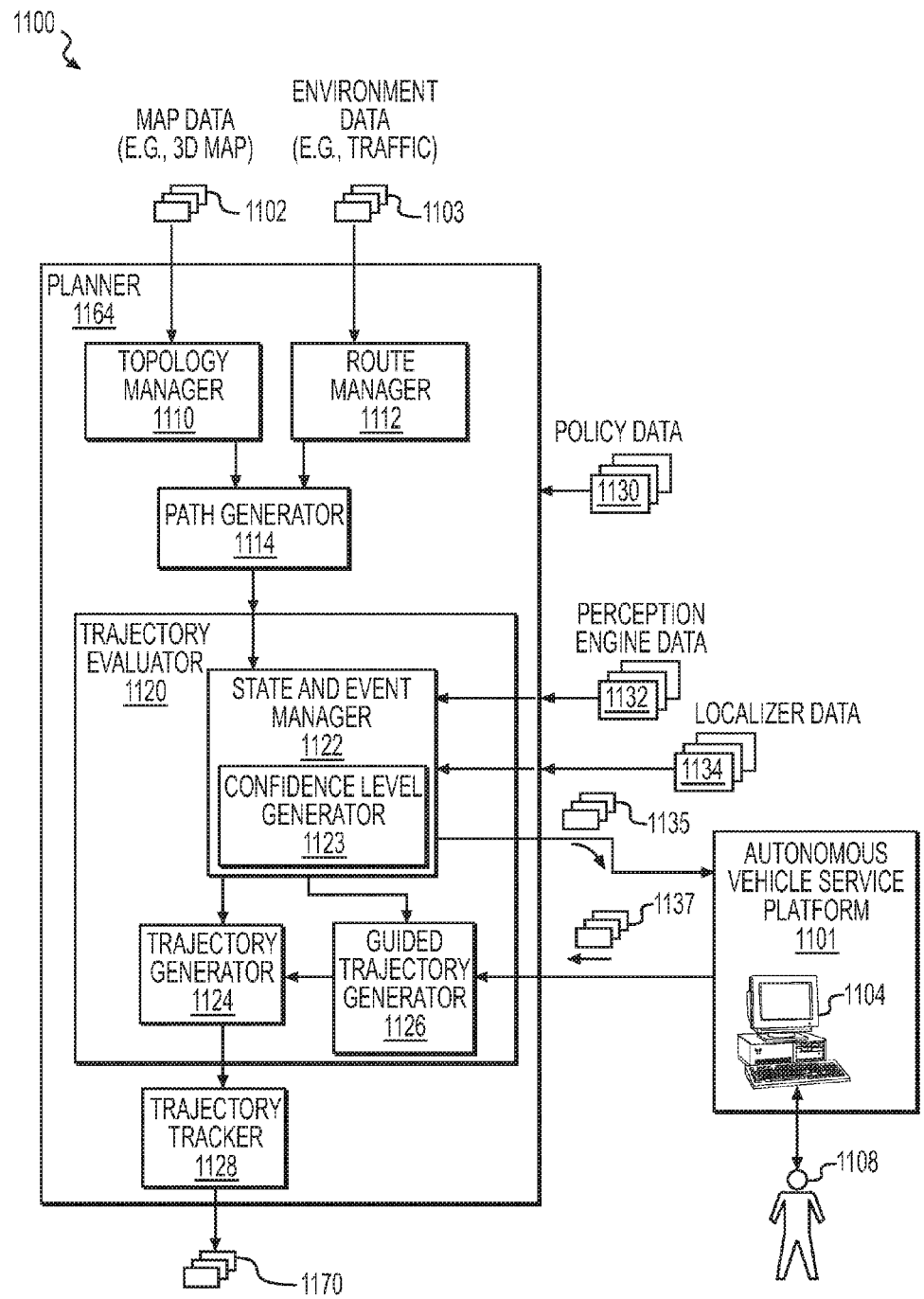
FIG. 11 is a diagram depicting an example of a planner configured to invoke teleoperations, according to some examples.

FIG. 11 is a diagram depicting an example of a planner configured to invoke teleoperations, according to some examples. Diagram 1100 depicts a planner 1164 including a topography manager 1110, a route manager 1112, a path generator 1114, a trajectory evaluator 1120, and a trajectory tracker 1128. Topography manager 1110 is configured to receive map data, such as 3D map data or other like map data that specifies topographic features. Topography manager 1110 is further configured to identify candidate paths based on topographic-related features on a path to a destination. According to various examples, topography manager 1110 receives 3D maps generated by sensors associated with one or more autonomous vehicles in the fleet. Route manager 1112 is configured to receive environmental data 1103, which may include traffic-related information associated with one or more routes that may be selected as a path to the destination. Path generator 1114 receives data from topography manager 1110 and route manager 1112, and generates one or more paths or path segments suitable to direct autonomous vehicle toward a destination. Data representing one or more paths or path segments is transmitted into trajectory evaluator 1120.

Trajectory evaluator 1120 includes a state and event manager 1122, which, in turn, may include a confidence level generator 1123. Trajectory evaluator 1120 further includes a guided trajectory generator 1126 and a trajectory generator 1124. Further, planner 1164 is configured to receive policy data 1130, perception engine data 1132, and localizer data 1134.

Policy data 1130 may include criteria with which planner 1164 uses to determine a path that has a sufficient confidence level with which to generate trajectories, according to some examples. Examples of policy data 1130 include policies that specify that trajectory generation is bounded by stand-off distances to external objects (e.g., maintaining a safety buffer of 3 feet from a cyclist, as possible), or policies that require that trajectories must not cross a center double yellow line, or policies that require trajectories to be limited to a single lane in a 4-lane roadway (e.g., based on past events, such as typically congregating at a lane closest to a bus stop), and any other similar criteria specified by policies. Perception engine data 1132 includes maps of locations of static objects and dynamic objects of interest, and localizer data 1134 includes at least a local pose or position.

State and event manager 1122 may be configured to probabilistically determine a state of operation for an autonomous vehicle. For example, a first state of operation (i.e., "normative operation") may describe a situation in which trajectories are collision-free, whereas a second state of operation (i.e., "non-normative operation") may describe another situation in which the confidence level associated with possible trajectories are insufficient to guarantee collision-free travel. According to some examples, state and event manager 1122 is configured to use perception data 1132 to determine a state of autonomous vehicle that is either normative or non-normative. Confidence level generator 1123 may be configured to analyze perception data 1132 to determine a state for the autonomous vehicle. For example, confidence level generator 1123 may use semantic information associated with static and dynamic objects, as well as associated probabilistic estimations, to enhance a degree of certainty that planner 1164 is determining safe course of action. For example, planner 1164 may use perception engine data 1132 that specifies a probability that an object is either a person or not a person to determine whether planner 1164 is operating safely (e.g., planner 1164 may receive a degree of certainty that an object has a 98% probability of being a person, and a probability of 2% that the object is not a person).

Upon determining a confidence level (e.g., based on statistics and probabilistic determinations) is below a threshold required for predicted safe operation, a relatively low confidence level (e.g., single probability score) may trigger planner 1164 to transmit a request 1135 for teleoperation support to autonomous vehicle service platform 1101. In some cases, telemetry data and a set of candidate trajectories may accompany the request. Examples of telemetry data include sensor data, localization data, perception data, and the like. A teleoperator 1108 may transmit via teleoperator computing device 1104 a selected trajectory 1137 to guided trajectory generator 1126. As such, selected trajectory 1137 is a trajectory formed with guidance from a teleoperator. Upon confirming there is no change in the state (e.g., a non-normative state is pending), guided trajectory generator 1126 passes data to trajectory generator 1124, which, in turn, causes trajectory tracker 1128, as a trajectory tracking controller, to use the teleop-specified trajectory for generating control signals 1170 (e.g., steering angles, velocity, etc.). Note that planner 1164 may trigger transmission of a request 1135 for teleoperation support prior to a state transitioning to a non-normative state. In particular, an autonomous vehicle controller and/or its components can predict that a distant obstacle may be problematic and preemptively cause planner 1164 to invoke teleoperations prior to the autonomous vehicle reaching the obstacle. Otherwise, the autonomous vehicle may cause a delay by transitioning to a safe state upon encountering the obstacle or scenario (e.g., pulling over and off the roadway). In another example, teleoperations may be automatically invoked prior to an autonomous vehicle approaching a particular location that is known to be difficult to navigate. This determination may optionally take into consideration other factors, including the time of day, the position of the sun, if such situation is likely to cause a disturbance to the reliability of sensor readings, and traffic or accident data derived from a variety of sources.

Figure 12:
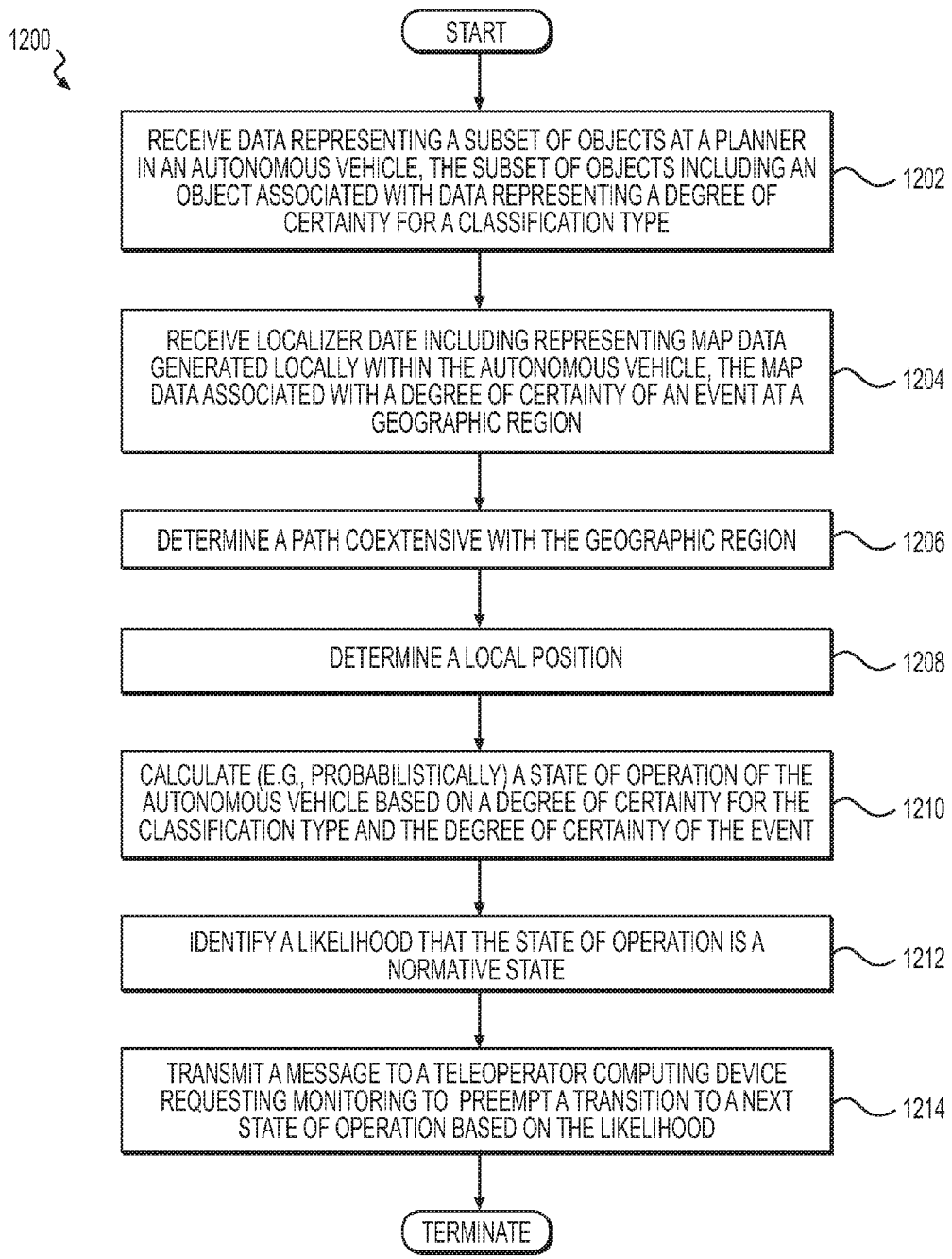
FIG. 12 is an example of a flow diagram configured to control an autonomous vehicle, according to some embodiments.

FIG. 12 is an example of a flow diagram configured to control an autonomous vehicle, according to some embodiments. At 1202, flow 1200 begins. Data representing a subset of objects that are received at a planner in an autonomous vehicle, the subset of objects including at least one object associated with data representing a degree of certainty for a classification type. For example, perception engine data may include metadata associated with objects, whereby the metadata specifies a degree of certainty associated with a specific classification type. For instance, a dynamic object may be classified as a "young pedestrian" with an 85% confidence level of being correct. At 1204, localizer data may be received (e.g., at a planner). The localizer data may include map data that is generated locally within the autonomous vehicle. The local map data may specify a degree of certainty (including a degree of uncertainty) that an event at a geographic region may occur. An event may be a condition or situation affecting operation, or potentially affecting operation, of an autonomous vehicle. The events may be internal (e.g., failed or impaired sensor)

to an autonomous vehicle, or external (e.g., roadway obstruction). Examples of events are described herein, such as in FIG. 2 as well as in other figures and passages. A path coextensive with the geographic region of interest may be determined at 1206. For example, consider that the event is the positioning of the sun in the sky at a time of day in which the intensity of sunlight impairs the vision of drivers during rush hour traffic. As such, it is expected or predicted that traffic may slow down responsive to the bright sunlight. Accordingly, a planner may preemptively invoke teleoperations if an alternate path to avoid the event is less likely. At 1208, a local position is determined at a planner based on local pose data. At 1210, a state of operation of an autonomous vehicle may be determined (e.g., probabilistically), for example, based on a degree of certainty for a classification type and a degree of certainty of the event, which is may be based on any number of factors, such as speed, position, and other state information. To illustrate, consider an example in which a young pedestrian is detected by the autonomous vehicle during the event in which other drivers' vision likely will be impaired by the sun, thereby causing an unsafe situation for the young pedestrian. Therefore, a relatively unsafe situation can be detected as a probabilistic event that may be likely to occur (i.e., an unsafe situation for which teleoperations may be invoked). At 1212, a likelihood that the state of operation is in a normative state is determined, and based on the determination, a message is transmitted to a teleoperator computing device requesting teleoperations to preempt a transition to a next state of operation (e.g., preempt transition from a normative to non-normative state of operation, such as an unsafe state of operation).

Figure 13:
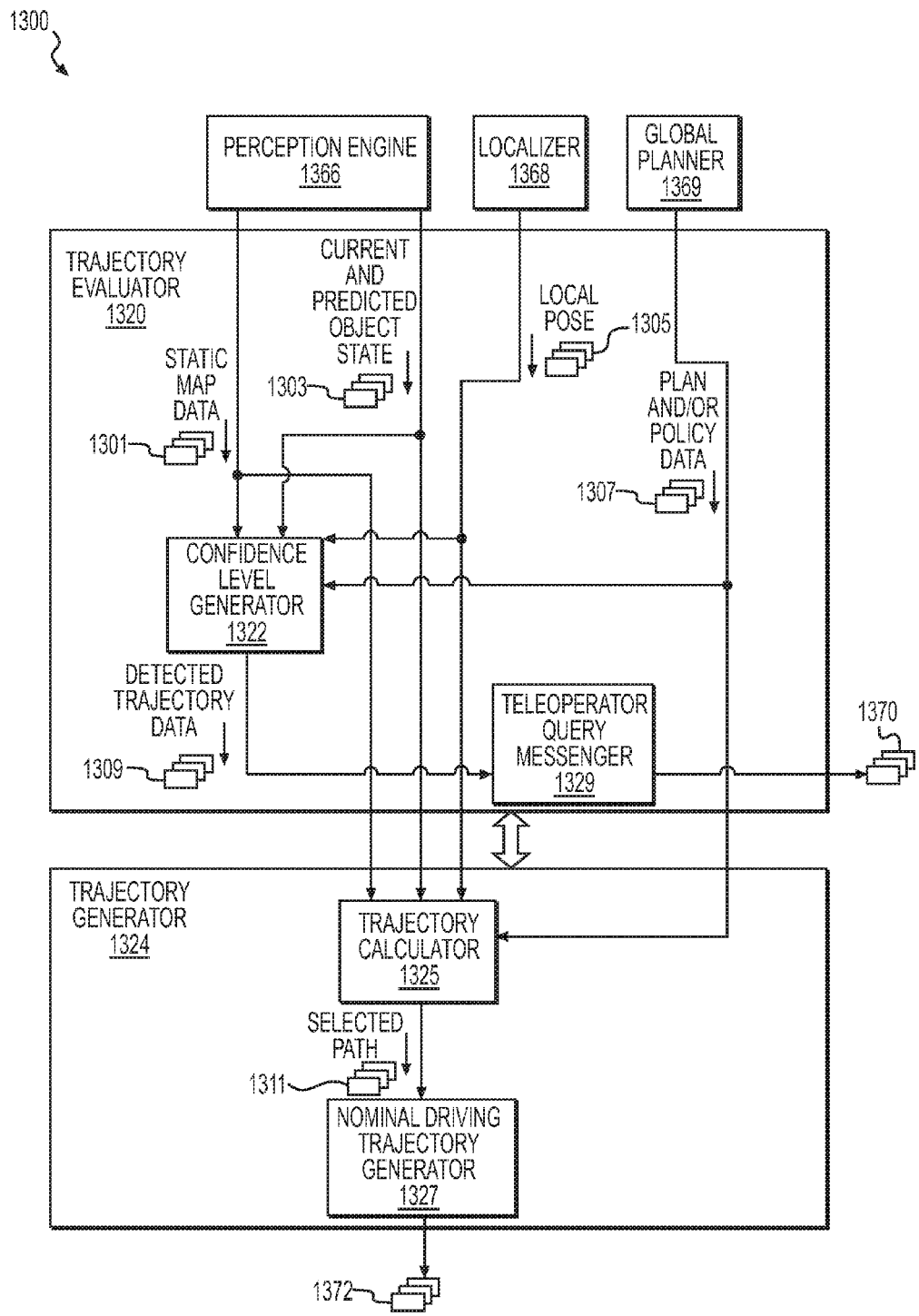
FIG. 13 depicts an example in which a planner may generate a trajectory, according to some examples.

FIG. 13 depicts an example in which a planner may generate a trajectory, according to some examples. Diagram 1300 includes a trajectory evaluator 1320 and a trajectory generator 1324. Trajectory evaluator 1320 includes a confidence level generator 1322 and a teleoperator query messenger 1329. As shown, trajectory evaluator 1320 is coupled to a perception engine 1366 to receive static map data 1301, and current and predicted object state data 1303. Trajectory evaluator 1320 also receives local pose data 1305 from localizer 1368 and plan data 1307 from a global planner 1369. In one state of operation (e.g., non-normative), confidence level generator 1322 receives static map data 1301 and current and predicted object state data 1303. Based on this data, confidence level generator 1322 may determine that detected trajectories are associated with unacceptable confidence level values. As such, confidence level generator 1322 transmits detected trajectory data 1309 (e.g., data including candidate trajectories) to notify a teleoperator via teleoperator query messenger 1329, which, in turn, transmits a request 1370 for teleoperator assistance.

In another state of operation (e.g., a normative state), static map data 1301, current and predicted object state data 1303, local pose data 1305, and plan data 1307 (e.g., global plan data) are received into trajectory calculator 1325, which is configured to calculate (e.g., iteratively) trajectories to determine an optimal one or more paths. Next, at least one path is selected and is transmitted as selected path data 1311. According to some embodiments, trajectory calculator 1325 is configured to implement re-planning of trajectories as an example. Nominal driving trajectory generator 1327 is configured to generate trajectories in a refined approach, such as by generating trajectories based on receding horizon control techniques. Nominal driving trajectory generator 1327 subsequently may transmit nominal driving trajectory path data 1372 to, for example, a trajectory tracker or a vehicle controller to implement physical changes in steering, acceleration, and other components.

Figure 14:
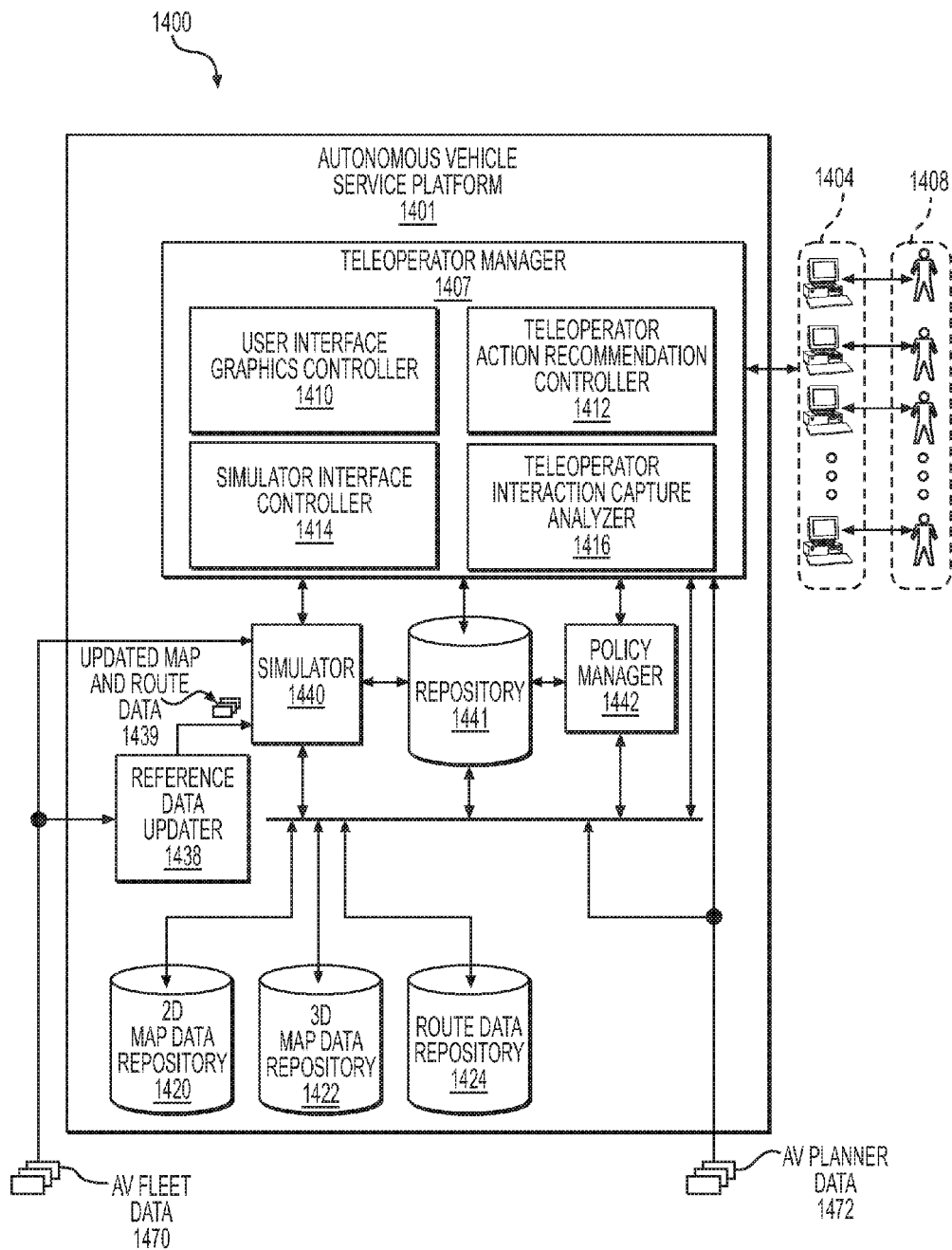
FIG. 14 is a diagram depicting another example of an autonomous vehicle service platform, according to some embodiments.

FIG. 14 is a diagram depicting another example of an autonomous vehicle service platform, according to some embodiments. Diagram 1400 depicts an autonomous vehicle service platform 1401 including a teleoperator manager 1407 that is configured to manage interactions and/or communications among teleoperators 1408, teleoperator computing devices 1404, and other components of autonomous vehicle service platform 1401. Further to diagram 1400, autonomous vehicle service platform 1401 includes a simulator 1440, a repository 1441, a policy manager 1442, a reference data updater 1438, a 2D map data repository 1420, a 3D map data repository 1422, and a route data repository 1424. Other map data, such as 4D map data (e.g., using epoch determination), may be implemented and stored in a repository (not shown).

Teleoperator action recommendation controller 1412 includes logic configured to receive and/or control a teleoperation service request via autonomous vehicle ("AV") planner data 1472, which can include requests for teleoperator assistance as well as telemetry data and other data. As such, planner data 1472 may include recommended candidate trajectories or paths from which a teleoperator 1408 via teleoperator computing device 1404 may select. According to some examples, teleoperator action recommendation controller 1412 may be configured to access other sources of recommended candidate trajectories from which to select an optimum trajectory. For example, candidate trajectories contained in autonomous vehicle planner data 1472 may, in parallel, be introduced into simulator 1440, which is configured to simulate an event or condition being experienced by an autonomous vehicle requesting teleoperator assistance. Simulator 1440 can access map data and other data necessary for performing a simulation on the set of candidate trajectories, whereby simulator 1440 need not exhaustively reiterate simulations to confirm sufficiency. Rather, simulator 1440 may provide either confirm the appropriateness of the candidate trajectories, or may otherwise alert a teleoperator to be cautious in their selection.

Teleoperator interaction capture analyzer 1416 may be configured to capture numerous amounts of teleoperator transactions or interactions for storage in repository 1441, which, for example, may accumulate data relating to a number of teleoperator transactions for analysis and generation of policies, at least in some cases. According to some embodiments, repository 1441 may also be configured to store policy data for access by policy manager 1442. Further, teleoperator interaction capture analyzer 1416 may apply machine learning techniques to empirically determine how best to respond to events or conditions causing requests for teleoperation assistance. In some cases, policy manager 1442 may be configured to update a particular policy or generate a new policy responsive to analyzing the large set of teleoperator interactions (e.g., subsequent to applying machine learning techniques). Policy manager 1442 manages policies that may be viewed as rules or guidelines with which an autonomous vehicle controller and its components operate under to comply with autonomous operations of a vehicle. In some cases, a modified or updated policy may be applied to simulator 1440 to confirm the efficacy of permanently releasing or implementing such policy changes.

Simulator interface controller 1414 is configured to provide an interface between simulator 1440 and teleoperator computing devices 1404. For example, consider that sensor data from a fleet of autonomous vehicles is applied to reference data updater 1438 via autonomous ("AV") fleet data 1470, whereby reference data updater 1438 is configured to generate updated map and route data 1439. In some implementations, updated map and route data 1439 may be preliminarily released as an update to data in map data repositories 1420 and 1422, or as an update to data in route data repository 1424. In this case, such data may be tagged as being a "beta version" in which a lower threshold for requesting teleoperator service may be implemented when, for example, a map tile including preliminarily updated information is used by an autonomous vehicle. Further, updated map and route data 1439 may be introduced to simulator 1440 for validating the updated map data. Upon full release (e.g., at the close of beta testing), the previously lowered threshold for requesting a teleoperator service related to map tiles is canceled. User interface graphics controller 1410 provides rich graphics to teleoperators 1408, whereby a fleet of autonomous vehicles may be simulated within simulator 1440 and may be accessed via teleoperator computing device 1404 as if the simulated fleet of autonomous vehicles were real.

Figure 15:
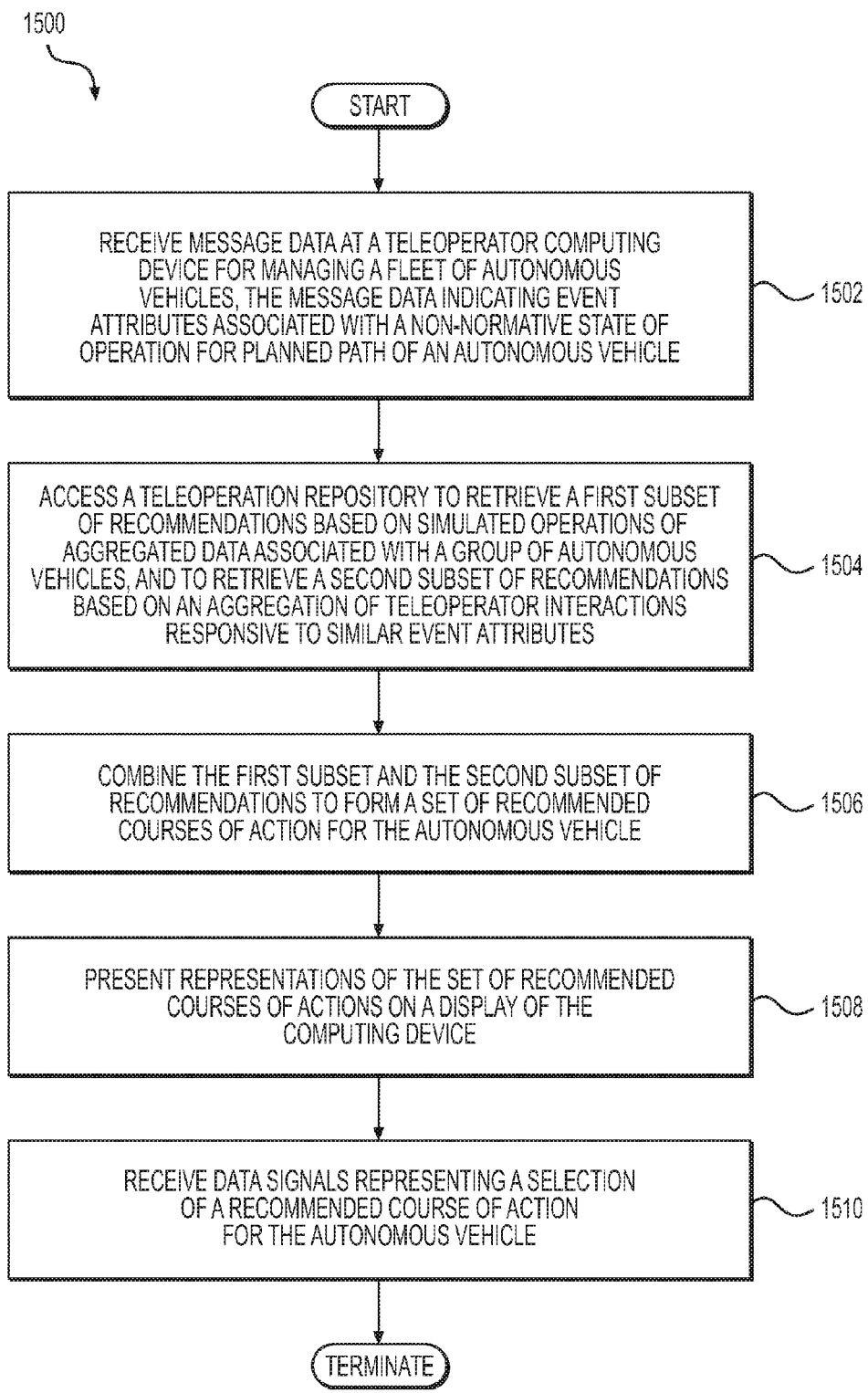
FIG. 15 is an example of a flow diagram to control an autonomous vehicle, according to some embodiments.

FIG. 15 is an example of a flow diagram to control an autonomous vehicle, according to some embodiments. At 1502, flow 1500 begins. Message data may be received at a teleoperator computing device for managing a fleet of autonomous vehicles. The message data may indicate event attributes associated with a non-normative state of operation in the context of a planned path for an autonomous vehicle. For example, an event may be characterized as a particular intersection that becomes problematic due to, for example, a large number of pedestrians, hurriedly crossing the street against a traffic light. The event attributes describe the characteristics of the event, such as, for example, the number of people crossing the street, the traffic delays resulting from an increased number of pedestrians, etc. At 1504, a teleoperation repository may be accessed to retrieve a first subset of recommendations based on simulated operations of aggregated data associated with a group of autonomous vehicles. In this case, a simulator may be a source of recommendations with which a teleoperator may implement. Further, the teleoperation repository may also be accessed to retrieve a second subset of recommendations based on an aggregation of teleoperator interactions responsive to similar event attributes. In particular, a teleoperator interaction capture analyzer may apply machine learning techniques to empirically determine how best to respond to events having similar attributes based on previous requests for teleoperation assistance. At 1506, the first subset and the second subset of recommendations are combined to form a set of recommended courses of action for the autonomous vehicle. At 1508, representations of the set of recommended courses of actions may be presented visually on a display of a teleoperator computing device. At 1510, data signals representing a selection (e.g., by teleoperator) of a recommended course of action may be detected.

Figure 16:
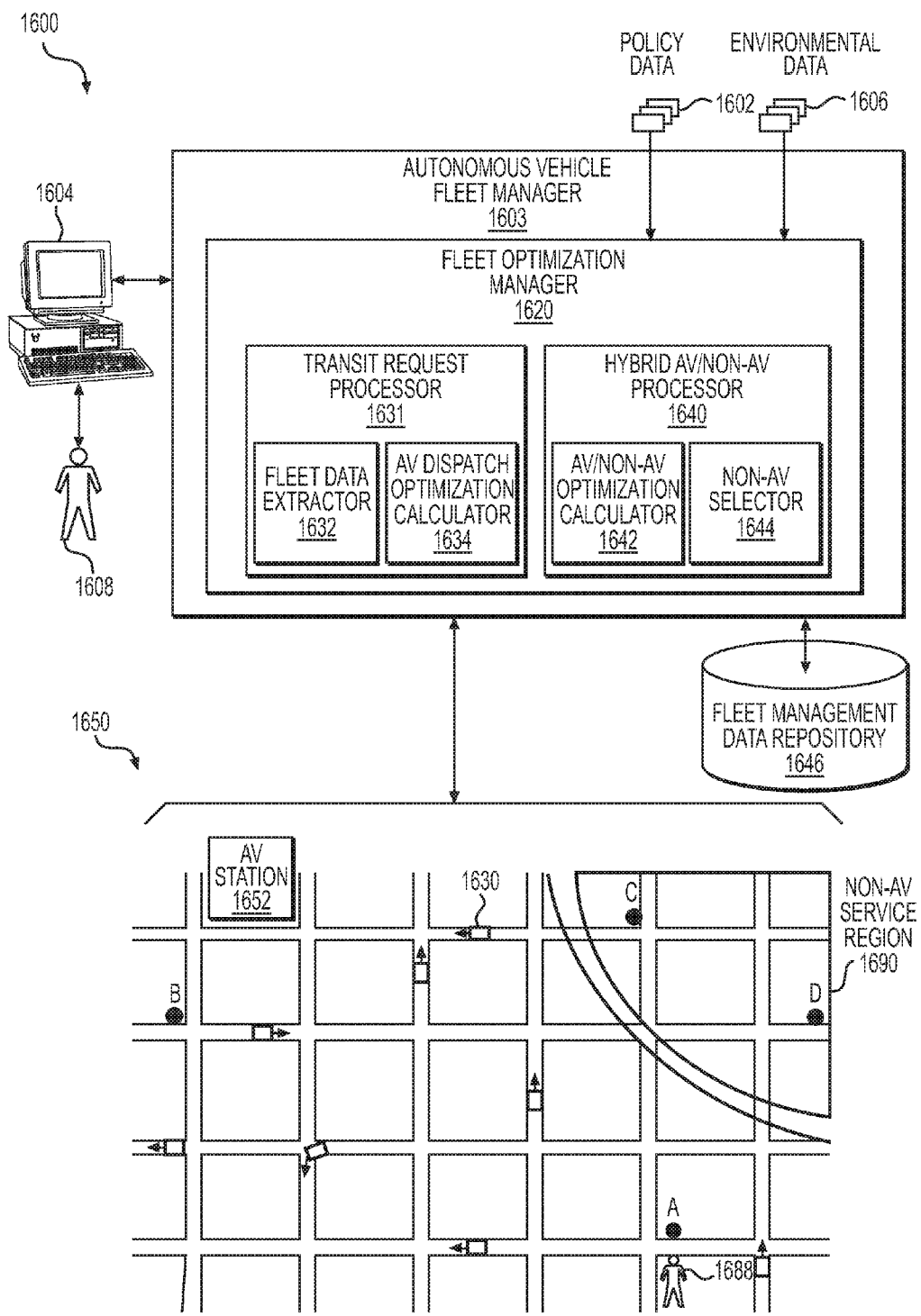
FIG. 16 is a diagram of an example of an autonomous vehicle fleet manager implementing a fleet optimization manager, according to some examples.

FIG. 16 is a diagram of an example of an autonomous vehicle fleet manager implementing a fleet optimization manager, according to some examples. Diagram 1600 depicts an autonomous vehicle fleet manager that is configured to manage a fleet of autonomous vehicles 1630 transiting within a road network 1650. Autonomous vehicle fleet manager 1603 is coupled to a teleoperator 1608 via a teleoperator computing device 1604, and is also coupled to a fleet management data repository 1646. Autonomous vehicle fleet manager 1603 is configured to receive policy data 1602 and environmental data 1606, as well as other data. Further to diagram 1600, fleet optimization manager 1620 is shown to include a transit request processor 1631, which, in turn, includes a fleet data extractor 1632 and an autonomous vehicle dispatch optimization calculator 1634. Transit request processor 1631 is configured to process transit requests, such as from a user 1688 who is requesting autonomous vehicle service. Fleet data extractor 1632 is configured to extract data relating to autonomous vehicles in the fleet. Data associated with each autonomous vehicle is stored in repository 1646. For example, data for each vehicle may describe maintenance issues, scheduled service calls, daily usage, battery charge and discharge rates, and any other data, which may be updated in real-time, may be used for purposes of optimizing a fleet of autonomous vehicles to minimize downtime. Autonomous vehicle dispatch optimization calculator 1634 is configured to analyze the extracted data and calculate optimized usage of the fleet so as to ensure that the next vehicle dispatched, such as from station 1652, provides for the least travel times and/or costs—in the aggregate—for the autonomous vehicle service.

Fleet optimization manager 1620 is shown to include a hybrid autonomous vehicle/non-autonomous vehicle processor 1640, which, in turn, includes an AV/non-AV optimization calculator 1642 and a non-AV selector 1644. According to some examples, hybrid autonomous vehicle/non-autonomous vehicle processor 1640 is configured to manage a hybrid fleet of autonomous vehicles and human-driven vehicles (e.g., as independent contractors). As such, autonomous vehicle service may employ non-autonomous vehicles to meet excess demand, or in areas, such as non-AV service region 1690, that may be beyond a geo-fence or in areas of poor communication coverage. AV/non-AV optimization calculator 1642 is configured to optimize usage of the fleet of autonomous and to invite non-AV drivers into the transportation service (e.g., with minimal or no detriment to the autonomous vehicle service). Non-AV selector 1644 includes logic for selecting a number of non-AV drivers to assist based on calculations derived by AV/non-AV optimization calculator 1642.

Figure 17:
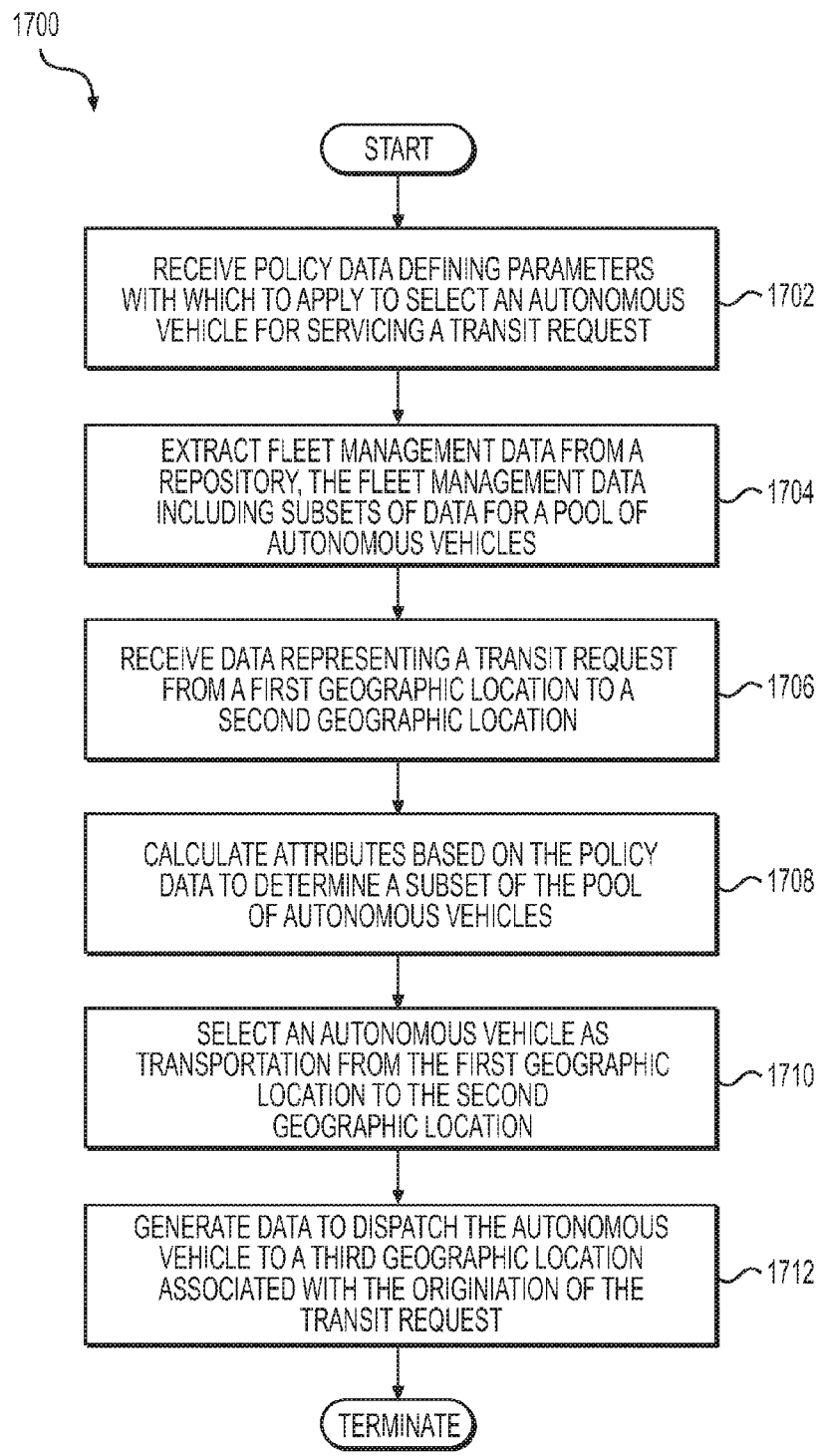
FIG. 17 is an example of a flow diagram for managing a fleet of autonomous vehicles, according to some embodiments.

FIG. 17 is an example of a flow diagram to manage a fleet of autonomous vehicles, according to some embodiments. At 1702, flow 1700 begins. At 1702, policy data is received. The policy data may include parameters that define how best apply to select an autonomous vehicle for servicing a transit request. At 1704, fleet management data from a repository may be extracted. The fleet management data includes subsets of data for a pool of autonomous vehicles (e.g., the data describes the readiness of vehicles to service a transportation request). At 1706, data representing a transit request is received. For exemplary purposes, the transit request could be for transportation from a first geographic location to a second geographic location. At 1708, attributes based on the policy data are calculated to determine a subset of autonomous vehicles that are available to service the request. For example, attributes may include a battery charge level and time until next scheduled maintenance. At 1710, an autonomous vehicle is selected as transportation from the first geographic location to the second geographic location, and data is generated to dispatch the autonomous vehicle to a third geographic location associated with the origination of the transit request.

Figure 18:
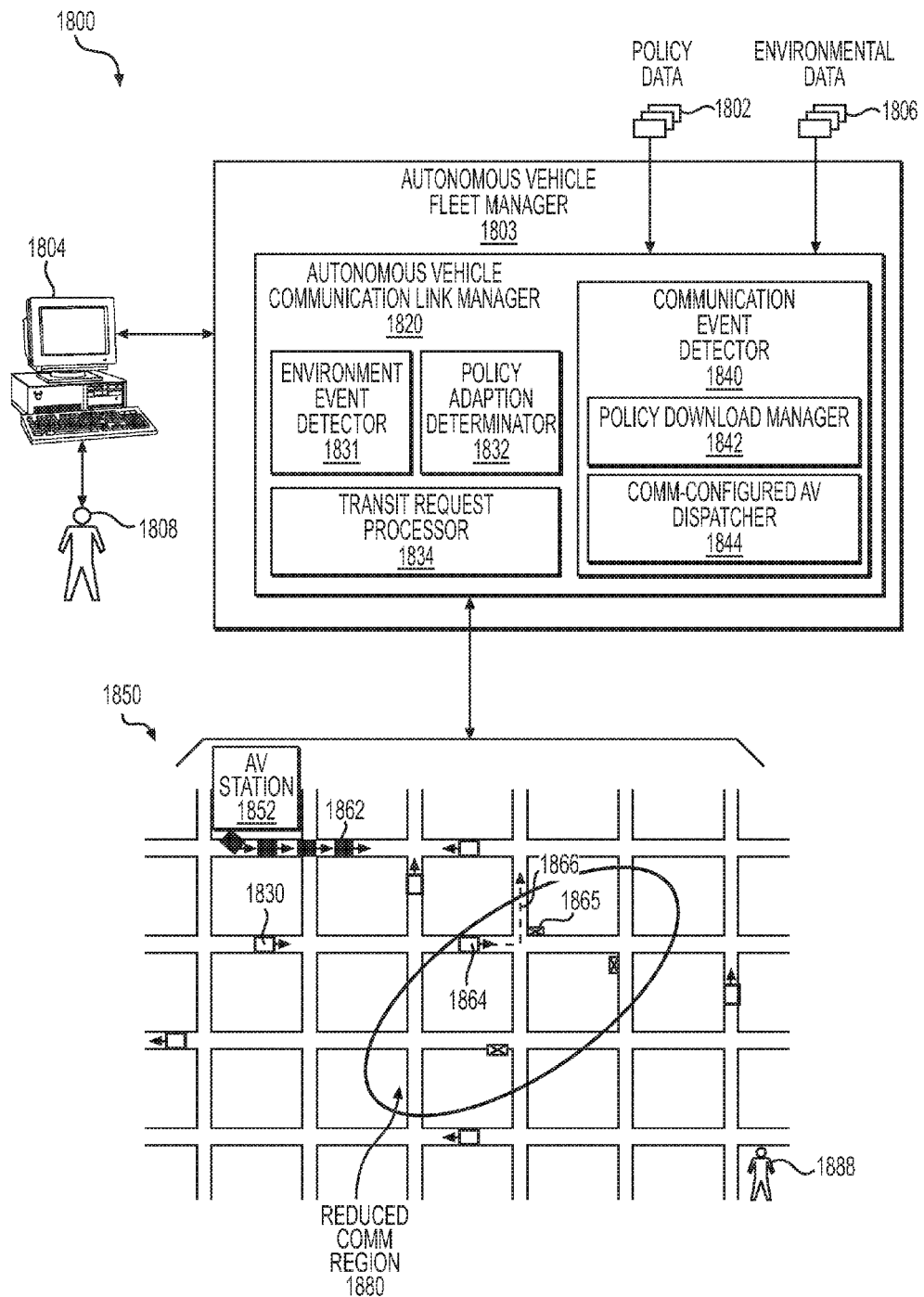
FIG. 18 is a diagram illustrating an autonomous vehicle fleet manager implementing an autonomous vehicle communications link manager, according to some embodiments.

FIG. 18 is a diagram illustrating an autonomous vehicle fleet manager implementing an autonomous vehicle communications link manager, according to some embodiments. Diagram 1800 depicts an autonomous vehicle fleet manager that is configured to manage a fleet of autonomous vehicles 1830 transiting within a road network 1850 that coincides with a communication outage at an area identified as "reduced communication region" 1880. Autonomous vehicle fleet manager 1803 is coupled to a teleoperator 1808 via a teleoperator computing device 1804. Autonomous vehicle fleet manager 1803 is configured to receive policy data 1802 and environmental data 1806, as well as other data. Further to diagram 1800, an autonomous vehicle communications link manager 1820 is shown to include an environment event detector 1831, a policy adaption determinator 1832, and a transit request processor 1834. Environment event detector 1831 is configured to receive environmental data 1806 specifying a change within the environment in which autonomous vehicle service is implemented. For example, environmental data 1806 may specify that region 1880 has degraded communication services, which may affect the autonomous vehicle service. Policy adaption determinator 1832 may specify parameters with which to apply when receiving transit requests during such an event (e.g., during a loss of communications). Transit request processor 1834 is configured to process transit requests in view of the degraded communications. In this example, a user 1888 is requesting autonomous vehicle service. Further, transit request processor 1834 includes logic to apply an adapted policy for modifying the way autonomous vehicles are dispatched so to avoid complications due to poor communications.

Communication event detector 1840 includes a policy download manager 1842 and communications-configured ("COMM-configured") AV dispatcher 1844. Policy download manager 1842 is configured to provide autonomous vehicles 1830 an updated policy in view of reduced communications region 1880, whereby the updated policy may specify routes to quickly exit region 1880 if an autonomous vehicle enters that region. For example, autonomous vehicle 1864 may receive an updated policy moments before driving into region 1880. Upon loss of communications, autonomous vehicle 1864 implements the updated policy and selects route 1866 to drive out of region 1880 quickly. COMM-configured AV dispatcher 1844 may be configured to identify points 1865 at which to park autonomous vehicles that are configured as relays to establishing a peer-to-peer network over region 1880. As such, COMM-configured AV dispatcher 1844 is configured to dispatch autonomous vehicles 1862 (without passengers) to park at locations 1865 for the purposes of operating as communication towers in a peer-to-peer ad hoc network.

Figure 19:
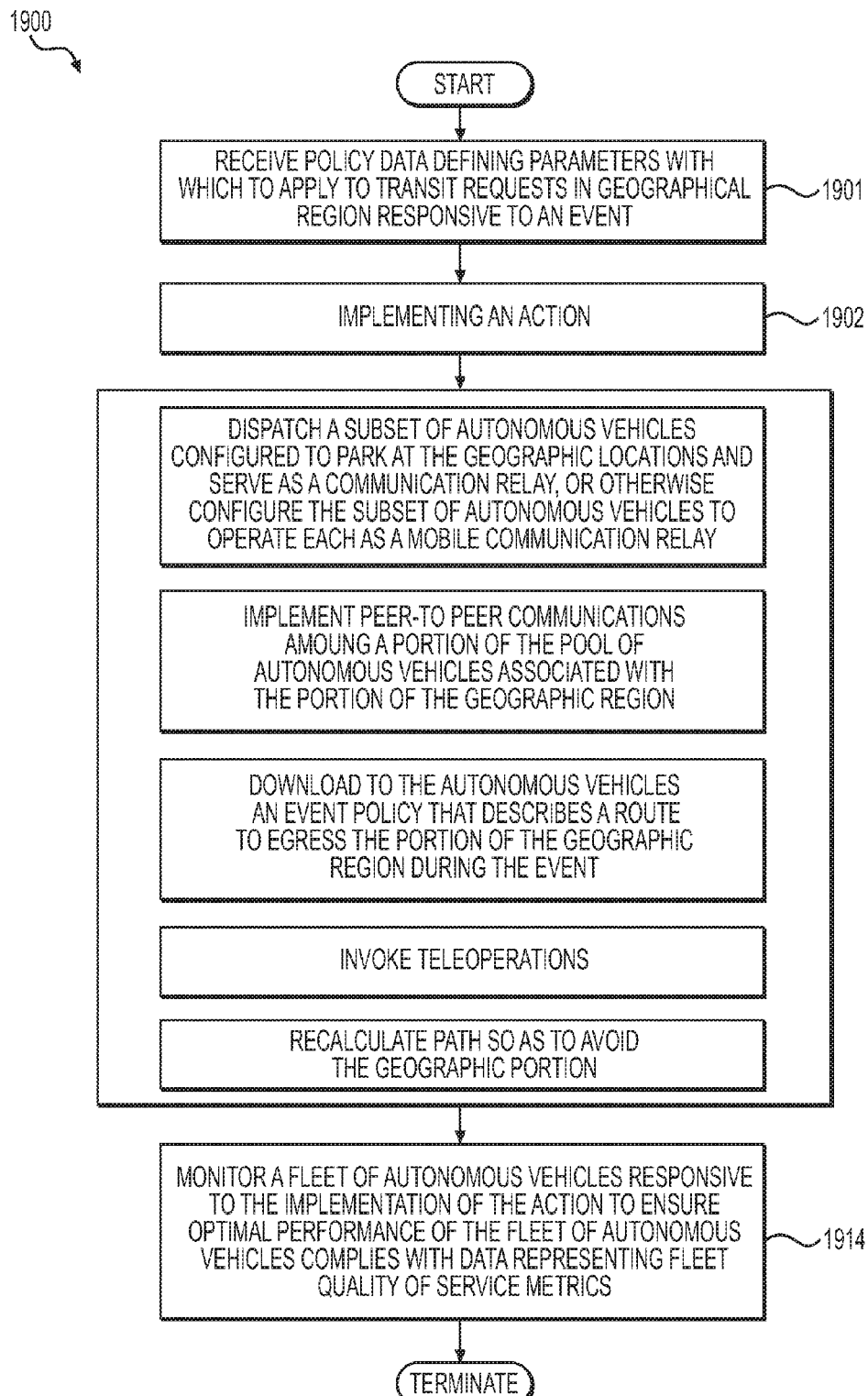
FIG. 19 is an example of a flow diagram to determine actions for autonomous vehicles during an event, according to some embodiments.

FIG. 19 is an example of a flow diagram to determine actions for autonomous vehicles during an event, such as degraded or lost communications, according to some embodiments. At 1901, flow 1900 begins. Policy data is received, whereby the policy data defines parameters with which to apply to transit requests in a geographical region during an event. At 1902, one or more of the following actions may be implemented: (1) dispatch a subset of autonomous vehicles to geographic locations in the portion of the geographic location, the subset of autonomous vehicles being configured to either park at specific geographic locations and each serve as a static communication relay, or transit in a geographic region to each serve as a mobile communication relay, (2) implement peer-to-peer communications among a portion of the pool of autonomous vehicles associated with the portion of the geographic region, (3) provide to the autonomous vehicles an event policy that describes a route to egress the portion of the geographic region during an event, (4) invoke teleoperations, and (5) recalculate paths so as to avoid the geographic portion. Subsequent to implementing the action, the fleet of autonomous vehicles is monitored at 1914.

Figure 20:
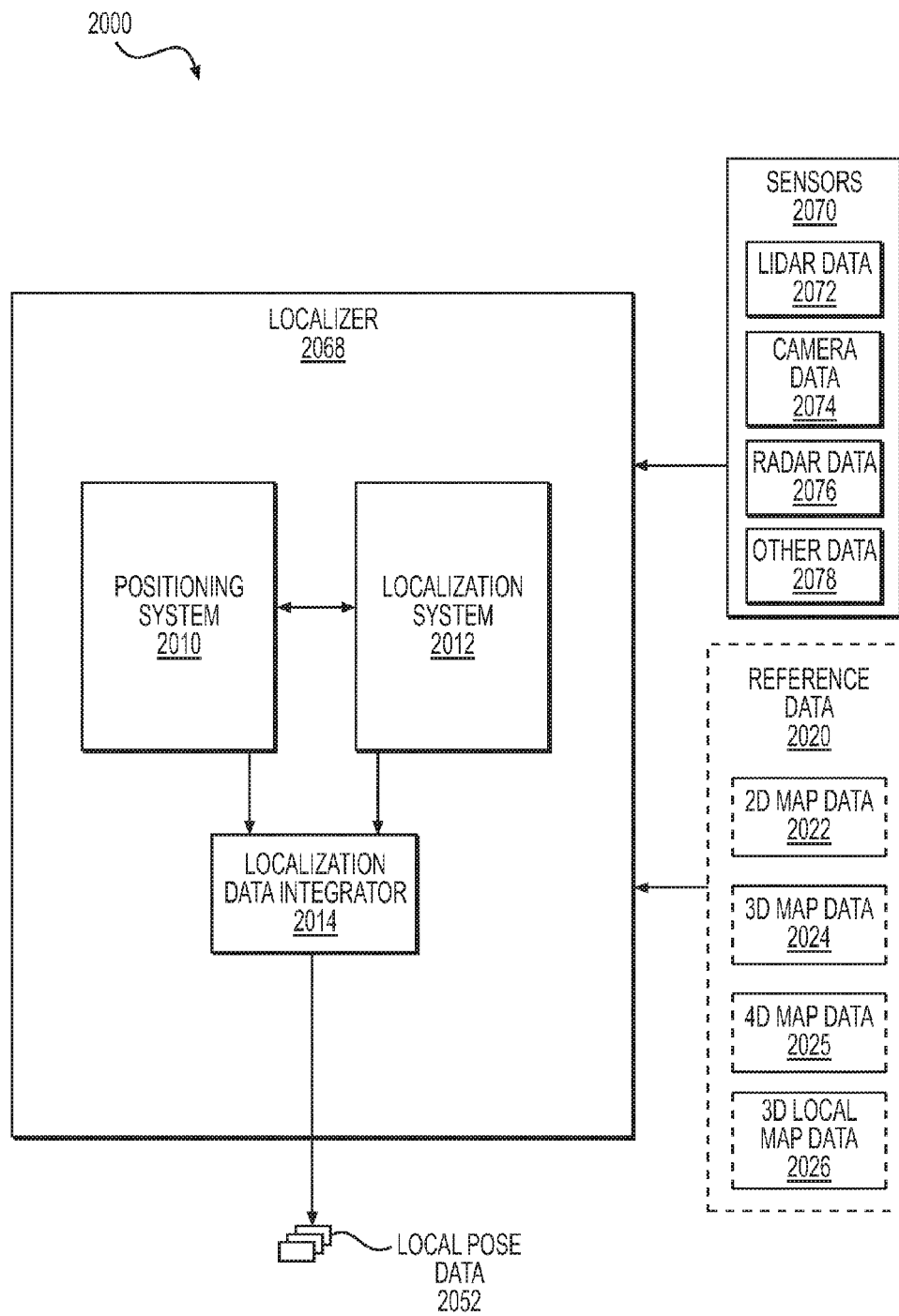
FIG. 20 is a diagram depicting an example of a localizer, according to some embodiments.

FIG. 20 is a diagram depicting an example of a localizer, according to some embodiments. Diagram 2000 includes a localizer 2068 configured to receive sensor data from sensors 2070, such as Lidar data 2072, camera data 2074, radar data 2076, and other data 2078. Further, localizer 2068 is configured to receive reference data 2020, such as 2D map data 2022, 3D map data 2024, and 3D local map data. According to some examples, other map data, such as 4D map data 2025 and semantic map data (not shown), including corresponding data structures and repositories, may also be implemented. Further to diagram 2000, localizer 2068 includes a positioning system 2010 and a localization system 2012, both of which are configured to receive sensor data from sensors 2070 as well as reference data 2020. Localization data integrator 2014 is configured to receive data from positioning system 2010 and data from localization system 2012, whereby localization data integrator 2014 is configured to integrate or fuse sensor data from multiple sensors to form local pose data 2052.

Figure 21:
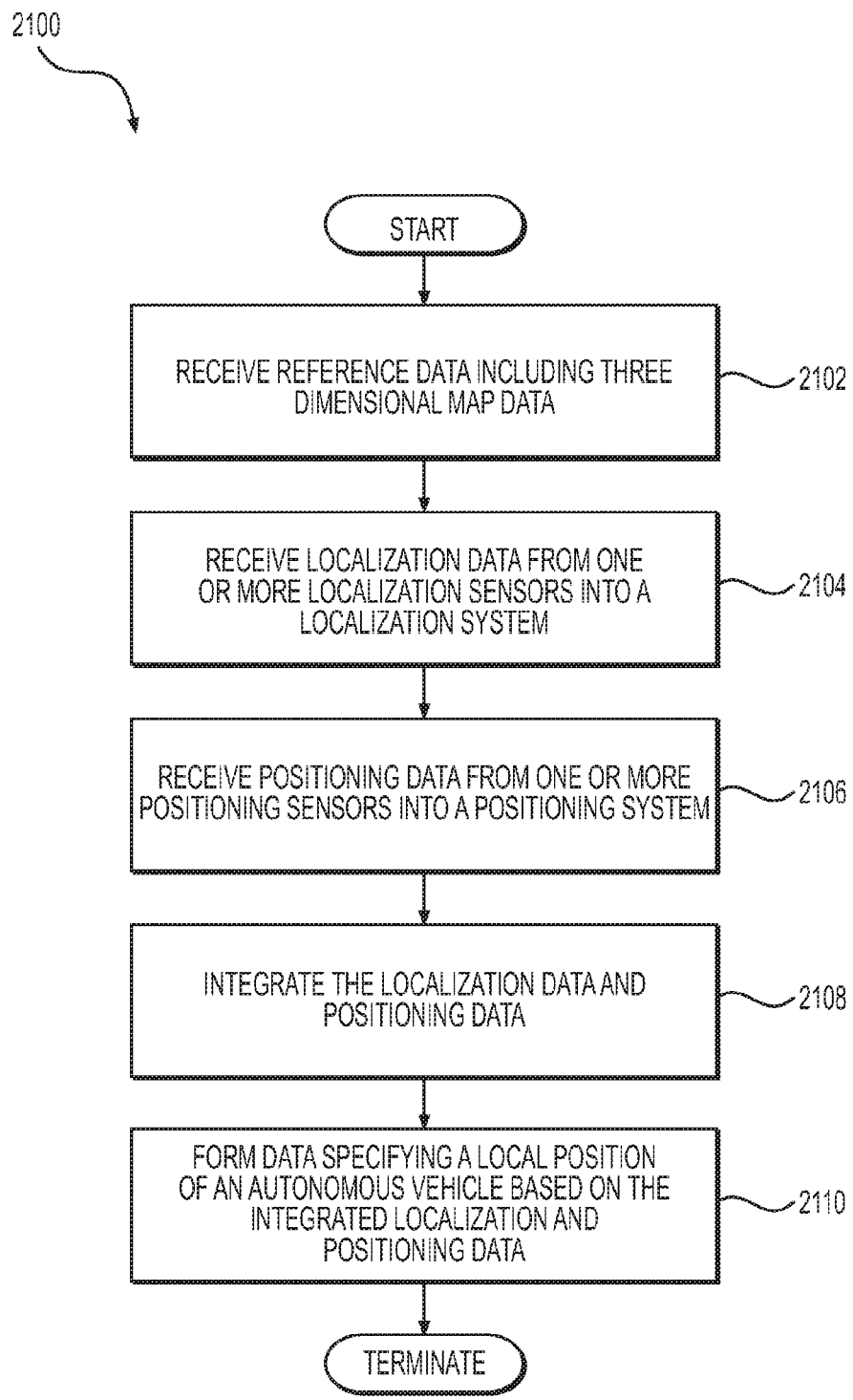
FIG. 21 is an example of a flow diagram to generate local pose data based on integrated sensor data, according to some embodiments.

FIG. 21 is an example of a flow diagram to generate local pose data based on integrated sensor data, according to some embodiments. At 2101, flow 2100 begins. At 2102, reference data is received, the reference data including three dimensional map data. In some examples, reference data, such as 3-D or 4-D map data, may be received via one or more networks. At 2104, localization data from one or more localization sensors is received and placed into a localization system. At 2106, positioning data from one or more positioning sensors is received into a positioning system. At 2108, the localization and positioning data are integrated. At 2110, the localization data and positioning data are integrated to form local position data specifying a geographic position of an autonomous vehicle.

Figure 22:
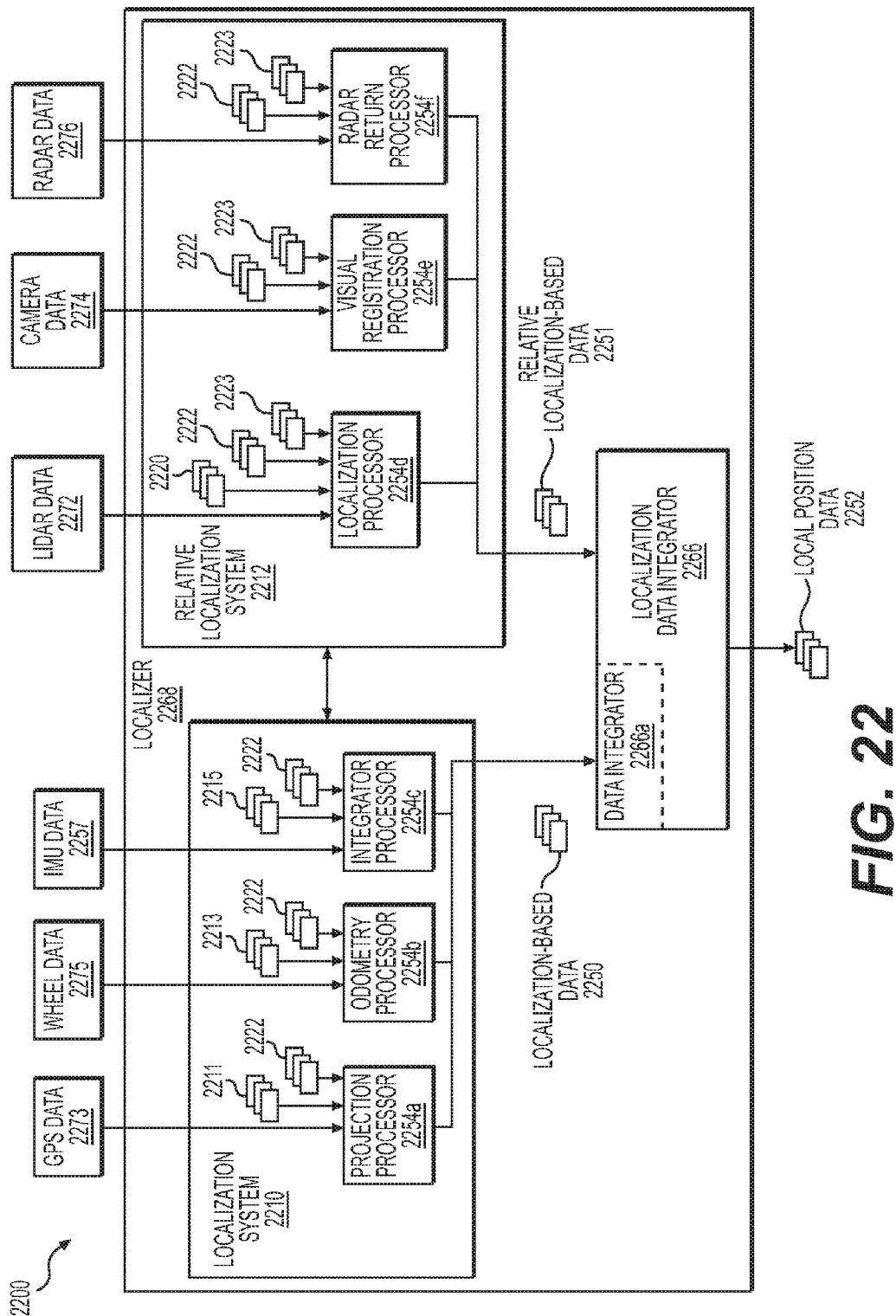
FIG. 22 is a diagram depicting another example of a localizer, according to some embodiments.

FIG. 22 is a diagram depicting another example of a localizer, according to some embodiments. Diagram 2200 includes a localizer 2268, which, in turn, includes a localization system 2210 and a relative localization system 2212 to generate positioning-based data 2250 and local location-based data 2251, respectively. Localization system 2210 includes a projection processor 2254a for processing GPS data 2273, a GPS datum 2211, and 3D Map data 2222, among other optional data (e.g., 4D map data). Localization system 2210 also includes an odometry processor 2254b to process wheel data 2275 (e.g., wheel speed), vehicle model data 2213 and 3D map data 2222, among other optional data. Further yet, localization system 2210 includes an integrator processor 2254c to process IMU data 2257, vehicle model data 2215, and 3D map data 2222, among other optional data. Similarly, relative localization system 2212 includes a Lidar localization processor 2254d for processing Lidar data 2272, 2D tile map data 2220, 3D map data 2222, and 3D local map data 2223, among other optional data. Relative localization system 2212 also includes a visual registration processor 2254e to process camera data 2274, 3D map data 2222, and 3D local map data 2223, among other optional data. Further yet, relative localization system 2212 includes a radar return processor 2254f to process radar data 2276, 3D map data 2222, and 3D local map data 2223, among other optional data. Note that in various examples, other types of sensor data and sensors or processors may be implemented, such as sonar data and the like.

Further to diagram 2200, localization-based data 2250 and relative localization-based data 2251 may be fed into data integrator 2266a and localization data integrator 2266, respectively. Data integrator 2266a and localization data integrator 2266 may be configured to fuse corresponding data, whereby localization-based data 2250 may be fused at data integrator 2266a prior to being fused with relative localization-based data 2251 at localization data integrator 2266. According to some embodiments, data integrator 2266a is formed as part of localization data integrator 2266, or is absent. Regardless, a localization-based data 2250 and relative localization-based data 2251 can be both fed into localization data integrator 2266 for purposes of fusing data to generate local position data 2252. Localization-based data 2250 may include unary-constrained data (and uncertainty values) from projection processor 2254a, as well as binary-constrained data (and uncertainty values) from odometry processor 2254b and integrator processor 2254c. Relative localization-based data 2251 may include unary-constrained data (and uncertainty values) from localization processor 2254d and visual registration processor 2254e, and optionally from radar return processor 2254f. According to some embodiments, localization data integrator 2266 may implement non-linear smoothing functionality, such as a Kalman filter (e.g., a gated Kalman filter), a relative bundle adjuster, pose-graph relaxation, particle filter, histogram filter, or the like.

Figure 23:
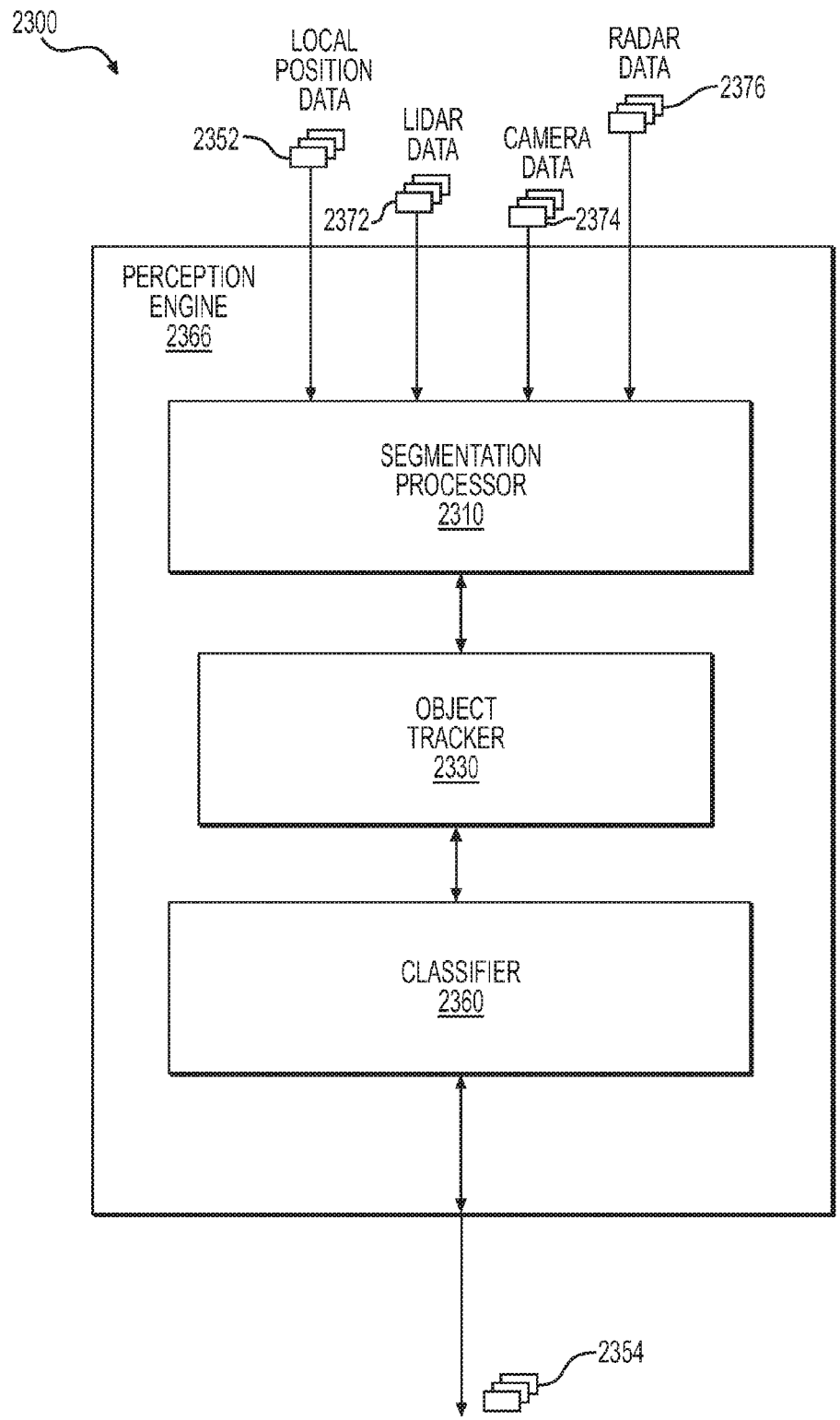
FIG. 23 is a diagram depicting an example of a perception engine, according to some embodiments.

FIG. 23 is a diagram depicting an example of a perception engine, according to some embodiments. Diagram 2300 includes a perception engine 2366, which, in turn, includes a segmentation processor 2310, an object tracker 2330, and a classifier 2360. Further, perception engine 2366 is configured to receive a local position data 2352, Lidar data 2372, camera data 2374, and radar data 2376, for example. Note that other sensor data, such as sonar data, may be accessed to provide functionalities of perception engine 2366. Segmentation processor 2310 is configured to extract ground plane data and/or to segment portions of an image to distinguish objects from each other and from static imagery (e.g., background). In some cases, 3D blobs may be segmented to distinguish each other. In some examples, a blob may refer to a set of features that identify an object in a spatially-reproduced environment and may be composed of elements (e.g., pixels of camera data, points of laser return data, etc.) having similar characteristics, such as intensity and color. In some examples, a blob may also refer to a point cloud (e.g., composed of colored laser return data) or other elements constituting an object. Object tracker 2330 is configured to perform frame-to-frame estimations of motion for blobs, or other segmented image portions. Further, data association is used to associate a blob at one location in a first frame at time, t1, to a blob in a different position in a second frame at time, t2. In some examples, object tracker 2330 is configured to perform real-time probabilistic tracking of 3-D objects, such as blobs. Classifier 2360 is configured to identify an object and to classify that object by classification type (e.g., as a pedestrian, cyclist, etc.) and by energy/activity (e.g. whether the object is dynamic or static), whereby data representing classification is described by a semantic label. According to some embodiments, probabilistic estimations of object categories may be performed, such as classifying an object as a vehicle, bicyclist, pedestrian, etc. with varying confidences per object class. Perception engine 2366 is configured to determine perception engine data 2354, which may include static object maps and/or dynamic object maps, as well as semantic information so that, for example, a planner may use this information to enhance path planning. According to various examples, one or more of segmentation processor 2310, object tracker 2330, and classifier 2360 may apply machine learning techniques to generate perception engine data 2354.

Figure 24:
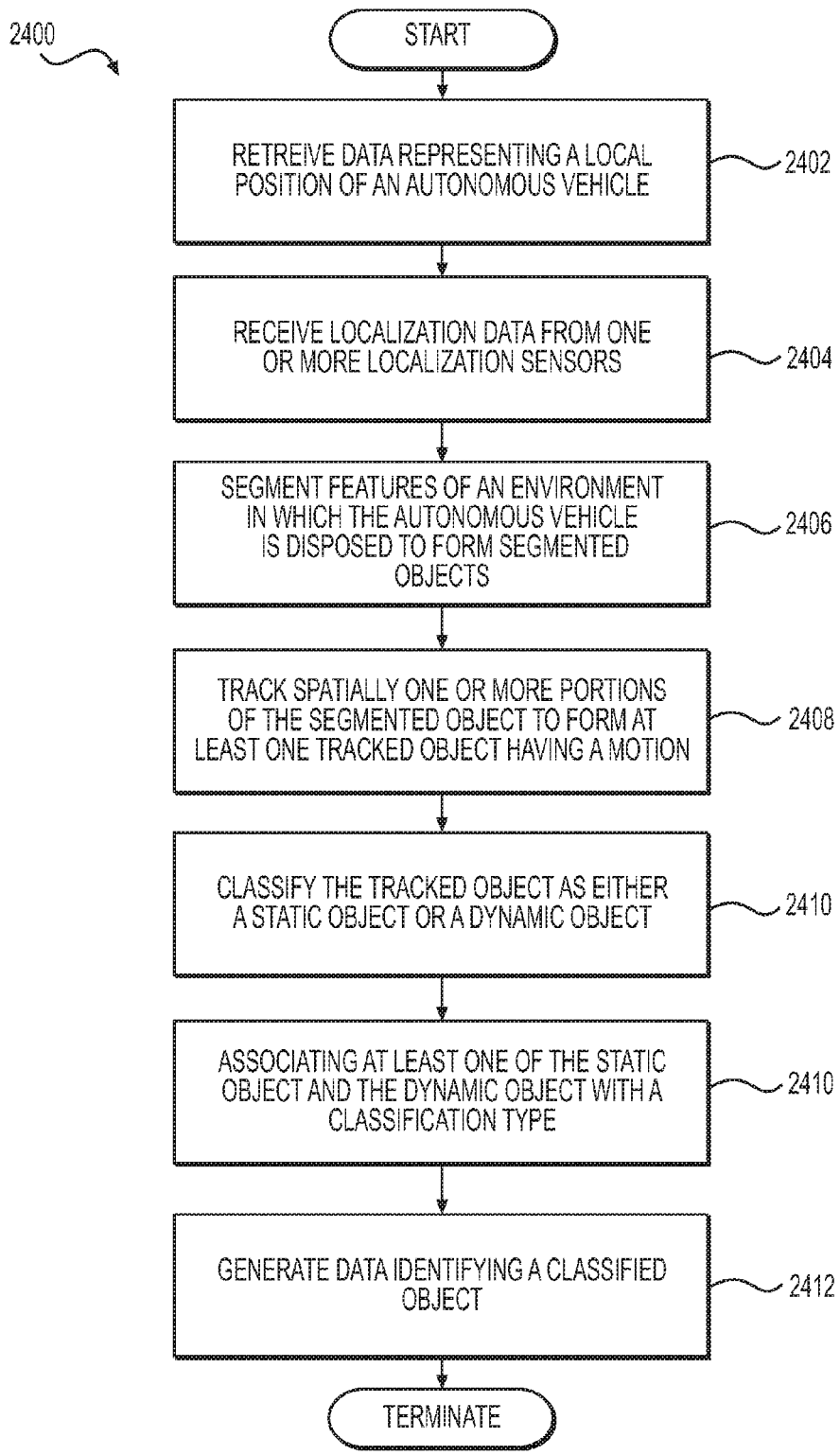
FIG. 24 is an example of a flow chart to generate perception engine data, according to some embodiments.

FIG. 24 is an example of a flow chart to generate perception engine data, according to some embodiments. Flow chart 2400 begins at 2402, at which data representing a local position of an autonomous vehicle is retrieved. At 2404, localization data from one or more localization sensors is received, and features of an environment in which the autonomous vehicle is disposed are segmented at 2406 to form segmented objects. One or more portions of the segmented object are tracked spatially at 2408 to form at least one tracked object having a motion (e.g., an estimated motion). At 2410, a tracked object is classified at least as either being a static object or a dynamic object. In some cases, a static object or a dynamic object may be associated with a classification type. At 2412, data identifying a classified object is generated. For example, the data identifying the classified object may include semantic information.

Figure 25:
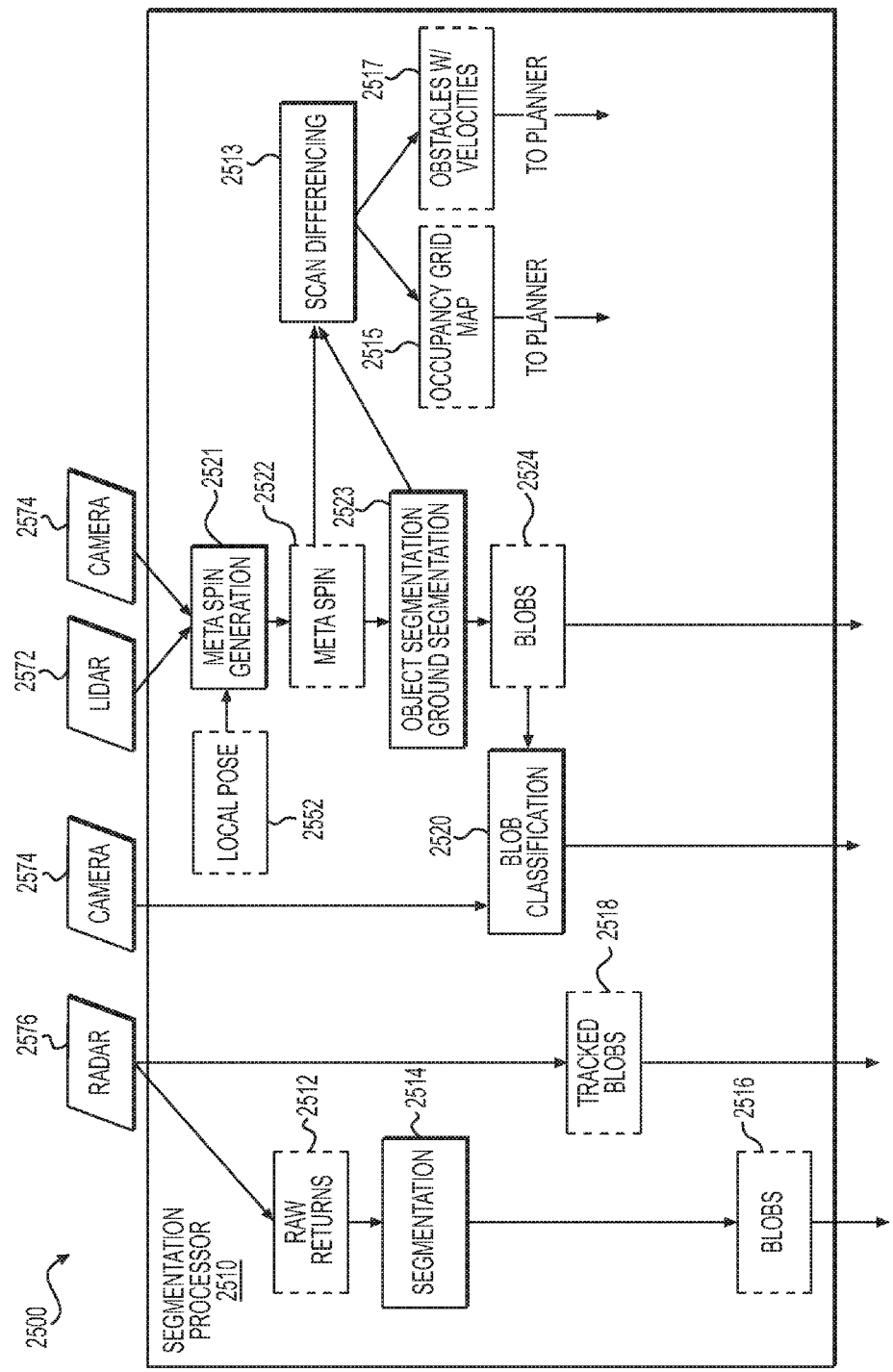
FIG. 25 is an example of a segmentation processor, according to some embodiments.

FIG. 25 is an example of a segmentation processor, according to some embodiments. Diagram 2500 depicts a segmentation processor 2510 receiving Lidar data from one or more Lidars 2572 and camera image data from one or more cameras 2574. Local pose data 2552, Lidar data, and camera image data are received into meta spin generator 2521. In some examples, meta spin generator is configured to partition an image based on various attributes (e.g., color, intensity, etc.) into distinguishable regions (e.g., clusters or groups of a point cloud), at least two or more of which may be updated at the same time or about the same time. Meta spin data 2522 is used to perform object segmentation and ground segmentation at segmentation processor 2523, whereby both meta spin data 2522 and segmentation-related data from segmentation processor 2523 are applied to a scanned differencing processor 2513. Scanned differencing processor 2513 is configured to predict motion and/or relative velocity of segmented image portions, which can be used to identify dynamic objects at 2517. Data indicating objects with detected velocity at 2517 are optionally transmitted to the planner to enhance path planning decisions. Additionally, data from scanned differencing processor 2513 may be used to approximate locations of objects to form mapping of such objects (as well as optionally identifying a level of motion). In some examples, an occupancy grid map 2515 may be generated. Data representing an occupancy grid map 2515 may be transmitted to the planner to further enhance path planning decisions (e.g., by reducing uncertainties). Further to diagram 2500, image camera data from one or more cameras 2574 are used to classify blobs in blob classifier 2520, which also receives blob data 2524 from segmentation processor 2523. Segmentation processor 2510 also may receive raw radar returns data 2512 from one or more radars 2576 to perform segmentation at a radar segmentation processor 2514, which generates radar-related blob data 2516. Further to FIG. 25, segmentation processor 2510 may also receive and/or generate tracked blob data 2518 related to radar data. Blob data 2516, tracked blob data 2518, data from blob classifier 2520, and blob data 2524 may be used to track objects or portions thereof. According to some examples, one or more of the following may be optional: scanned differencing processor 2513, blob classification 2520, and data from radar 2576.

Figure 26A:
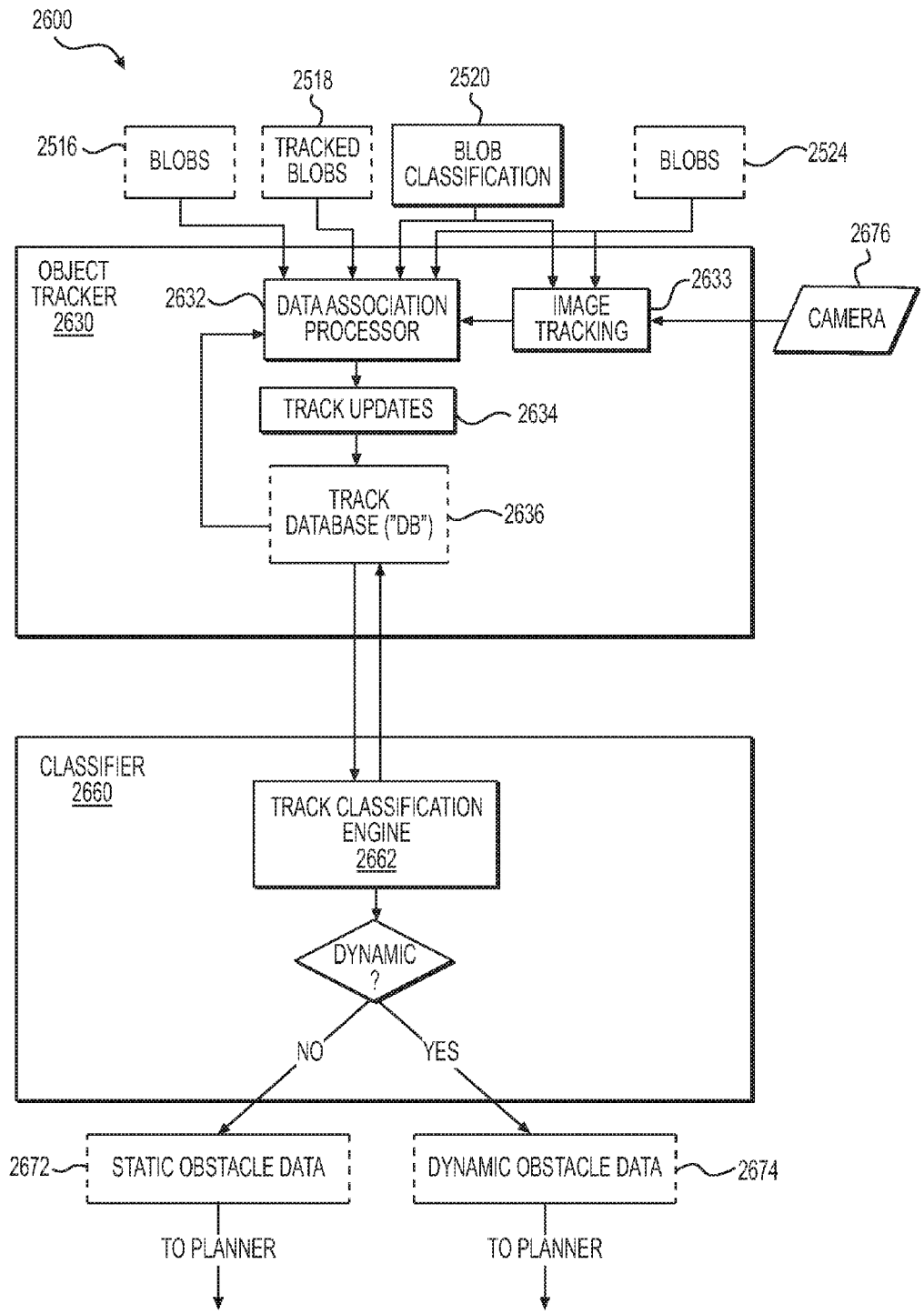
FIG. 26A is a diagram depicting examples of an object tracker and a classifier, according to various embodiments.

FIG. 26A is a diagram depicting examples of an object tracker and a classifier, according to various embodiments. Object tracker 2630 of diagram 2600 is configured to receive blob data 2516, tracked blob data 2518, data from blob classifier 2520, blob data 2524, and camera image data from one or more cameras 2676. Image tracker 2633 is configured to receive camera image data from one or more cameras 2676 to generate tracked image data, which, in turn, may be provided to data association processor 2632. As shown, data association processor 2632 is configured to receive blob data 2516, tracked blob data 2518, data from blob classifier 2520, blob data 2524, and track image data from image tracker 2633, and is further configured to identify one or more associations among the above-described types of data. Data association processor 2632 is configured to track, for example, various blob data from one frame to a next frame to, for example, estimate motion, among other things. Further, data generated by data association processor 2632 may be used by track updater 2634 to update one or more tracks, or tracked objects. In some examples, track updater 2634 may implement a Kalman Filter, or the like, to form updated data for tracked objects, which may be stored online in track database ("DB") 2636. Feedback data may be exchanged via path 2699 between data association processor 2632 and track database 2636. In some examples, image tracker 2633 may be optional and may be excluded. Object tracker 2630 may also use other sensor data, such as radar or sonar, as well as any other types of sensor data, for example.

Figure 26B:
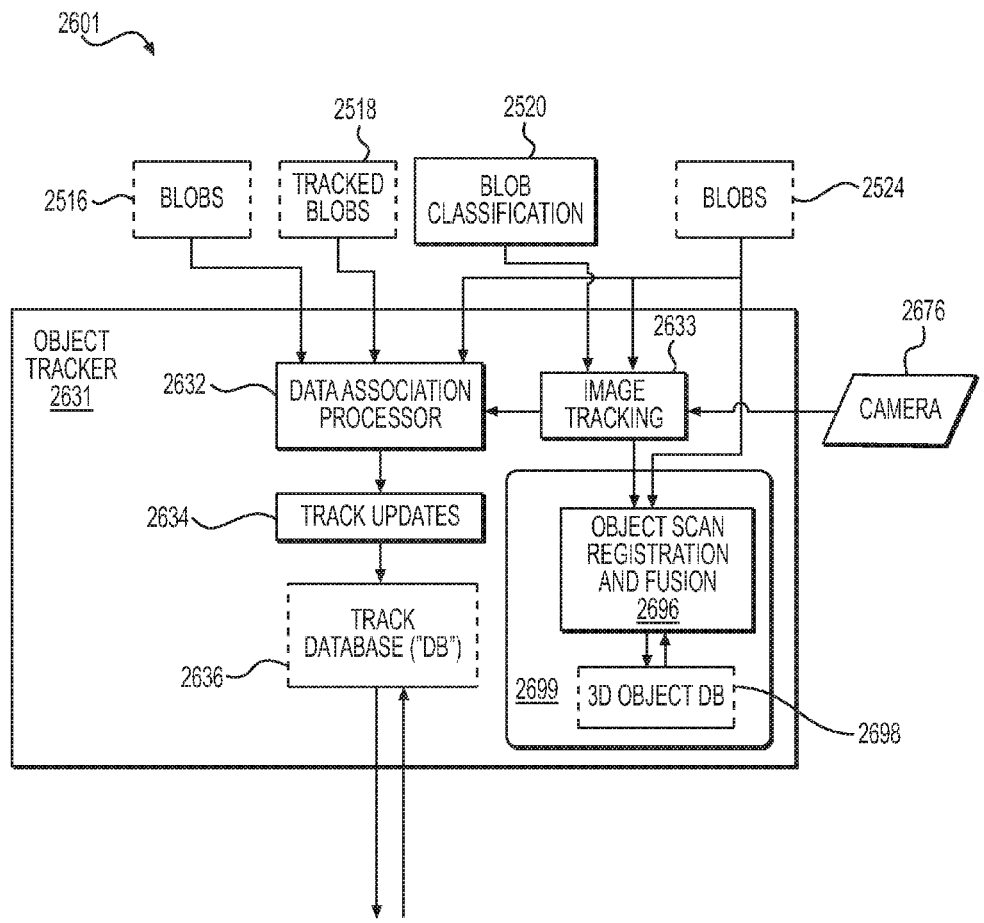
FIG. 26B is a diagram depicting another example of an object tracker according to at least some examples.

FIG. 26B is a diagram depicting another example of an object tracker according to at least some examples. Diagram 2601 includes an object tracker 2631 that may include structures and/or functions as similarly-named elements described in connection to one or more other drawings (e.g., FIG. 26A). As shown, object tracker 2631 includes an optional registration portion 2699 that includes a processor 2696 configured to perform object scan registration and data fusion. Processor 2696 is further configured to store the resultant data in 3D object database 2698.

Referring back to FIG. 26A, diagram 2600 also includes classifier 2660, which may include a track classification engine 2662 for generating static obstacle data 2672 and dynamic obstacle data 2674, both of which may be transmitted to the planner for path planning purposes. In at least one example, track classification engine 2662 is configured to determine whether an obstacle is static or dynamic, as well as another classification type for the object (e.g., whether the object is a vehicle, pedestrian, tree, cyclist, dog, cat, paper bag, etc.). Static obstacle data 2672 may be formed as part of an obstacle map (e.g., a 2D occupancy map), and dynamic obstacle data 2674 may be formed to include bounding boxes with data indicative of velocity and classification type. Dynamic obstacle data 2674, at least in some cases, includes 2D dynamic obstacle map data.

Figure 27:
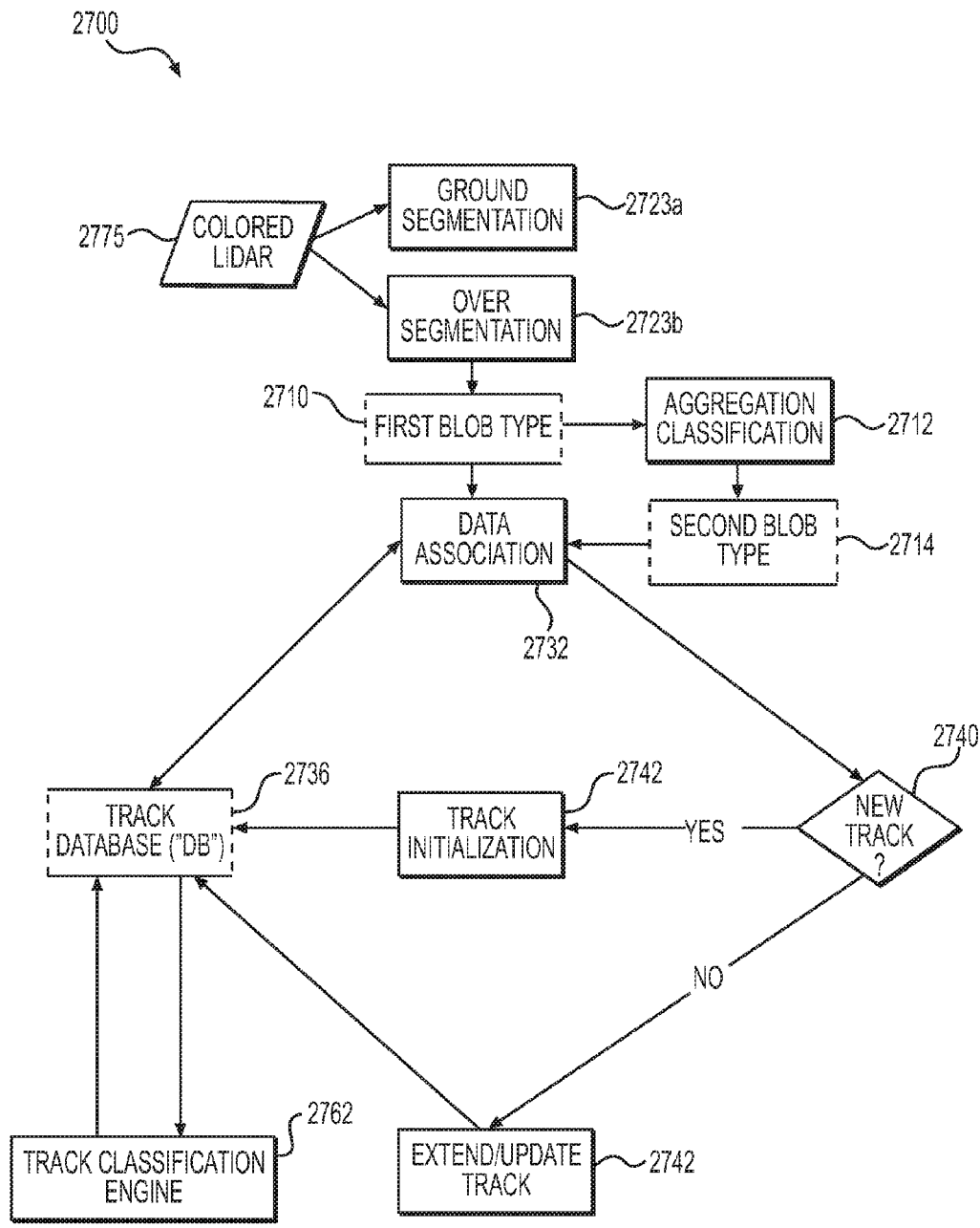
FIG. 27 is an example of front-end processor for a perception engine, according to some examples.

FIG. 27 is an example of front-end processor for a perception engine, according to some examples. Diagram 2700 includes a ground segmentation processor 2723a for performing ground segmentation, and an over segmentation processor 2723b for performing "over-segmentation," according to various examples. Processors 2723a and 2723b are configured to receive optionally colored Lidar data 2775. Over segmentation processor 2723b generates data 2710 of a first blob type (e.g., a relatively small blob), which is provided to an aggregation classification and segmentation engine 2712 that generates data 2714 of a second blob type. Data 2714 is provided to data association processor 2732, which is configured to detect whether data 2714 resides in track database 2736. A determination is made at 2740 whether data 2714 of the second blob type (e.g., a relatively large blob, which may include one or more smaller blobs) is a new track. If so, a track is initialized at 2742, otherwise, the tracked object data stored in track database 2736 and the track may be extended or updated by track updater 2742. Track classification engine 2762 is coupled to track database 2736 to identify and update/modify tracks by, for example, adding, removing or modifying track-related data.

Figure 28:
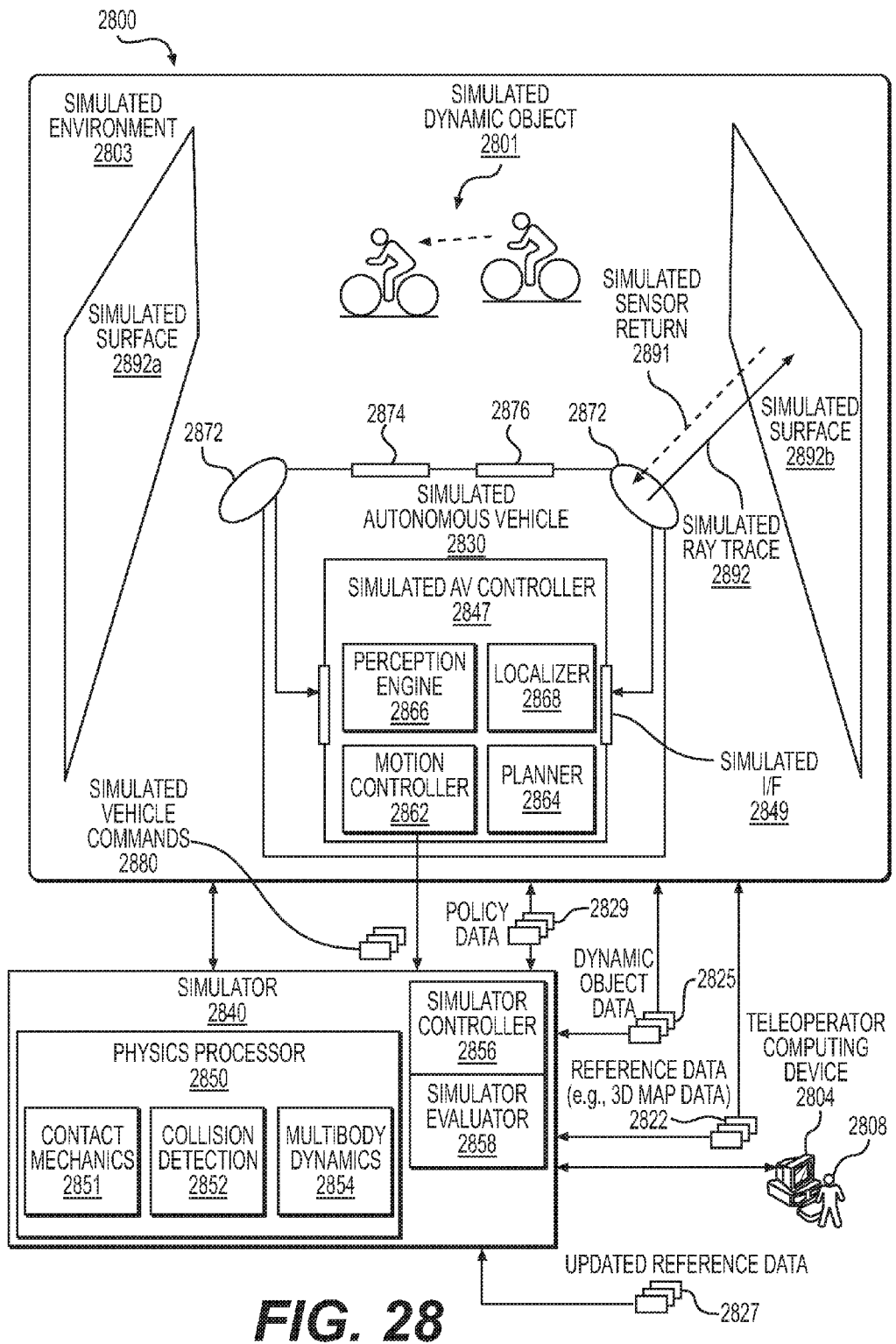
FIG. 28 is a diagram depicting a simulator configured to simulate an autonomous vehicle in a synthetic environment, according to various embodiments.

FIG. 28 is a diagram depicting a simulator configured to simulate an autonomous vehicle in a synthetic environment, according to various embodiments. Diagram 2800 includes a simulator 2840 that is configured to generate a simulated environment 2803. As shown, simulator 2840 is configured to use reference data 2822 (e.g., 3D map data and/or other map or route data including RNDF data or similar road network data) to generate simulated geometries, such as simulated surfaces 2892a and 2892b, within simulated environment 2803. Simulated surfaces 2892a and 2892b may simulate walls or front sides of buildings adjacent a roadway. Simulator 2840 may also pre-generated or procedurally generated use dynamic object data 2825 to simulate dynamic agents in a synthetic environment. An example of a dynamic agent is simulated dynamic object 2801, which is representative of a simulated cyclist having a velocity. The simulated dynamic agents may optionally respond to other static and dynamic agents in the simulated environment, including the simulated autonomous vehicle. For example, simulated object 2801 may slow down for other obstacles in simulated environment 2803 rather than follow a preset trajectory, thereby creating a more realistic simulation of actual dynamic environments that exist in the real world.

Simulator 2840 may be configured to generate a simulated autonomous vehicle controller 2847, which includes synthetic adaptations of a perception engine 2866, a localizer 2868, a motion controller 2862, and a planner 2864, each of which may have functionalities described herein within simulated environment 2803. Simulator 2840 may also generate simulated interfaces ("I/F") 2849 to simulate the data exchanges with different sensors modalities and different sensor data formats. As such, simulated interface 2849 may simulate a software interface for packetized data from, for example, a simulated Lidar sensor 2872. Further, simulator 2840 may also be configured to generate a simulated autonomous vehicle 2830 that implements simulated AV controller 2847. Simulated autonomous vehicle 2830 includes simulated Lidar sensors 2872, simulated camera or image sensors 2874, and simulated radar sensors 2876. In the example shown, simulated Lidar sensor 2872 may be configured to generate a simulated laser consistent with ray trace 2892, which causes generation of simulated sensor return 2891. Note that simulator 2840 may simulate the addition of noise or other environmental effects on sensor data (e.g., added diffusion or reflections that affect simulated sensor return 2891, etc.). Further yet, simulator 2840 may be configured to simulate a variety of sensor defects, including sensor failure, sensor miscalibration, intermittent data outages, and the like.

Simulator 2840 includes a physics processor 2850 for simulating the mechanical, static, dynamic, and kinematic aspects of an autonomous vehicle for use in simulating behavior of simulated autonomous vehicle 2830. For example, physics processor 2850 includes a content mechanics module 2851 for simulating contact mechanics, a collision detection module 2852 for simulating the interaction between simulated bodies, and a multibody dynamics module 2854 to simulate the interaction between simulated mechanical interactions.

Simulator 2840 also includes a simulator controller 2856 configured to control the simulation to adapt the functionalities of any synthetically-generated element of simulated environment 2803 to determine cause-effect relationship, among other things. Simulator 2840 includes a simulator evaluator 2858 to evaluate the performance synthetically-generated element of simulated environment 2803. For example, simulator evaluator 2858 may analyze simulated vehicle commands 2880 (e.g., simulated steering angles and simulated velocities) to determine whether such commands are an appropriate response to the simulated activities within simulated environment 2803. Further, simulator evaluator 2858 may evaluate interactions of a teleoperator 2808 with the simulated autonomous vehicle 2830 via teleoperator computing device 2804. Simulator evaluator 2858 may evaluate the effects of updated reference data 2827, including updated map tiles and route data, which may be added to guide the responses of simulated autonomous vehicle 2830. Simulator evaluator 2858 may also evaluate the responses of simulator AV controller 2847 when policy data 2829 is updated, deleted, or added. The above-description of simulator 2840 is not intended to be limiting. As such, simulator 2840 is configured to perform a variety of different simulations of an autonomous vehicle relative to a simulated environment, which include both static and dynamic features. For example, simulator 2840 may be used to validate changes in software versions to ensure reliability. Simulator 2840 may also be used to determine vehicle dynamics properties and for calibration purposes. Further, simulator 2840 may be used to explore the space of applicable controls and resulting trajectories so as to effect learning by self-simulation.

Figure 29:
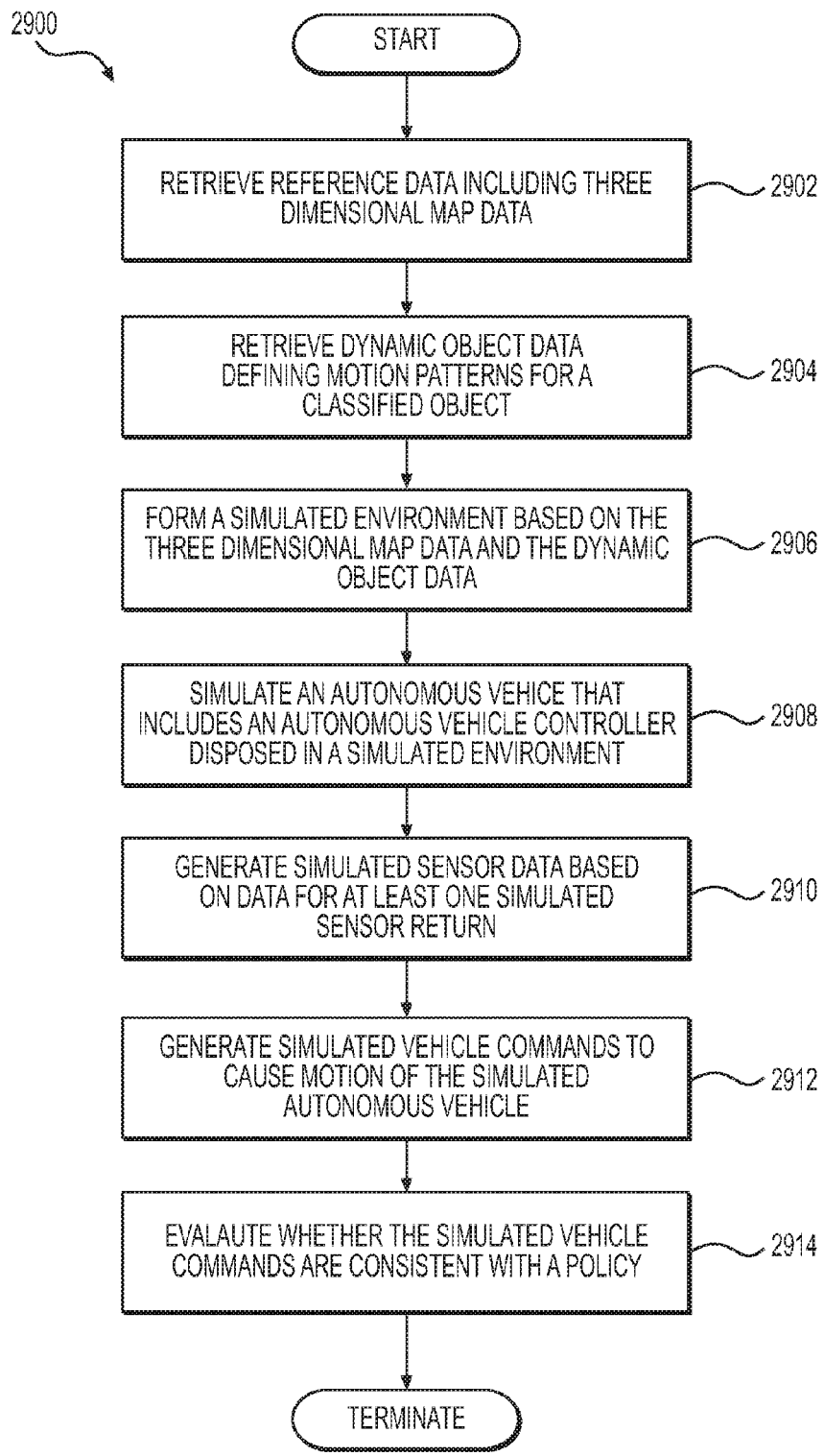
FIG. 29 is an example of a flow chart to simulate various aspects of an autonomous vehicle, according to some embodiments.

FIG. 29 is an example of a flow chart to simulate various aspects of an autonomous vehicle, according to some embodiments. Flow chart 2900 begins at 2902, at which reference data including three dimensional map data is received into a simulator. Dynamic object data defining motion patterns for a classified object may be retrieved at 2904. At 2906, a simulated environment is formed based on at least three dimensional ("3D") map data and the dynamic object data. The simulated environment may include one or more simulated surfaces. At 2908, an autonomous vehicle is simulated that includes a simulated autonomous vehicle controller that forms part of a simulated environment. The autonomous vehicle controller may include a simulated perception engine and a simulated localizer configured to receive sensor data. At 2910, simulated sensor data are generated based on data for at least one simulated sensor return, and simulated vehicle commands are generated at 2912 to cause motion (e.g., vectored propulsion) by a simulated autonomous vehicle in a synthetic environment. At 2914, simulated vehicle commands are evaluated to determine whether the simulated autonomous vehicle behaved consistent with expected behaviors (e.g., consistent with a policy).

Figure 30:
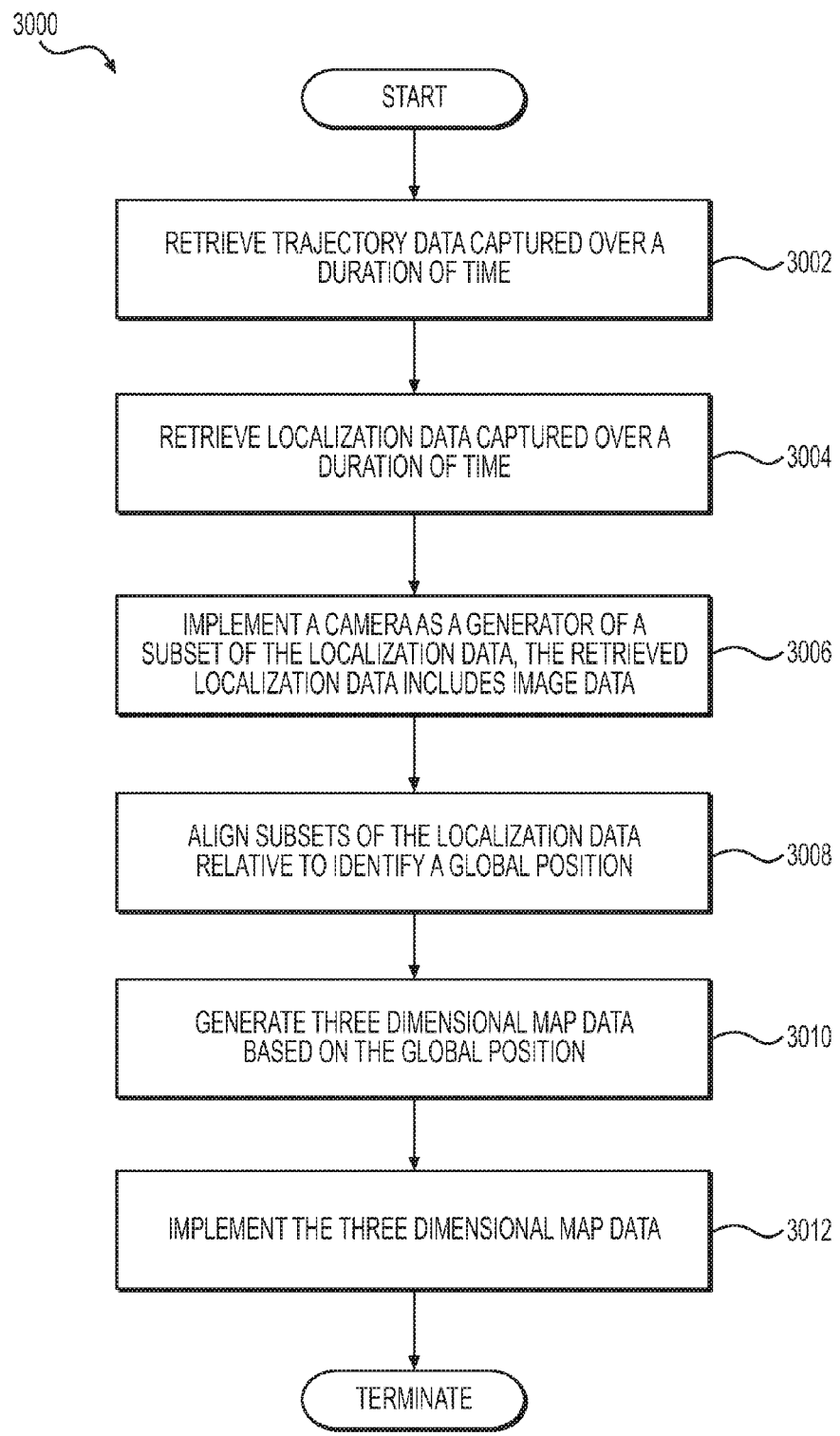
FIG. 30 is an example of a flow chart to generate map data, according to some embodiments.

FIG. 30 is an example of a flow chart to generate map data, according to some embodiments. Flow chart 3000 begins at 3002, at which trajectory data is retrieved. The trajectory data may include trajectories captured over a duration of time (e.g., as logged trajectories). At 3004, at least localization data may be received. The localization data may be captured over a duration of time (e.g., as logged localization data). At 3006, a camera or other image sensor may be implemented to generate a subset of the localization data As such, the retrieved localization data may include image data. At 3008, subsets of localization data are aligned to identifying a global position (e.g., a global pose). At 3010, three dimensional ("3D") map data is generated based on the global position, and at 3012, the 3 dimensional map data is available for implementation by, for example, a manual route data editor (e.g., including a manual road network data editor, such as an RNDF editor), an automated route data generator (e.g., including an automatic road network generator, including an automatic RNDF generator), a fleet of autonomous vehicles, a simulator, a teleoperator computing device, and any other component of an autonomous vehicle service.

Figure 31:
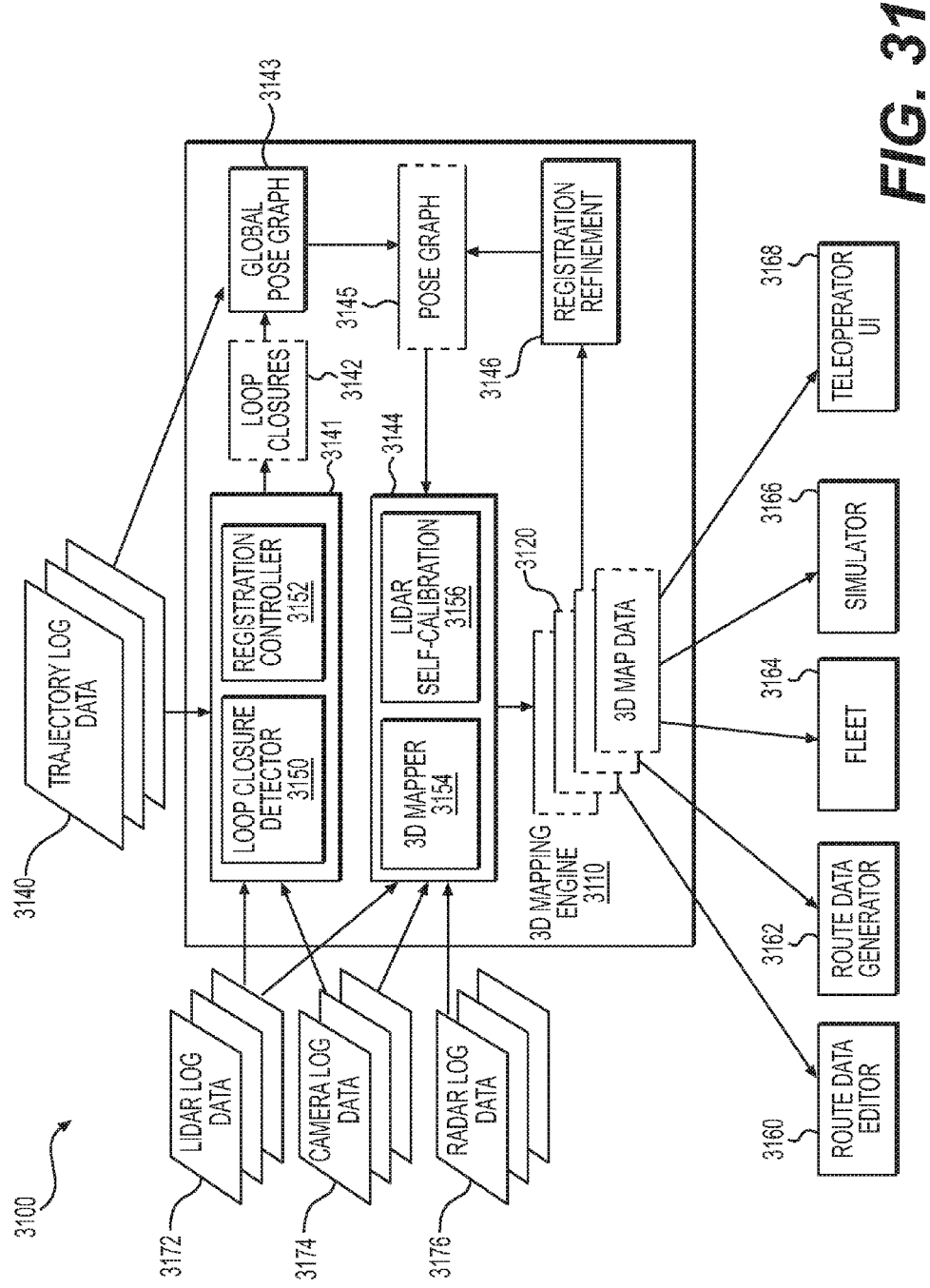
FIG. 31 is a diagram depicting an architecture of a mapping engine, according to some embodiments

FIG. 31 is a diagram depicting an architecture of a mapping engine, according to some embodiments. Diagram 3100 includes a 3D mapping engine that is configured to receive trajectory log data 3140, Lidar log data 3172, camera log data 3174, radar log data 3176, and other optional logged sensor data (not shown). Logic 3141 includes a loop-closure detector 3150 configured to detect whether sensor data indicates a nearby point in space has been previously visited, among other things. Logic 3141 also includes a registration controller 3152 for aligning map data, including 3D map data in some cases, relative to one or more registration points. Further, logic 3141 provides data 3142 representing states of loop closures for use by a global pose graph generator 3143, which is configured to generate pose graph data 3145. In some examples, pose graph data 3145 may also be generated based on data from registration refinement module 3146. Logic 3144 includes a 3D mapper 3154 and a Lidar self-calibration unit 3156. Further, logic 3144 receives sensor data and pose graph data 3145 to generate 3D map data 3120 (or other map data, such as 4D map data). In some examples, logic 3144 may implement a truncated sign distance function ("TSDF") to fuse sensor data and/or map data to form optimal three-dimensional maps. Further, logic 3144 is configured to include texture and reflectance properties. 3D map data 3120 may be released for usage by a manual route data editor 3160 (e.g., an editor to manipulate Route data or other types of route or reference data), an automated route data generator 3162 (e.g., logic to configured to generate route data or other types of road network or reference data), a fleet of autonomous vehicles 3164, a simulator 3166, a teleoperator computing device 3168, and any other component of an autonomous vehicle service. Mapping engine 3110 may capture semantic information from manual annotation or automatically-generated annotation as well as other sensors, such as sonar or instrumented environment (e.g., smart stop-lights).

Figure 32:
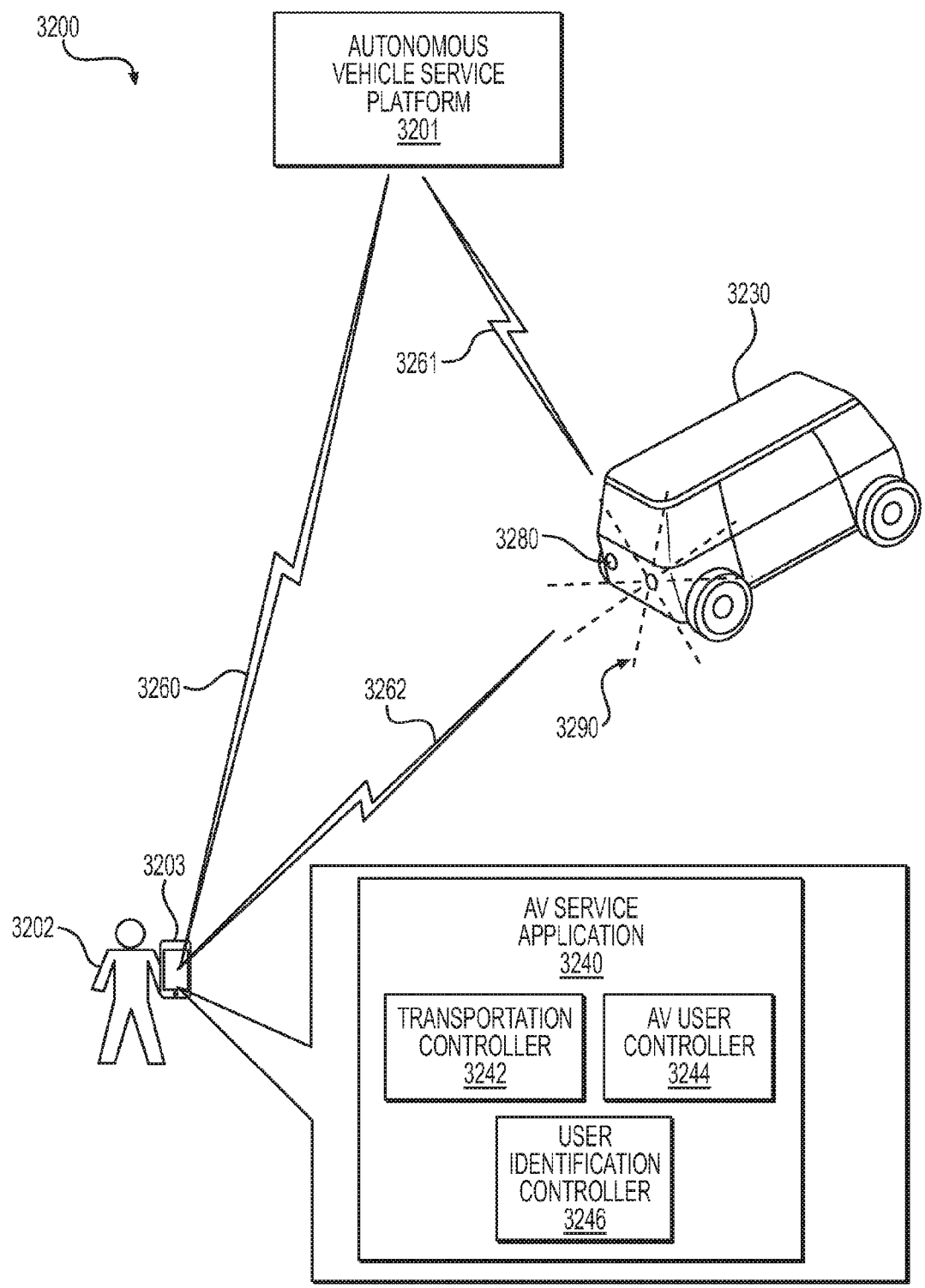
FIG. 32 is a diagram depicting an autonomous vehicle application, according to some examples.

FIG. 32 is a diagram depicting an autonomous vehicle application, according to some examples. Diagram 3200 depicts a mobile computing device 3203 including an autonomous service application 3240 that is configured to contact an autonomous vehicle service platform 3201 to arrange transportation of user 3202 via an autonomous vehicle 3230. As shown, autonomous service application 3240 may include a transportation controller 3242, which may be a software application residing on a computing device (e.g., a mobile phone 3203, etc.). Transportation controller 3242 is configured to receive, schedule, select, or perform operations related to autonomous vehicles and/or autonomous vehicle fleets for which a user 3202 may arrange transportation from the user's location to a destination. For example, user 3202 may open up an application to request vehicle 3230. The application may display a map and user 3202 may drop a pin to indicate their destination within, for example, a geo-fenced region. Alternatively, the application may display a list of nearby pre-specified pick-up locations, or provide the user with a text entry field in which to type a destination either by address or by name.

Further to the example shown, autonomous vehicle application 3240 may also include a user identification controller 3246 that may be configured to detect that user 3202 is in a geographic region, or vicinity, near autonomous vehicle 3230, as the vehicle approaches. In some situations, user 3202 may not readily perceive or identify autonomous vehicle 3230 as it approaches for use by user 3203 (e.g., due to various other vehicles, including trucks, cars, taxis, and other obstructions that are typical in city environments). In one example, autonomous vehicle 3230 may establish a wireless communication link 3262 (e.g., via a radio frequency ("RF") signal, such as WiFi or Bluetooth®, including BLE, or the like) for communicating and/or determining a spatial location of user 3202 relative to autonomous vehicle 3230 (e.g., using relative direction of RF signal and signal strength). In some cases, autonomous vehicle 3230 may detect an approximate geographic location of user 3202 using, for example, GPS data or the like. A GPS receiver (not shown) of mobile computing device 3203 may be configured to provide GPS data to autonomous vehicle service application 3240. Thus, user identification controller 3246 may provide GPS data via link 3260 to autonomous vehicle service platform 3201, which, in turn, may provide that location to autonomous vehicle 3230 via link 3261. Subsequently, autonomous vehicle 3230 may determine a relative distance and/or direction of user 3202 by comparing the user's GPS data to the vehicle's GPS-derived location.

Autonomous vehicle 3230 may also include additional logic to identify the presence of user 3202, such that logic configured to perform face detection algorithms to detect either user 3202 generally, or to specifically identify the identity (e.g., name, phone number, etc.) of user 3202 based on the user's unique facial characteristics. Further, autonomous vehicle 3230 may include logic to detect codes for identifying user 3202. Examples of such codes include specialized visual codes, such as QR codes, color codes, etc., specialized audio codes, such as voice activated or recognized codes, etc., and the like. In some cases, a code may be an encoded security key that may be transmitted digitally via link 3262 to autonomous vehicle 3230 to ensure secure ingress and/or egress. Further, one or more of the above-identified techniques for identifying user 3202 may be used as a secured means to grant ingress and egress privileges to user 3202 so as to prevent others from entering autonomous vehicle 3230 (e.g., to ensure third party persons do not enter an unoccupied autonomous vehicle prior to arriving at user 3202). According to various examples, any other means for identifying user 3202 and providing secured ingress and egress may also be implemented in one or more of autonomous vehicle service application 3240, autonomous vehicle service platform 3201, and autonomous vehicle 3230.

To assist user 3302 in identifying the arrival of its requested transportation, autonomous vehicle 3230 may be configured to notify or otherwise alert user 3202 to the presence of autonomous vehicle 3230 as it approaches user 3202. For example, autonomous vehicle 3230 may activate one or more light-emitting devices 3280 (e.g., LEDs) in accordance with specific light patterns. In particular, certain light patterns are created so that user 3202 may readily perceive that autonomous vehicle 3230 is reserved to service the transportation needs of user 3202. As an example, autonomous vehicle 3230 may generate light patterns 3290 that may be perceived by user 3202 as a "wink," or other animation of its exterior and interior lights in such a visual and temporal way. The patterns of light 3290 may be generated with or without patterns of sound to identify to user 3202 that this vehicle is the one that they booked.

According to some embodiments, autonomous vehicle user controller 3244 may implement a software application that is configured to control various functions of an autonomous vehicle. Further, an application may be configured to redirect or reroute the autonomous vehicle during transit to its initial destination. Further, autonomous vehicle user controller 3244 may be configured to cause on-board logic to modify interior lighting of autonomous vehicle 3230 to effect, for example, mood lighting. Controller 3244 may also control a source of audio (e.g., an external source such as Spotify, or audio stored locally on the mobile computing device 3203), select a type of ride (e.g., modify desired acceleration and braking aggressiveness, modify active suspension parameters to select a set of "road-handling" characteristics to implement aggressive driving characteristics, including vibrations, or to select "soft-ride" qualities with vibrations dampened for comfort), and the like. For example, mobile computing device 3203 may be configured to control HVAC functions as well, like ventilation and temperature.

Figure 33:
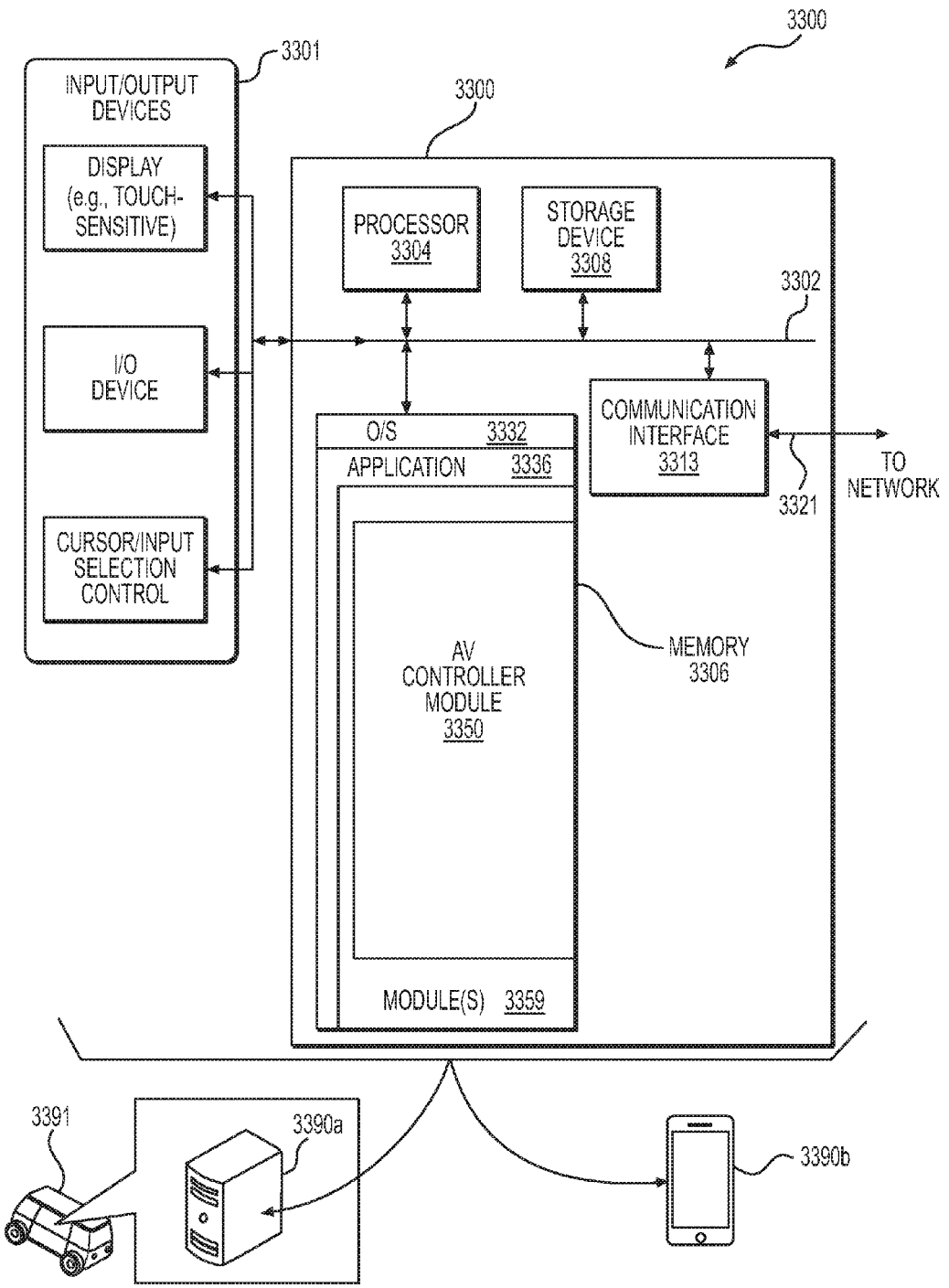
FIGS. 33 to 35 illustrate examples of various computing platforms configured to provide various functionalities to components of an autonomous vehicle service, according to various embodiments.
Figure 34:
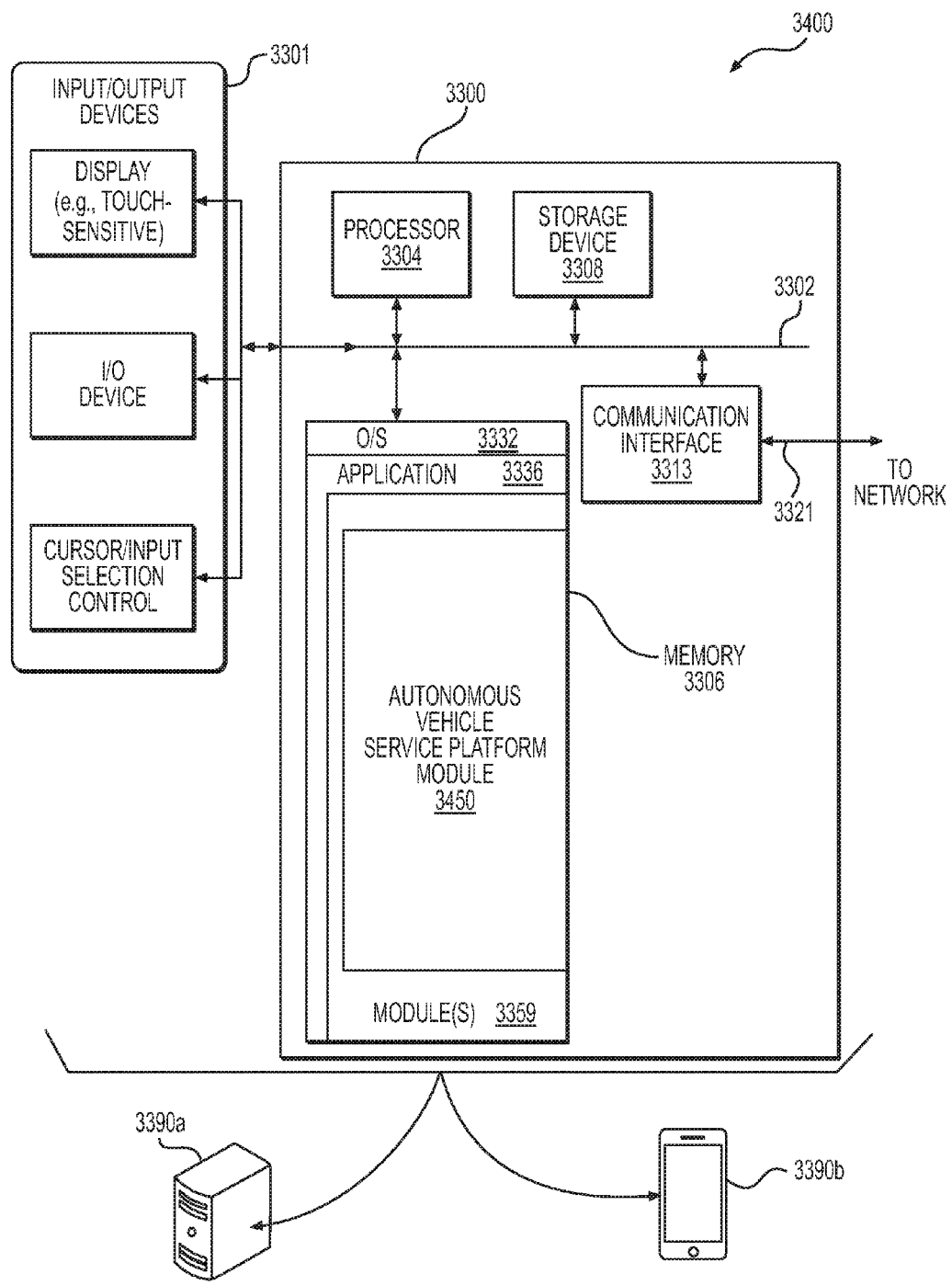
Figure 35:
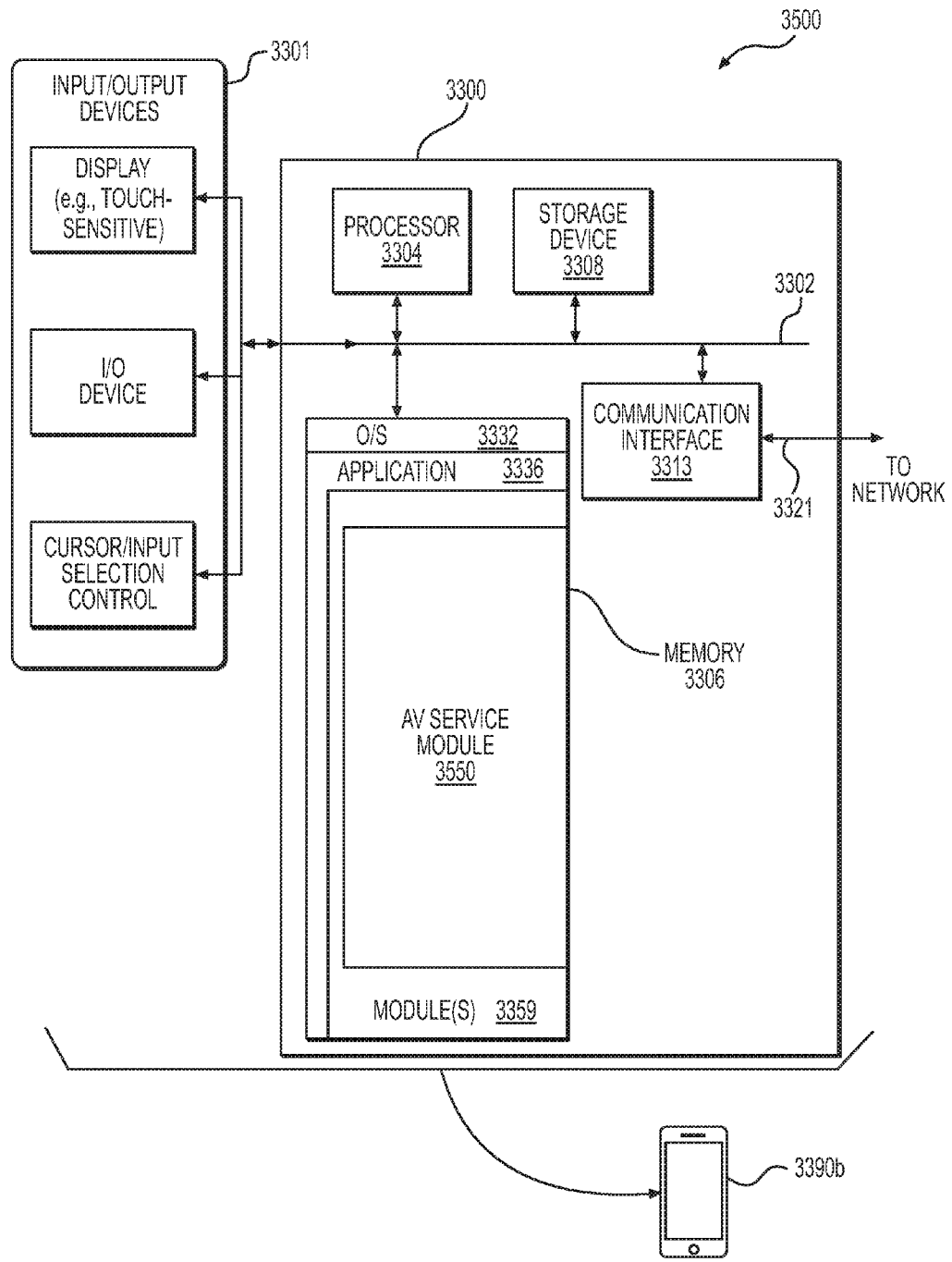

FIGS. 33 to 35 illustrate examples of various computing platforms configured to provide various functionalities to components of an autonomous vehicle service, according to various embodiments. In some examples, computing platform 3300 may be used to implement computer programs, applications, methods, processes, algorithms, or other software to perform the above-described techniques.

Note that various structures and/or functionalities of FIG. 33 are applicable to FIGS. 34 and 35, and, as such, some elements in those figures may be discussed in the context of FIG. 33.

In some cases, computing platform 3300 can be disposed in any device, such as a computing device 3390a, which may be disposed in or distributed among one or more computing devices in an autonomous vehicle service platform, an autonomous vehicle 3391, and/or mobile computing device 3390b.

Computing platform 3300 includes a bus 3302 or other communication mechanism for communicating information, which interconnects subsystems and devices, such as processor 3304, system memory 3306 (e.g., RAM, etc.), storage device 3308 (e.g., ROM, etc.), an in-memory cache (which may be implemented in RAM 3306 or other portions of computing platform 3300), a communication interface 3313 (e.g., an Ethernet or wireless controller, a Bluetooth controller, NFC logic, etc.) to facilitate communications via a port on communication link 3321 to communicate, for example, with a computing device, including mobile computing and/or communication devices with processors. Processor 3304 can be implemented with one or more graphics processing units ("GPUs"), with one or more central processing units ("CPUs"), such as those manufactured by Intel® Corporation, or one or more virtual processors, as well as any combination of CPUs and virtual processors. Computing platform 3300 exchanges data representing inputs and outputs via input-and-output devices 3301, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 3300 performs specific operations by processor 3304 executing one or more sequences of one or more instructions stored in system memory 3306, and computing platform 3300 can be implemented in a client-server arrangement, peer-to-peer arrangement, or as any mobile computing device, including smart phones and the like. Such instructions or data may be read into system memory 3306 from another computer readable medium, such as storage device 3308. In some examples, hard-wired circuitry may be used in place of or in combination with software instructions for implementation. Instructions may be embedded in software or firmware. The term "computer readable medium" refers to any tangible medium that participates in providing instructions to processor 3304 for execution. Such a medium may take many forms, including but not limited to, non-volatile media and volatile media. Non-volatile media includes, for example, optical or magnetic disks and the like. Volatile media includes dynamic memory, such as system memory 3306.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3302 for transmitting a computer data signal.

In some examples, execution of the sequences of instructions may be performed by computing platform 3300. According to some examples, computing platform 3300 can be coupled by communication link 3321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3300 may transmit and receive messages, data, and instructions, including program code (e.g., application code) through communication link 3321 and communication interface 3313. Received program code may be executed by processor 3304 as it is received, and/or stored in memory 3306 or other non-volatile storage for later execution.

In the example shown, system memory 3306 can include various modules that include executable instructions to implement functionalities described herein. System memory 3306 may include an operating system ("O/S") 3332, as well as an application 3336 and/or logic module(s) 3359. In the example shown in FIG. 33, system memory 3306 includes an autonomous vehicle ("AV") controller module 3350 and/or its components (e.g., a perception engine module, a localization module, a planner module, and/or a motion controller module), any of which, or one or more portions of which, can be configured to facilitate an autonomous vehicle service by implementing one or more functions described herein.

Referring to the example shown in FIG. 34, system memory 3306 includes an autonomous vehicle service platform module 3450 and/or its components (e.g., a teleoperator manager, a simulator, etc.), any of which, or one or more portions of which, can be configured to facilitate managing an autonomous vehicle service by implementing one or more functions described herein.

Referring to the example shown in FIG. 35, system memory 3306 includes an autonomous vehicle ("AV") module and/or its components for use, for example, in a mobile computing device. One or more portions of module 3550 can be configured to facilitate delivery of an autonomous vehicle service by implementing one or more functions described herein.

Referring back to FIG. 33, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, module 3350 of FIG. 33, module 3450 of FIG. 34, and module 3550 of FIG. 35, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3359 (module 3350 of FIG. 33, module 3450 of FIG. 34, and module 3550 of FIG. 35) or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, module 3350 of FIG. 33, module 3450 of FIG. 34, and module 3550 of FIG. 35, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, module 3350 of FIG. 33, module 3450 of FIG. 34, and module 3550 of FIG. 35, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 36:
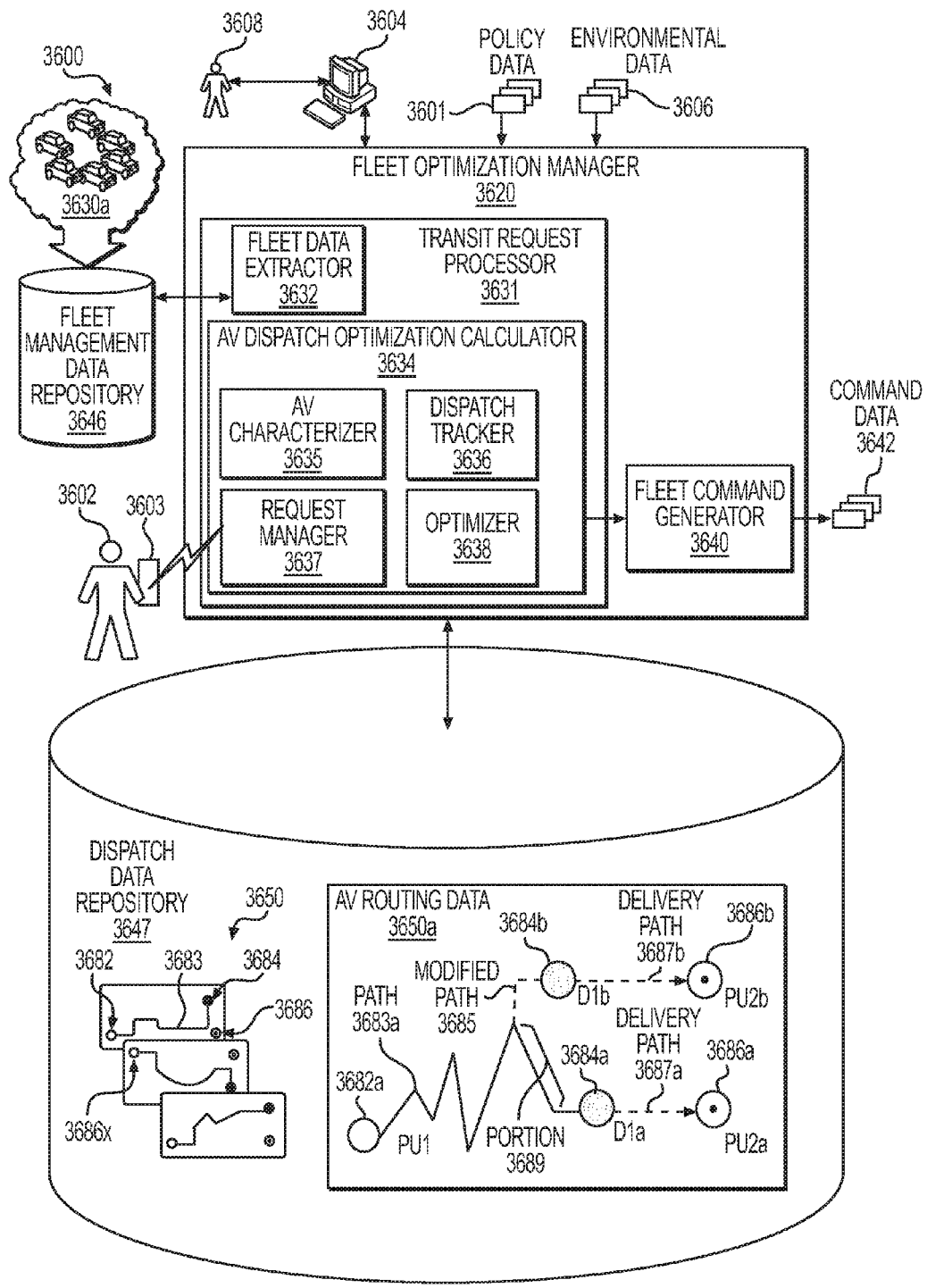
FIG. 36 is a diagram depicting an example of a fleet optimization manager, according to some examples.

FIG. 36 is a diagram depicting an example of a fleet optimization manager, according to some examples. Diagram 3600 depicts a fleet optimization manager 3620 that may be configured to facilitate management of a fleet of autonomous vehicles 3630a, one or more of which are transiting within a road network. In particular, fleet optimization manager 3620 may be configured to receive one or more requests for transportation via a mobile computing device 3603 (e.g., a mobile phone) from a user 3602, and further configured to coordinate the dispatching of a fleet of autonomous vehicles 3630a to service the requests in accordance with one or more optimization processes (e.g., optimization algorithms). Diagram 3600 further depicts a transit request processor 3631 coupled to a dispatch data repository 3647, transit request processor 3631 being configured to process transit requests, such as requests for transportation, and a fleet command generator 3640 that may be configured to generate command data 3642. Command data 3642 may include one or more subsets of executable instructions that, when transmitted and executed by an autonomous vehicle controller of an autonomous vehicle, provides for navigation of one or more autonomous vehicles 3630a in an to optimized manner.

In the example shown, transit request processor 3631 may include a fleet data extractor 3632 configured to access and/or extract fleet management data stored in fleet management data repository 3646. Examples of fleet management data, which may relate to one or more autonomous vehicles in fleet 3630a, may include data describing maintenance issues, scheduled service calls, daily usage, battery charge and discharge rates, and any other data describing at least some autonomous vehicle characteristics. In some examples, at least a subset of fleet management data (e.g., autonomous vehicle characteristics) may be updated in real-time (or near real-time) to optimize a fleet of autonomous vehicles in accordance with one or more routing metrics, such minimizing downtime, minimizing battery discharge rates, reducing travel time between pick up and destination locations, etc. Transit request processor 3631 may include an autonomous vehicle ("AV") dispatch optimization calculator 3634 that may be configured to analyze data from various sources (e.g., extracted fleet management data, policy data 3601, environmental data 3606, etc.) and calculate optimized usage of the fleet 3630a so as to ensure that the next vehicle dispatched to service a request provides for the least travel times and/or costs for an autonomous vehicle service, according to some examples. As shown, autonomous vehicle dispatch optimization calculator 3634 may include an autonomous vehicle ("AV") characterizer 3635, a dispatch tracker 3636, a request manager 3637, and an optimizer 3638, examples of which are described below. Note that one or more elements depicted in diagram 3600 of FIG. 36 may include structures and/or functions as similarly-named elements described in relation to one or more other drawings, such as FIGS. 16 to 19, among others, as described herein.

Autonomous vehicle dispatch optimization calculator 3634 may be configured to generate autonomous vehicle routing data 3650 that may be stored in dispatch data repository 3647. Autonomous vehicle routing data 3650 may include data representing an optimal set or subset of paths over which a fleet of autonomous vehicles 3630a transits may provide transportation services to a set or subset of users 3602, according to some examples. In some examples, each portion 3650 of autonomous vehicle routing data may describe routing paths for navigating a corresponding autonomous vehicle. As shown, an instance of autonomous vehicle routing data 3650 may include data representing a point of origination 3682, such as a geographic location (e.g., as described by GPS coordinates or the like) and/or other data associated with a point at which the user is picked up by an autonomous vehicle. Further, an instance of autonomous vehicle routing data 3650 may also include data representing a path 3683 from origination point (or location) 3682 to a destination point (or location) 3684, as well as a delivery point (or location) 3686 at which, for example, another user 3602 may be subsequently picked up for obtaining subsequent transportation services provided by the autonomous vehicle. Instances of autonomous vehicle routing data 3650 depicted in FIG. 36 may include sets of routing data for one or more different autonomous vehicles or the same autonomous vehicles. For example, delivery point 3686 may be associated with an origination location 3686x in other sets or subsets of routing data 3650 for subsequently routing the autonomous vehicle.

According to some examples, autonomous vehicle dispatch optimization calculator 3634 may be configured to generate routing data, such as autonomous vehicle ("AV") routing data 3650a. As shown, routing data for an autonomous vehicle may include a first pickup location ("PU1") 3682a, as an origination location, and a destination location ("D1a") 3684a. The data representing destination location 3684a may be associated with, or include, various types of data, such as data representing a GPS coordinate, an estimated time of arrival, an estimated time of travel, an estimated distance of travel, and the like. Routing data 3650a may also include data representing a path 3683a from origination location 3682a to destination location 3684a.

Routing data 3650a includes a delivery path 3687a to a first delivery location 3686a ("PU2a"), which may be determined for providing subsequent transportation services to another user 3602. In some cases, fleet optimization manager 3620 may provide for a modified path (e.g., a change in destination) during transit between origination location 3682a and destination location 3684a. Routing data 3650a may include updated data to reflect a change in navigation of the autonomous vehicle. For example, an autonomous vehicle may be diverted from path 3683a to a modified path (or modified path portion) 3685 to a second destination location ("D1b") 3684b. As shown, a delivery path 3687b to second delivery location 3686b ("PU2b") may originate at destination location 3684b to provide subsequent transportation services to a different user 3602.

Modified path 3685 may be implemented for a variety of reasons, such as (but not limited to) a request by an occupant of the autonomous vehicle to change destinations, a detected routing characteristic associated with a portion 3689 of path 3683a (e.g., due to increased traffic or an accident along a remaining path portion), a policy for deemphasizing or avoiding the routing of an autonomous vehicle over portion 3689 (e.g., due to an intersection along portion 3689 that may have navigation-related complexities), a teleoperator command transmitted to the autonomous vehicle for changing navigation to modified path 3685 (e.g., a teleoperator 3608 may update routing data via teleoperator computing device 3604 in an autonomous vehicle controller), and any other reasons.

In various examples, path 3683a, modified path 3685, and/or delivery paths 3687a and 3687b may include a set or subset of any number of path portions or road segments over which an autonomous vehicle may be routed. Note that delivery locations 3686a and 3686b need not be limited to locations at which to pick up users 3602 for transportation services. For example, delivery locations 3686a and 3686b (as well as destination locations 3684a and 3684b) may include stations at which autonomous vehicles routinely are serviced (e.g., charged, maintained, repaired, cleaned, etc.) and/or stored. Delivery locations 3686a and 3686b may also include geographic regions at which autonomous vehicles may be parked (e.g., a geographic region may be identified as a "parking space," in accordance with map data). Note, too, that in some cases, destination location 3684b may coincide with destination location 3684a (e.g., modified path 3685 may be a detour).

Autonomous vehicle ("AV") characterizer 3635 may be configured to determine autonomous vehicle characteristics for at least a subset of autonomous vehicles 3630a, whereby the autonomous vehicle characteristics may be used by one or more components of autonomous vehicle dispatch optimization calculator 3634 to identify and select at least a subset of autonomous vehicles to service the requests for transportation. In some examples, a subset of autonomous vehicle characteristics may indicate whether an autonomous vehicle is available for providing transportation services, and, if so, the subset of autonomous vehicle characteristics may also indicate the extent of provisioning such services. For example, autonomous vehicle characterizer 3635 may determine, for each autonomous vehicle, data describing maintenance issues (e.g., due to a degraded or non-functioning sensor, such as a Lidar sensor), dates and times of scheduled service or repair, state of battery charge and discharge rates, etc., any of which may factor in limiting or avoiding the use of certain autonomous vehicles from servicing certain transportation requests. Based on such information, autonomous vehicle dispatch optimization calculator 3634 may optimally dispatch certain autonomous vehicles to the extent of their capabilities. For example, an autonomous vehicle having less than 2 hours of battery charge may be limited to servicing shorter travel paths 3683 that may or may not have delivery locations 3686 adjacent or relatively near a station (e.g., a station at which the battery may be charged in-situ or swapped Out (i.e., physically removed and replaced with one or more charged batteries).

Request manager 3637 may be configured to receive requests for transportation based on autonomous vehicles 3630a, and may be configured to manage a queue of such requests. In some examples, request manager 3637 (or any component in an autonomous vehicle service platform) may be configured to determine a location associated with a computing device 3603 (e.g., a mobile phone including executable instructions) that may generate a request for transportation. Request manager 3637 may also identify the location associated with the computing device as a delivery location. While request manager 3637 may queue requests for transportation in, for example, an order in which received, the functionality and/or structure of request manager 3637 need not be so limiting. For example, request manager 3637 may prioritize some requests over others, whereby requests with relatively higher priorities may be assigned autonomous vehicles for dispatch for certain users 3602 (e.g., "gold club members," users paying a higher transportation fee, etc.) prior to other users. Responsive to a request identified by request manager 3637, optimizer 3638 (or any other component of autonomous vehicle dispatch optimization calculator 3634) may select an autonomous vehicle to service the request, and to generate command data 3642 for transmission to the autonomous vehicle. The autonomous vehicle controller of the autonomous vehicle may execute instructions of the command data 3642 to cause the selected autonomous vehicle to navigate to a delivery location that may be substantially coextensive with a location of the mobile computing device that generated the request. For example, a request may include location data (e.g., GPS coordinates, etc.) of a mobile device 3603 for purposes of routing the autonomous vehicle to pick up the user. In some cases, an application disposed in mobile device 3603 may be configured to periodically provide or transmit the location of user 3602 to ensure an autonomous vehicle may converge upon the user's location, even as user 3602 may move or travel (e.g., walk) away from a geographic location from which the request was originally transmitted.

Fleet optimization manager 3620 (or any portion thereof) may be configured to receive policy data 3601, environmental data 3606, fleet management data 3646, and any other routing-related data (e.g., routing characteristics) for generating sets of optimized routing paths over which to navigate a fleet 3630a of autonomous vehicles. Examples of policy data 3601 include data sets specifying parameters that define processes to optimally select one or more autonomous vehicle for servicing a request for transportation (e.g., a transit request). For example, policy data 3601 may specify road segments or intersections in which a certain level of complexity in navigating autonomous vehicles may exist. As such, a policy may specify that an intersection at Main Street and Oak Street ought to be bypassed. Examples of environmental data 3606 may include data sets that specify traffic-related data for various road segments or paths, as well as roadway conditions due to weather (e.g., inclement weather, such as rain, sleet, snow, etc.), and the like.

Dispatch tracker 3636 may be configured to track dispatched autonomous vehicles, as well as data with which routing data and routing paths are determined (e.g., either prior to or during transit). Dispatch tracker 3636 may be configured to receive policy data 3601, environmental data 3606 (e.g., weather data, traffic data, construction data, etc.), fleet management data 3646, and any other routing-related data to generate routing characteristics that may be associated with various portions of routing data 3650, including, but not limited to one or more path portions or road segments of paths 3683. Based on the routing-related data, dispatch tracker 3636 may be configured to identify routing characteristics, such as travel times over one or more path portions or road segments, estimated times of arrival at one or more destination locations, estimated delivery locations for a number of subsequent requests to be fulfilled, average speeds of traffic for each path portion or road segment, speed limits for respective road segments, estimated distances for each path portion or road segment, and the like, one or more of which may be aggregated to characterize a routing path for routing an autonomous vehicle between two geographic locations. Further, dispatch tracker 3636 may be configured to track routing characteristics associated with the routing paths, and to detect changes in such routing characteristics. Dispatch tracker 3636 may detect a change in a routing characteristic associating with a portion 3689 of path 3683*a*, such that optimizer 3638 may recalculate one or more sets of optimal routes to identify modify path 3685. In some cases, the change in the routing characteristic may describe an increase in travel times along portion 3689. Or, the change in the routing characteristic may be a change in destination as requested by user 3602. Other changes in other routing characteristics are possible.

Optimizer 3638 is configured to generate an optimized set or subset of routing paths, based on one or more routing characteristics of one or more path portions or road segments, to provide autonomous vehicle services to users 3602, whereby the optimized set or subset of routing paths may be optimized in accordance with one or more objectives (e.g., routing metrics). Examples of routing metrics include, but are not limited to, minimized travel times, maximized profit, maximized passenger convenience, minimized number of autonomous vehicles in service per unit distance (e.g. per vehicle or an aggregated distance), minimize aggregated costs over a fleet of autonomous vehicles, minimized battery discharge per unit distance traveled, maximized distance of travel per unit battery charge, maximized time (or aggregated time) during which an autonomous vehicle is transporting passengers (or collective time/miles used to transport passengers for a fleet of autonomous vehicles) against time during which an autonomous vehicle is inoperable (or against an aggregated downtime for a fleet of autonomous vehicles), minimized amount of teleoperator-hours to facilitate routing of one or more autonomous vehicles per unit of time (e.g., during which the one or more autonomous vehicles are transporting passengers), minimized amount of power consumed by an autonomous vehicle (e.g., due to power use by on-board HVAC systems, music systems, lighting systems, and any other on-board component that consumes power) during certain states of operation (e.g., during states in which there are low amounts of battery charge), maximized bandwidth of communication channels along one or more portions of path 3683, etc.

As an example, consider that optimizer 3638 may be configured to determine a number of destination locations 3684 for a subset of autonomous vehicles 3630*a*, the destination locations 3684 being described by, for example, GPS data from corresponding requests. Optimizer 3638 may be configured to identify routing characteristics of paths 3683 between a number of origination locations 3682 and a number of destination locations 3684, and optimize a routing metric of any number of combination of path portions or road segments for paths 3683 (e.g., one or more path portions or road segments in a road network) between one or more sets of origination locations 3682 and one or more sets of destination locations 3684. Further, optimizer 3638 may be configured to calculate one or more sets of corresponding delivery locations 3686 to which autonomous vehicles 3630*a* are directed subsequent to arriving at one or more sets of destination locations 3684. Delivery locations 3686 may be determined based on the calculation of sets of delivery paths 3687, from which an optimum delivery path, such as delivery path 3687*a*, may be selected to optimize one or more routing metrics. In some examples, optimizer 3638 may be configured to identify routing characteristics of any number of combination of path portions or road segments for delivery paths 3687*a* and 3687*b* between destination locations 3684 and delivery locations 3686, and may be further configured to optimize a routing metric (e.g., minimized travel time) for delivery paths 3687*a* and 3687*b* between destination locations 3684 and delivery locations 3686. Note the optimization of delivery paths 3687*a* and 3687*b* by optimizer 3668 may be performed concurrently with the optimization of any number of other delivery paths 3687 (not shown) for the fleet of autonomous vehicles 3630*a*, according to at least one example.

According to some examples, optimizer 3638 may be implemented in hardware or software, or a combination thereof, and may be configured to operate in accordance with an optimization algorithm that operates to optimize a multivariate cost function (or objective function) that may, for example, linearly optimize one or more routing metrics. In some cases, optimizer 3638 may implement an algorithm to perform one or more regression techniques (e.g., either linear or polynomial regression) with which to identify, for example, optimized sets of delivery paths 3687 to minimize travel times for each path (or collectively) relative to at least the corresponding delivery locations 3686. Further, optimizer 3638 may also perform regression techniques to optimize sets of paths 3683 relative to at least sets of origination locations 3682. According to various examples, optimizer 3638 need not be limited to performing regression algorithms, but may implement any function with which to generate optimal sets of routing data 3650.

In some examples, optimizer 3638 may be configured to identify data to implement a delivery location 3686*a* and select an autonomous vehicle to navigate in accordance with routing data 3650*a*. Based on routing data 3650*a*, data representing command data 3642 may be transmitted to the autonomous vehicle, whereby command data 3462 may be configured to cause the autonomous vehicle to navigate to delivery location 3686*a*, which may be a subsequent origination location for subsequently picking up a next passenger-user 3602. Note that optimizer 3638 may calculate the number of delivery locations 3686 and/or the number of destination locations 3684 within a geo-fenced region (e.g., a geographic region having a boundary in which autonomous vehicles may not traverse (without teleoperator authorization), at least in some examples). Therefore, a teleoperator 3608 may generate command data 3642 via teleoperator computing device 3604 to cause an autonomous vehicle to traverse a boundary demarcating a geo-fenced region. In this case, command data 3642 may include executable instructions to cause an autonomous vehicle, when executed by an autonomous vehicle controller (not shown).

To illustrate operation of dispatch tracker 3636 and optimizer 3638, consider the following example. Based upon routing characteristics and origination locations 3682 and requested destination locations 3684, optimizer 3638 generates a set of routing data 3650 to route optimally a number of autonomous vehicles. One of the routes may be described by routing data 3650a. Dispatch tracker 3636 may be configured to monitor one or more routing characteristics associated with one or more portions of path 3683a. Next, consider that dispatch tracker 3836 detects a change in one or more routing characteristics, whereby the autonomous vehicle is to deviate from path 3683a onto modified path portion 3685 responsive to the changed routing characteristic. As described, examples of a changed routing characteristic can include one or more of the following: a request by a passenger to change destinations, a detected routing characteristic associated with a portion 3689 of path 3683a (e.g., a change to due to increased traffic or an accident), a policy for which routing an autonomous vehicle over a remainder portion of path 3683a may be deemphasized or avoided (e.g., an intersection at which navigation complexities may arise), a teleoperator command (e.g., a teleoperator-generated command to modify navigation of the autonomous vehicle), and the like. Responsive to the detected routing characteristic, optimizer 3638 may be configured to identify modified path 3685 for an autonomous vehicle, and may further be configured to include updated data (e.g., data representing instructions to change to a modified path 3685) in command data 3642, which may be transmitted to the autonomous vehicle. As such, command data 3642 may be configured to cause the autonomous vehicle to navigate via modified path 3685 (or portion thereof). In some cases, an autonomous vehicle controller (not shown) may execute instructions included in command data 3642 to effect the change in navigation to either destination location 3684a (e.g., the initial destination location) or destination location 3684b (e.g., a different destination location). According to various examples, optimizer 3638, with implementation of modified path 3685, may be configured to recalculate, as applicable, one or more delivery paths 3687 based on recalculated delivery locations 3686 (e.g., relative to destination locations 3684), and/or recalculate one or more paths 3683 based on recalculated destination locations 3684 (e.g., relative to origination locations 3682).

Figure 37A:
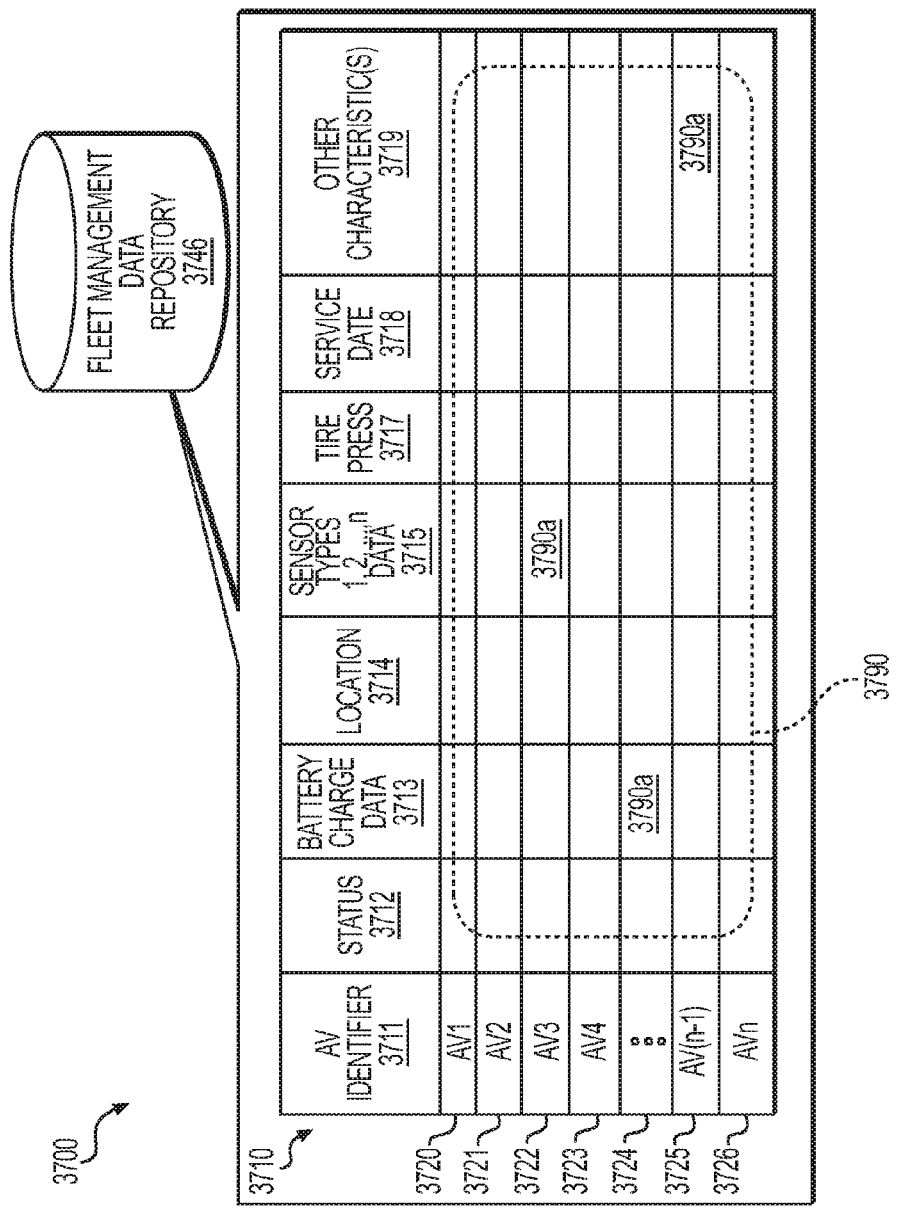
FIGS. 37A and 37B are diagrams depicting examples of data types and data arrangements for repositories configured to store autonomous vehicle fleet optimization data, according to some examples.
Figure 37B:
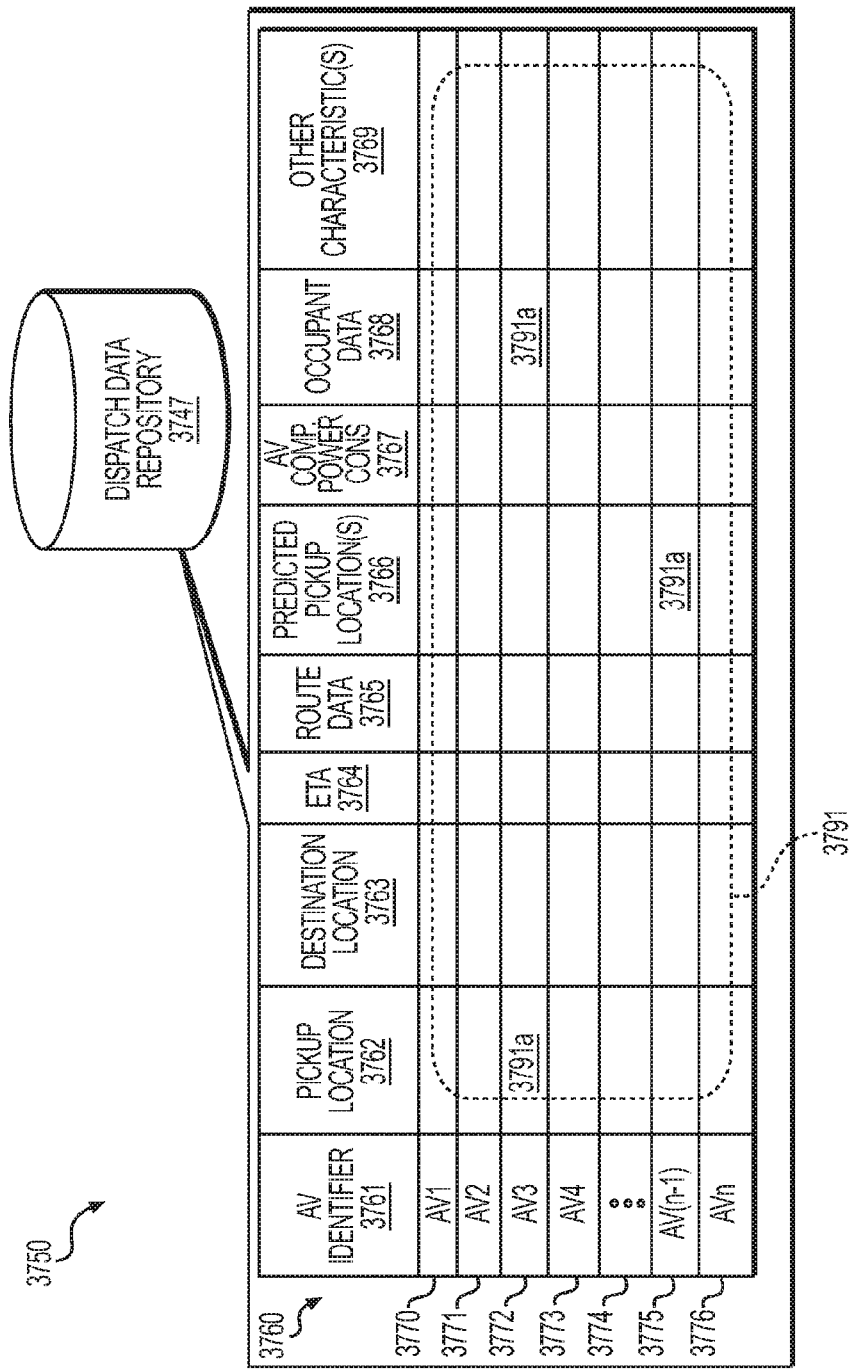

FIGS. 37A and 37B are diagrams depicting examples of data types and data arrangements for repositories configured to store autonomous vehicle fleet optimization data, according to some examples. Diagram 3700 of FIG. 37A depicts examples of data types and/or data arrangements (e.g., data structures) for associating and/or storing fleet management data in a fleet management data repository 3746. Note that the data structures shown in FIGS. 37A and 37B are for illustration purposes and are not intended to be limited.

In the example shown, data arrangement 3710 may be configured to store any number of autonomous vehicle characteristics as subsets of data 3720 to 3726, each of which may represent a subset of data for a corresponding autonomous vehicle. In the example shown, a set of autonomous vehicle characteristics data 3711 to 3719 may be disposed or stored in any of data locations 3790. To illustrate, consider that a first autonomous vehicle associated with subset of data 3720 includes data 3711 representing an autonomous vehicle ("AV") identifier, and data 3712 representing a status of the autonomous vehicle. For example, data 3712 may include data representing whether autonomous vehicle identified as "AV1" has a status of "in-use" (or is dispatched), "in a charging mode" (e.g., a battery is being charged or swapped, such as at a station), "idle" or garaged in a station, "under repair," "parked" in a parking spot, etc.

Data 3713 representing battery charge data for autonomous vehicle AV1 may include any data that describes an amount of charge on a battery, a predicted rate of discharge on a battery under a predicted loading, a rate of discharge, an estimated time to charge from one level (e.g., 25% charged) to another level of charge (e.g., 100% charged), and the like. Data 3714 representing a location may include any data that describes a location for autonomous vehicle, whereby the location may be identified based on GPS coordinates as determined in real-time (or near real-time). Data 3715 may represent any sensor data, including one or more types of sensor data (e.g., Lidar data, sonar data, radar data, camera data, etc.) and one or more subsets of sensor data (e.g., Lidar sensor 1 data, Lidar sensor 2 data, Lidar sensor 3 data, etc.). Data 3717 for any subset of data 3720 to 3726 may represent air pressure(s) of one or more tires. Data 3718 may represent indications of dates and/or times at which an autonomous vehicle is to be serviced (e.g., maintenance, repaired, etc.). Data 3719 may represent one or more other subsets of other autonomous vehicle characteristics that may be used to determine whether to schedule or dispatch an autonomous vehicle for purposes of providing an autonomous vehicle transportation service. In the example shown, any of the above-described data may be stored in any data locations 3790a of data locations 3790.

Diagram 3750 of FIG. 37B depicts examples of data types and/or data arrangements (e.g., data structures) for associating and/or storing dispatch data, including routing data, in a dispatch data repository 3747. In the example shown, data arrangement 3711 may be configured to store any amount of routing data as subsets of data 3770 to 3776, each of which may represent a subset of data for a corresponding autonomous vehicle. In the example shown, a set of various types of routing data 3761 to 3769 are disposed or stored in any of data locations 3791. To illustrate, consider that a first autonomous vehicle associated with subset of data 3770 includes data 3761 representing an autonomous vehicle ("AV") identifier, and data 3762 representing a pickup location (e.g., an origination location) at which the autonomous vehicle is picking up, or has picked up, a passenger. For example, data 3762 may include data representing an origination location associated with one or more GPS coordinates. Data 3763 may include data representing a destination location at which a passenger is predicted to be dropped off. Note, however, data 3763 may be updated when the destination location is changed. Data 3764 may include data representing an estimated time of arrival ("ETA"), or any other metric of time, at which the autonomous vehicle schedule to arrive at the destination location. Data 3765 may include data representing route data. For example, route data 3765 may include one or more sets of path portions or road segments that, in the aggregate, may constitute a path over which an automated vehicle is to navigate, according to various examples.

Data 3766 may include data representing a predicted pickup location as a subsequent origination location for another user. Note, too, that data 3766 may also include alternate pickup locations should the principal pickup location becomes obviated, at least in some examples. Data 3767 may include data representing amounts of power consumption (or predicted rates of power consumption) of one or more components of an autonomous vehicle ("AV comp. power cons"), such as an HVAC system, a lighting system, an entertainment system, etc. As such, data 3767 may be used to determine a rate of battery discharge associated with a particular autonomous vehicle, which, in turn, may affect distances and routes over which a fleet optimization manager (not shown) may select for navigating one or more autonomous vehicles in a fleet. For example, an autonomous vehicle having a relatively low battery charge may have its air-conditioning system at full capacity while the occupants may be using many lights and loud bass in its entertainment system. As such, the rate at which the battery is discharged may affect future routes for which the autonomous vehicle may be dispatched. Data 3768 may include data representing occupant data, such as a number of passengers, identity of a user, etc. Data 3769 may represent one or more other subsets of other types of routing data that may be used to determine whether to schedule or dispatch an autonomous vehicle for purposes of providing an autonomous vehicle transportation service.

In the example shown, any of the above-described data may be stored in any data locations 3791a of data locations 3791. According to various examples, data locations 3790a and 3791a may represent any of the following: database addresses at which data is stored, any amount of data storage (e.g., as data blocks), one or more data files (or documents), one or more keys or pointers to any amount of data storage (e.g., database objects), and the like. Any of repositories 3746 and 3747 of FIGS. 37A and 37B may respectively be implemented using any type of database technology, and may include any database schema or any database management systems configured to implement, for example, relational database models, or SQL, ODBC, JDBC, etc., as well as any normalized SQL server databases or non-SQL databases (e.g., noSQL), such as MongoDB™. In various examples, one or more routing characteristics may be formed or derived from either autonomous vehicle characteristics data in repository 3746 or routing data in repository 3747, or any combination thereof.

Figure 38:
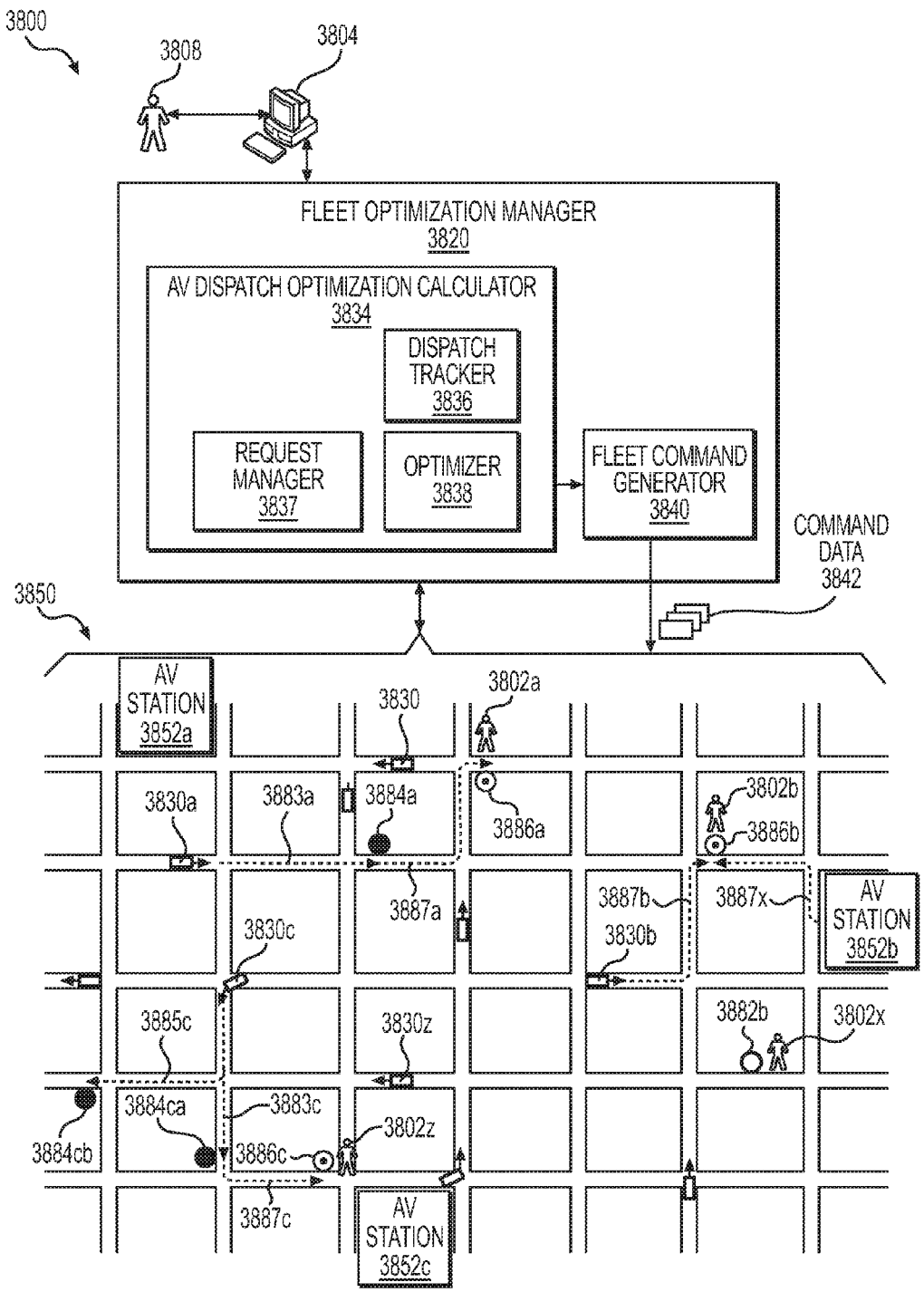
FIG. 38 is a diagram depicting an example of routing autonomous vehicles in accordance with a set of optimized routing paths, according to some examples.

FIG. 38 is a diagram depicting an example of routing autonomous vehicles in accordance with a set of optimized routing paths, according to some examples. Diagram 3800 depicts a fleet optimization manager 3820 including an autonomous vehicle ("AV") dispatch optimization calculator 3834 and a fleet command generator 3840, which is configured to generate command data 3842. Further, autonomous vehicle dispatch optimization calculator 3834 may be configured to include a dispatch tracker 3836, a request manager 3837, and an optimizer 3838. Note that one or more elements depicted in diagram 3800 of FIG. 38 may include structures and/or functions as similarly-named elements described in relation to one or more other drawings described herein. Further, fleet optimization manager 3820 of diagram 3800 may include fewer or greater numbers of components than shown in FIG. 38.

In this example, fleet optimization manager 3820 may be configured to optimize the coordination of routing a fleet of autonomous vehicles 3830 in a road network 3850, which may include any number of autonomous vehicle ("AV") stations 3852a to 3852c. An autonomous vehicle station may be a source of an inventory of autonomous vehicles from which an autonomous vehicle may be dispatched to service a transportation request, such as a request generated by a user 3802a. Further, an autonomous vehicle station may also be a destination or delivery location at which a vehicle may be repaired, maintained, stored, etc.

According to various examples, optimizer 3838 may be configured to determine various sets of routes that, for example, optimize delivery paths between corresponding destination and delivery locations. In a first example, an autonomous vehicle 3830a may be configured to receive command data 3842, which, in turn, may be configured to cause autonomous vehicle 3838 to navigate via a path 3883a to a destination location 3884a, at which one or more passengers may be discharged. Subsequently, autonomous vehicle 3830a may navigate (e.g., without occupants) via a delivery path 3887a to a delivery location 3886a at which user 3802a may be picked up. In the various examples, delivery path 3887a may represent an optimized grouping of one or more path portions or road segments that optimally provides autonomous vehicle service to at least user 3802a at delivery location 3886a.

In a second example, an autonomous vehicle 3830b is shown to be in-transit via a delivery path 3887b toward a delivery location 3886b (e.g., autonomous vehicle 3830b may have left from a prior destination location, which is not shown). As shown, a user 3802b awaits pick up by an autonomous vehicle at delivery location 3886b. Next, consider that optimizer 3838 may be configured to recalculate which autonomous vehicle in an autonomous vehicle fleet may be optimally-suited to service user 3802b. In this case, consider that an obstacle may be detected on delivery path 3887b. As such, optimizer 3838 may cause command data 3842 to be received into an autonomous vehicle at autonomous vehicle station 3852b. In response, command data 3842 may be configured to dispatch the autonomous vehicle from station 3852b via delivery path 3887x to pick up user 3802b. Further, optimizer 3838 may reroute autonomous vehicle 3830b to origination location 3882b to pick up another user 3802x. Although not shown, optimizer 3830 may recalculate one or more other routes for other autonomous vehicles responsive to the routing of the autonomous vehicle via delivery path 3887x.

In a third example, an autonomous vehicle 3830c may be shown as being in-transit via a path 3883c to destination location 3884ca, after which autonomous vehicle 3830c may be configured to navigate via delivery path 3887c to delivery location 3886c to pick up a user 3802z. According to some examples, autonomous vehicle 3830c may be rerouted via modified path 3885c to another destination location 3884cb. As such, autonomous vehicle 3830c may not be available to travel to either destination location 3884ca or delivery location 3886c. Based on the rerouting of autonomous vehicle 3830c, fleet optimization manager 3820 may be configured to recalculate sets of routing paths to determine that another autonomous vehicle 3830z may be routed to delivery location 3886c (as origination location), at which user 3802z may be picked up. While not shown, one or more other autonomous vehicles may be rerouted to optimize one or more routing metrics responsive to the above-described routing changes for autonomous vehicle 3830c. The examples described in diagram 3800 are not intended to be limiting, and, therefore, fleet optimization manager 3820 (or one or more of its components) may be configured to iteratively recalculate optimal sets of routing paths based on changes of one or more routes or routing characteristics. In some examples, teleoperator 3808 may initiate a modification to the navigation of any autonomous vehicle 3830 via a teleoperator computing device 3804.

Figure 39:
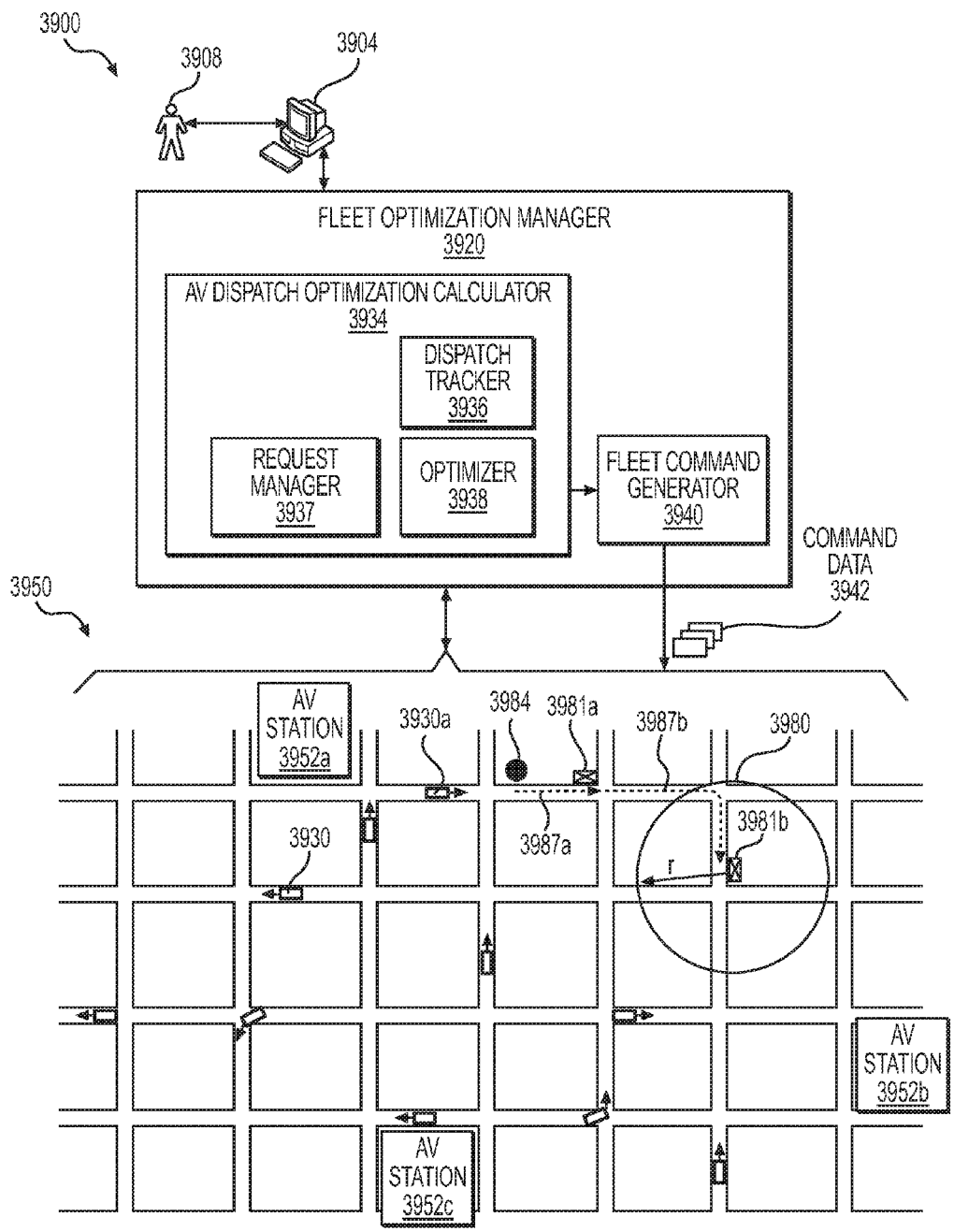
FIG. 39 is a diagram depicting an example of routing autonomous vehicles in accordance with a specific delivery location, according to some examples.

FIG. 39 is a diagram depicting an example of routing autonomous vehicles in accordance with a specific delivery location, according to some examples. Diagram 3900 depicts a fleet optimization manager 3920 including an autonomous vehicle ("AV") dispatch optimization calculator 3934 and a fleet command generator 3940, which is configured to generate command data 3942. Further, autonomous vehicle dispatch optimization calculator 3934 may be configured to include a dispatch tracker 3936, a request manager 3937, and an optimizer 3938. Note that one or more elements depicted in diagram 3900 of FIG. 39 may include structures and/or functions as similarly-named elements described in relation to one or more other drawings described herein. Further, fleet optimization manager 3920 of diagram 3900 may include fewer or greater amounts of components than shown in FIG. 39. In this example, fleet optimization manager 3920 may be configured to optimize the coordination of routing a fleet of autonomous vehicles 3930 in a road network 3950, which may include any number of autonomous vehicle ("AV") stations 3952a to 3952c and any number of parking spaces 3981a and 3981b, at which autonomous vehicles 3930 may be parked or otherwise delivered thereto. An autonomous vehicle station and a parking space may be a source of an inventory from which at least one autonomous vehicle may be dispatched to service a transportation request.

According to some examples, autonomous vehicle dispatch optimization calculator 3934 may be configured to determine, for example, a demand for autonomous vehicle service of a particular autonomous vehicle 3930 may be reduced such that the autonomous vehicle may be idle subsequent to dropping off passengers at a destination location. In some cases, optimizer 3938 may be configured to identify an absence of a request for transportation for the autonomous vehicle. In this example, optimizer 3938 may determine that a distance to a parking space 3981a may be less than to one of autonomous vehicle stations 3952a to 3952c. Therefore, to conserve battery charge, an autonomous vehicle 3930 may transit to a parking space (e.g., a nearest parking space or lot) at which the vehicle may await utilization.

According to some examples, autonomous vehicle may transit to a centrally-disposed parking space (e.g., parking space 3981b) to subsequently service transportation requests within an area 3980 having a radius, r, as determined by, for example, a magnitude of a probability of servicing at least one request within an area 3980 during a certain time interval. In some cases, the probability of servicing at least one request within an area 3980 may be based on historical data that may define the density of probabilities for requests generated within area 3980 during an interval of time.

Note that the location of parking space 3981b may be determined to be central to (e.g., a centroid of) area 3980, which may include distributions of request locations about parking space 3981b.

In some examples, autonomous vehicle 3930 may power down from one power state (e.g., drive mode power state) to another power state (e.g., low power standby power state). Subsequently, optimizer 3938 may identify an autonomous vehicle, which may be in standby mode at a parking space 3981, to service a transportation request. Thus, an autonomous vehicle 3930 may transition back into a drive mode power state to travel out from the parking space to service a transportation request. As an example, consider that autonomous vehicle 3930a transits to a destination location 3984 and discharges the passengers. Further, consider that autonomous vehicle 3930a is yet to be assigned to service another user request. Until then, autonomous vehicle 3930a may navigate via delivery path 3987a to a parking space 3981a, which may be one of the nearest parking spaces. Thus, battery charge may be conserved until autonomous vehicle 3930a is called into service. As another example, autonomous vehicle 3930a may transit via delivery path portions 3987a and 3987b to a delivery location that coincides with a parking space 3981b. Here, autonomous vehicle 3930a may be powered down at a location that generally may be substantially equidistant to a predicted future request within a distance, "r." Upon receiving command data 3942 to service a request at a particular origination location (not shown) within area 3980, autonomous vehicle 3930a may navigate to an origination location at which to pick up a user.

According to some examples, a teleoperator 3908 may input a command via teleoperator computing device 3904 to generate command data 3942 to cause autonomous vehicle 3930a to park into a region at which the autonomous vehicle may optionally power down into a standby state. Note that the above-described implementations are examples and are not intended to be limiting. For example, the above-described command generation to navigate an autonomous vehicle to a parking space may be performed by an autonomous vehicle controller internal to an autonomous vehicle. Also, fleet optimization manager 3920 may be configured to provide command data 3942 to cause an autonomous vehicle 3930 to travel to any geographic region (including an AV station) to power down into a standby state until called upon to service a transportation request. In some examples, local map data or global map data may indicate the availability of parking spaces near autonomous vehicle 3930. Therefore, an autonomous vehicle 3930 may navigate to an available parking space as specified by, for example, a locally-generated map.

Figure 40:
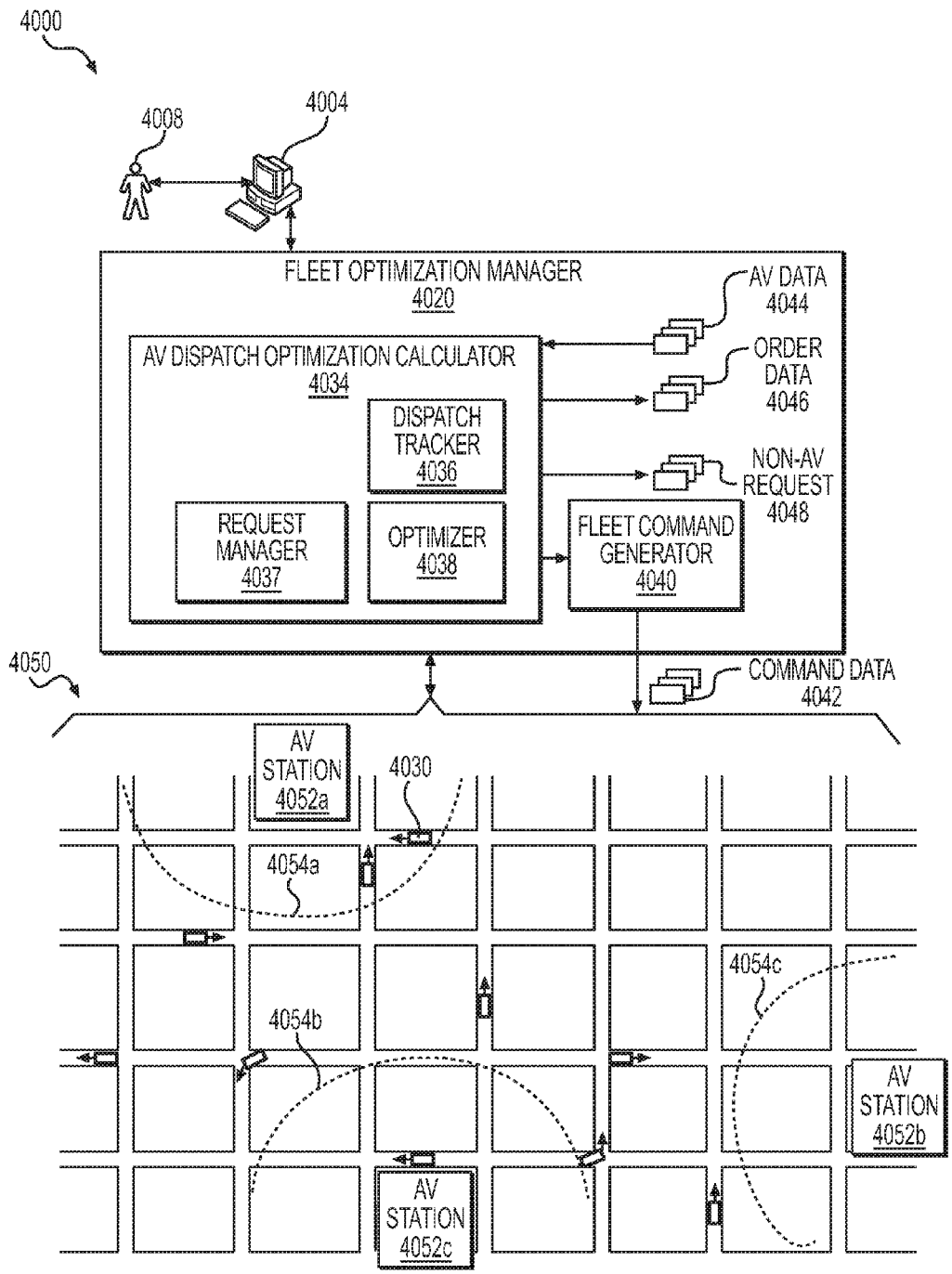
FIG. 40 is a diagram depicting an example of routing autonomous vehicles in accordance with reduced functionality of at least one component of an autonomous vehicle, according to some examples.

FIG. 40 is a diagram depicting an example of routing autonomous vehicles in accordance with reduced functionality of at least one component of an autonomous vehicle, according to some examples. Diagram 4000 depicts a fleet optimization manager 4020 including an autonomous vehicle ("AV") dispatch optimization calculator 4034 and a fleet command generator 4040, which is configured to generate command data 4042. Further, autonomous vehicle dispatch optimization calculator 4034 may be configured to include a dispatch tracker 4036, a request manager 4037, and an optimizer 4038. Note that one or more elements depicted in diagram 4000 of FIG. 40 may include structures and/or functions as similarly-named elements described in relation to one or more other drawings described herein. Further, fleet optimization manager 4020 of diagram 4000 may include fewer or greater numbers of components than shown in FIG. 40. In this example, fleet optimization manager 4020 may be configured to optimize the coordination of routing a fleet of autonomous vehicles 4030 in a road network 4050, which may include any number of autonomous vehicle ("AV") stations 4052a to 4052c at which autonomous vehicles 4030 may be serviced or repaired in view of the detection of reduced functionalities of one or more components, such as sensors, batteries, lights, tire pressures, HVAC systems, safety equipment, audio alert systems, etc.

According to some examples, autonomous vehicle dispatch optimization calculator 4034 may be configured to receive autonomous vehicle characteristic data 4044 to determine whether one or more components may be operating out of operational range(s) (e.g., beyond normative specifications and/or parametric values). Autonomous vehicle characteristic data 4044 may be received from a fleet management data repository, and may be further configured to include expected values of sensor data and ranges of values that define one or more ranges of values that define relative states of component functionality (e.g., normative, degraded, minimally functional, operational failure, etc.). For example, Lidar data received from a specific Lidar sensor may be operating beyond a normative range. As multiple Lidar sensors may be present on an autonomous vehicle in a redundant manner (e.g., at least triple redundancy), the autonomous vehicle 4030 may continue to operate with a nonfunctional Lidar sensor (e.g., in a fail-operational mode).

In some cases, autonomous vehicles 4030 operating with one or more components functioning less than a normative range of operation, optimizer 4038 may be configured to optimize the servicing of requests using such an autonomous vehicle 4030. For example, an autonomous vehicle operating with a component having reduced functionality may be limited to servicing requests within boundaries 4054a, 4054b, and 4054c, where may be adjacent (e.g., at any distance) to AV stations 4052a, 4052b, and 4052c, respectively. Therefore, should further issues arise relating to the reduced-functioning components, or any other components, an autonomous vehicle configured (e.g., via command data 4042) to be routed relatively near an autonomous vehicle service station 4052 (should service needs arise). The above-described boundary usage is but one example of coordinating the dispatch of autonomous vehicles with reduced functionality and is not intended to be limiting. Any number of approaches to selecting an autonomous vehicle (with reduced functionality) to service transportation requests is within the scope of the present disclosure. Note further that autonomous vehicle dispatch optimization calculator 4034 may generate order data 4046 to automatically schedule a service, as well as ordering parts, to replace the reduced functioning component. Further, a non-AV request 4048 may be generated to facilitate usage of non-AV drivers (e.g., human-driven vehicles) into the transportation service (e.g., with minimal or no detriment to the autonomous vehicle service) to assist or supplement the autonomous vehicle service in view, for example, in one or more autonomous vehicles being affected by reduced-functioning components. Examples of non-AV drivers are described at FIG. 16, among others.

Figure 41:
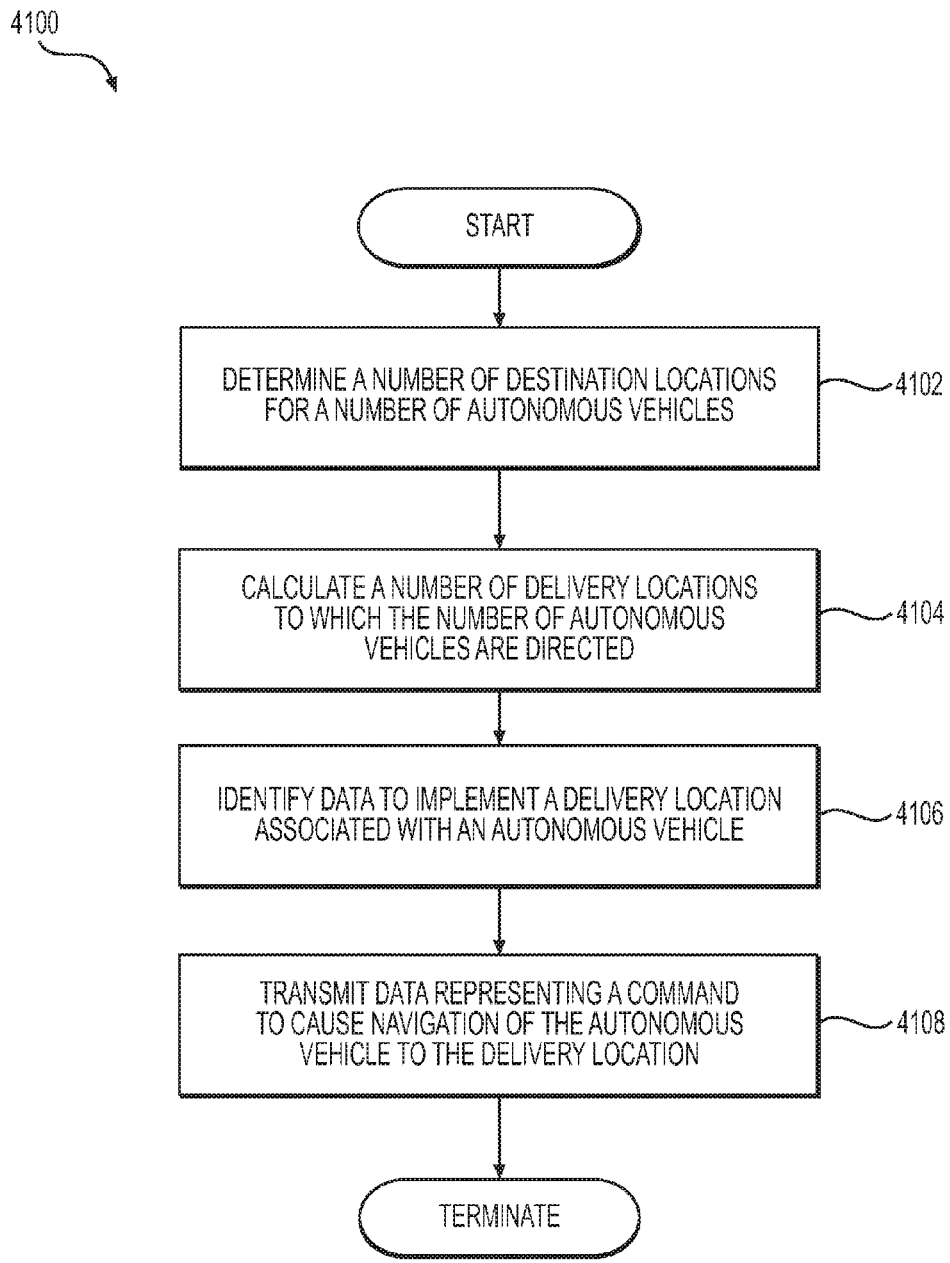
FIG. 41 is a flow chart illustrating an example of optimizing sets of routes to manage a fleet of autonomous vehicles, according to some examples.

FIG. 41 is a flow chart illustrating an example of optimizing sets of routes to manage a fleet of autonomous vehicles, according to some examples. Flow 4100 begins with 4102 at which a number of destination locations are determined for a number of autonomous vehicles. At 4104, a number of delivery locations may be calculated, whereby each of the number of autonomous vehicles are guided or directed to navigate to corresponding delivery locations. At 4106, data to implement a delivery location associated with an autonomous vehicle may be identified. At 4108, data representing a command to cause navigation of an autonomous vehicle to a delivery location may be transmitted to a specific autonomous vehicle. Note that the order depicted in this and other flow charts herein are not intended to imply a requirement to linearly perform various functions as each portion of a flow chart may be performed serially or in parallel with any one or more other portions of the flow chart, as well as independent or dependent on other portions of the flow chart.

Figure 42:
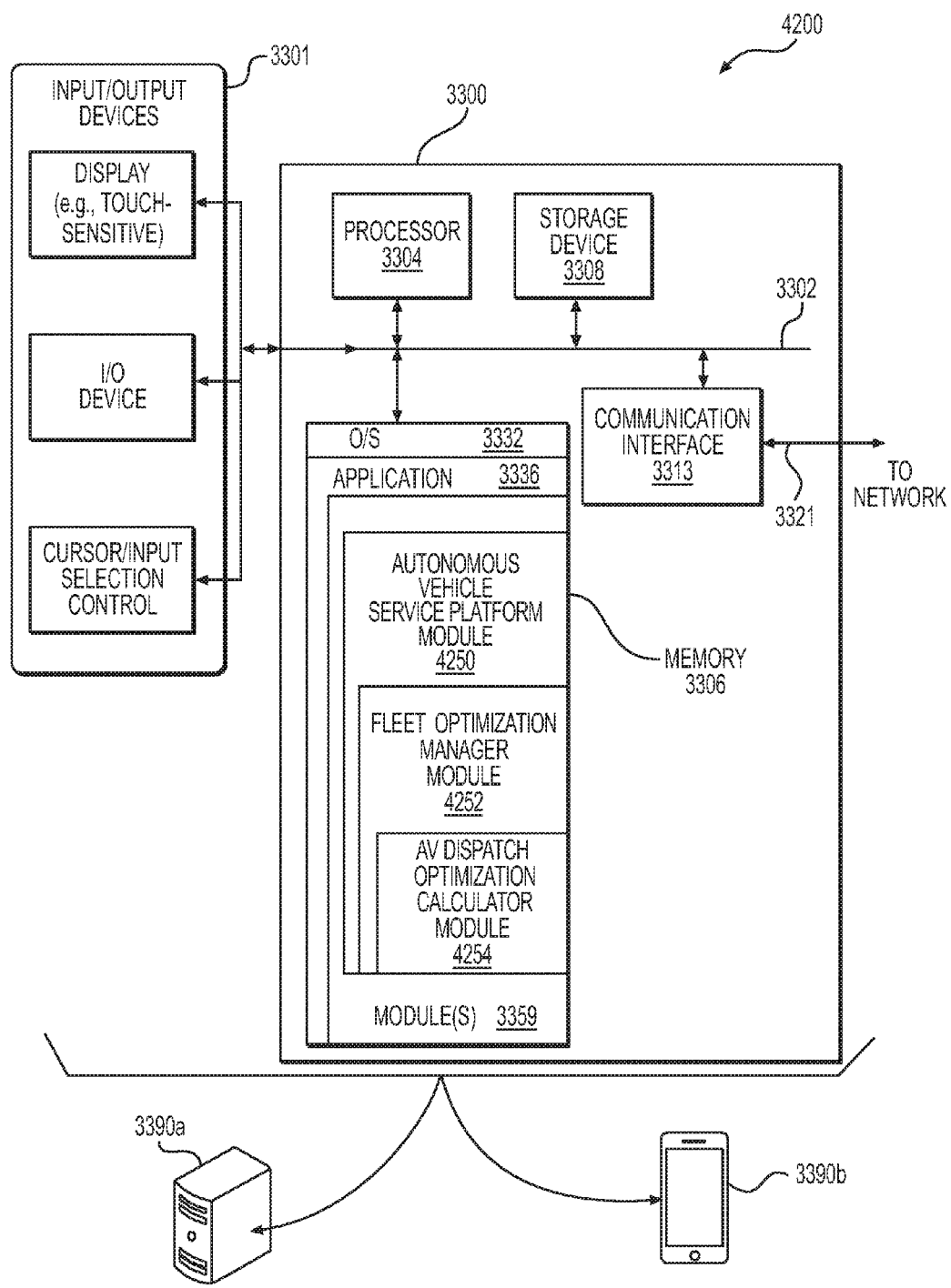
FIG. 42 illustrates examples of various computing platforms configured to provide various fleet management-related functionalities and/or structures to components of an autonomous vehicle service, according to various embodiments.

FIG. 42 illustrates examples of various computing platforms configured to provide various fleet management-related functionalities and/or structures to components of an autonomous vehicle service, according to various embodiments. In some examples, computing platform 3300 may be used to implement computer programs, applications, methods, processes, algorithms, or other software to perform the above-described techniques. Note that various structures and/or functionalities of FIG. 33 may be applicable to FIG. 42, and, as such, some elements in those figures may be discussed in the context of FIG. 33. Note further that elements depicted in diagram 4200 of FIG. 42 may include structures and/or functions as similarly-named elements described in connection to one or more other drawings herein.

Referring to the example shown in FIG. 42, system memory 3306 includes an autonomous vehicle service platform module 4250 and/or its components (e.g., a fleet optimization manager module 4252, an autonomous vehicle dispatch optimization calculator module 4254, etc.), any of which, or one or more portions of which, can be configured to facilitate navigation for an autonomous vehicle service by implementing one or more functions described herein. In some cases, computing platform 3300 can be disposed in any device, such as a computing device 3390a, which may be disposed in an autonomous vehicle service platform, and/or mobile computing device 3390b.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method comprising:
   determining a destination location for an autonomous vehicle of a plurality of autonomous vehicles;
   determining a plurality of origination locations to which the plurality of autonomous vehicles are to be directed;
   maintaining policy data for selecting individual autonomous vehicles of the plurality of autonomous vehicles to service respective requests associated with the plurality of origination locations, the policy data including one or more of:
      a distance that the individual autonomous vehicles are instructed to maintain from external objects;
      one or more types of road lines that the individual autonomous vehicles are instructed not to cross;
      one or more lanes in which the individual autonomous vehicles are instructed to travel; or
      one or more road segments or intersections that the individual autonomous vehicles are instructed to bypass;
   generating routing data that indicates at least a route from the destination location of the autonomous vehicle to an origination location of the plurality of origination locations;
   selecting the autonomous vehicle to navigate to the origination location based at least in part on the routing data and the policy data;
   generating command data for the autonomous vehicle using the routing data; and
   sending the command data to the autonomous vehicle, the command data causing the autonomous vehicle to navigate to the origination location via the route.

2. The method of claim 1, wherein determining the plurality of origination locations comprises:
   determining the plurality of origination locations for a geo-fenced region.

3. The method of claim 1, further comprising:
   receiving, from a computing device, a request for transportation by one of the plurality of autonomous vehicles; and
   determining a location associated with the computing device,
   wherein determining the plurality of origination locations comprises determining at least the origination location based at least in part on the location associated with the computing device.

4. The method of claim 1, further comprising:
detecting a change in a routing characteristic associated with a portion of a first route between the autonomous vehicle and the destination location;
identifying a second route for the autonomous vehicle;
generating additional command data for the autonomous vehicle; and
sending the additional command data to the autonomous vehicle.

5. The method of claim 4, wherein
the additional command data causes the autonomous vehicle to navigate via the second route to the destination location.

6. The method of claim 4, wherein the additional command data causes the autonomous vehicle to navigate via the second route to another destination location.

7. The method of claim 4, further comprising:
receiving a teleoperator command via a teleoperator computing device to send the additional command data to the autonomous vehicle, wherein the additional command data causes the autonomous vehicle to navigate via the second route.

8. The method of claim 1, further comprising:
receiving, from a computing device, a request for transportation by one of the plurality of autonomous vehicles;
determining a location associated with the computing device;
selecting an additional autonomous vehicle to service the request for transportation, the additional autonomous vehicle being located at a station;
generating additional command data for the additional autonomous vehicle, the additional command data configured to cause the additional autonomous vehicle to navigate from the station to the location; and
sending the additional command data to the additional autonomous vehicle.

9. The method of claim 1, further comprising:
identifying the origination location as a region at which to park the autonomous vehicle, the region comprising an area in which the autonomous vehicle may safely transition from a drive state to a standby power state; and
identifying an absence of a request for transportation for the autonomous vehicle,
wherein the command data further instructs the autonomous vehicle to transition from the drive state to the standby state.

10. The method of claim 1, further comprising:
identifying an absence of a request for transportation for the autonomous vehicle,
wherein the command data further instructs the autonomous vehicle to transition from a first power state to a second power state, wherein the first power state is associated with a drive mode for the autonomous vehicle and the second power state is associated with a standby mode for the autonomous vehicle.

11. The method of claim 1, further comprising:
determining an additional destination location for an additional autonomous vehicle of the plurality of autonomous vehicles;
identifying additional routing data that indicates at least an additional route from the additional destination location of the additional autonomous vehicle to the origination location;
determining a first time associated with the autonomous vehicle navigating to the origination location via the route;
determining a second time associated with the additional autonomous vehicle navigating to the origination location via the additional route; and
determining that the first time is less than the second time;
wherein selecting the autonomous vehicle is further based at least in part on determining that the first time is less than the second time.

12. The method of claim 1, further comprising:
evaluating fleet management data associated with the autonomous vehicle; and
identifying one or more values of an autonomous vehicle characteristic,
wherein the routing data further indicates the one or more values of the autonomous vehicle characteristic.

13. The method of claim 1, wherein each autonomous vehicle of the plurality of autonomous vehicles includes a same type of autonomous vehicle.

14. The method of claim 1, further comprising receiving, from a teleoperator computing device, an update to the policy data for selecting the individual autonomous vehicles.

15. The method of claim 1, further comprising receiving, from a teleoperator computing device, a new policy to add to the policy data for selecting the individual autonomous vehicles.

16. The method of claim 1, wherein the policy data further includes:
one or more types of road lines that the individual autonomous vehicles are instructed not to cross;
one or more lanes in which the individual autonomous vehicles are instructed to travel; and
one or more road segments or intersections that the individual autonomous vehicles are instructed to bypass.

17. The method of claim 1, further comprising:
determining that a first distance to a parking area is less than a second distance to an autonomous vehicle station;
determining to cause the autonomous vehicle to navigate to the parking area based at least in part on the first distance being less than the second distance;
causing the autonomous vehicle to park in the parking area, wherein the parking area is located along an additional route; and
causing the autonomous vehicle to transition from a first state of operation to a second state of operation.

18. A system comprising:
one or more computing devices including one or more processors, the one or more computing devices configured to:
determine a first destination location for a first autonomous vehicle of a plurality of autonomous vehicles;
determine a second destination location for a second autonomous vehicle of the plurality of autonomous vehicles;
determine a plurality of origination locations to which the plurality of autonomous vehicles are to be directed;
identify first routing data that indicates at least a first route from a current location of the first autonomous vehicle to the first destination location and a second route from the first destination location to an origination location of the plurality of origination locations;

identify second routing data that indicates at least a third route from a current location of the second autonomous vehicle to the second destination location and a fourth route from the second destination location to the origination location;

determine one or more routing metrics for optimizing routing of the plurality of autonomous vehicles;

select the first autonomous vehicle to navigate to the origination location based at least in part on the first routing data, the second routing data, and the one or more routing metrics;

generate command data for the first autonomous vehicle based at least in part on the first routing data; and send the command data to the first autonomous vehicle, the command data instructing the first autonomous vehicle to navigate to the origination location via the first route and the second route.

19. The system of claim 18, wherein the one or more computing devices are further configured to:

receive, from a computing device, a request for transportation by one of the plurality of autonomous vehicles; and determine a location associated with the computing device, wherein determining the plurality of origination locations comprises at least determining the origination location based at least in part on the location associated with the computing device.

20. The system of claim 18, wherein the one or more computing devices are further configured to:

detect a change in a routing characteristic associated with a portion of the first route between the first autonomous vehicle and the first destination location;

identify a fifth route for the first autonomous vehicle;

generate additional command data for the first autonomous vehicle, the additional command data configured to cause the autonomous vehicle to navigate via the fifth route and the second route; and send the additional command data to the first autonomous vehicle.

21. The system of claim 18, wherein the one or more computing devices are further configured to:

identify the origination location as a region at which to park the autonomous vehicle, and wherein the command data further instructs the first autonomous vehicle to transition from a first power state to a second power state, wherein the first power state is associated with a drive mode for the first autonomous vehicle and the second power state is associated with a standby mode for the first autonomous vehicle.

22. The system of claim 18, wherein the one or more routing metrics include one or more of:

instructions to minimize travel times of the plurality of autonomous vehicles;

instructions to minimize a number of autonomous vehicles in service per unit distance;

instructions to minimize aggregated costs of the plurality of autonomous vehicles;

instructions to minimize battery discharge per unit distance traveled of the plurality of autonomous vehicles;

instructions to maximize distance of travel per unit battery charge of the plurality of autonomous vehicles;

instructions to maximize times during which the plurality of autonomous vehicles are transporting passengers against times during which the plurality of autonomous vehicles are inoperable;

instructions to minimize an amount of teleoperator hours to facilitate routing of the plurality of autonomous vehicles; or instructions to minimize power consumption of the plurality of autonomous vehicles.

\* \* \* \* \*